US007133810B2

(12) United States Patent
Butler et al.

(10) Patent No.: US 7,133,810 B2
(45) Date of Patent: Nov. 7, 2006

(54) DESIGNS FOR WIDE BAND ANTENNAS WITH PARASITIC ELEMENTS AND A METHOD TO OPTIMIZE THEIR DESIGN USING A GENETIC ALGORITHM AND FAST INTEGRAL EQUATION TECHNIQUE

(75) Inventors: Chalmers M. Butler, Clemson, SC (US); Shawn D. Rogers, Laurel, MD (US)

(73) Assignee: Clemson University, Clemson, SC (US)

( * ) Notice: Subject to any disclaimer, the term of this patent is extended or adjusted under 35 U.S.C. 154(b) by 859 days.

(21) Appl. No.: 09/894,870

(22) Filed: Jun. 28, 2001

(65) Prior Publication Data

US 2003/0046042 A1 Mar. 6, 2003

Related U.S. Application Data

(60) Provisional application No. 60/215,434, filed on Jun. 30, 2000.

(51) Int. Cl.
*G06F 7/60* (2006.01)

(52) U.S. Cl. .......................... 703/2; 343/702; 343/753; 343/700 MS; 343/790; 343/895; 343/864; 343/846

(58) Field of Classification Search .................... 703/2; 343/75, 702, 700, 700 MS, 790, 895, 864, 343/767, 846, 742, 753; 455/562.1
See application file for complete search history.

(56) References Cited

U.S. PATENT DOCUMENTS 3,790,943 A * 2/1974 Pickles et al. .............. 342/399
6,034,648 A * 3/2000 Hope ......................... 343/790
6,118,406 A * 9/2000 Josypenko ........... 343/700 MS
6,169,523 B1 * 1/2001 Ploussios .................... 343/895
6,173,191 B1 * 1/2001 Jennings, III ............ 455/562.1
6,222,494 B1 * 4/2001 Erkocevic ................... 343/790
6,249,256 B1 * 6/2001 Luxon et al. ............... 343/702
6,317,092 B1 * 11/2001 de Schweinitz et al. .... 343/753
6,320,550 B1 * 11/2001 Van Voorhies .............. 343/742
6,323,809 B1 * 11/2001 Maloney et al. ..... 343/700 MS
6,344,833 B1 * 2/2002 Lin et al. .................... 343/846
6,346,916 B1 * 2/2002 Odachi et al. .............. 343/702
6,407,705 B1 * 6/2002 Sanad ................. 343/700 MS
6,424,309 B1 * 7/2002 Johnston et al. ............ 343/767
6,606,051 B1 * 8/2003 Fullerton et al. ............. 342/27
6,624,794 B1 * 9/2003 Wendt et al. ............... 343/864

(Continued)

OTHER PUBLICATIONS

Boag et al., "Design of electrically loaded wire antennas using Genetic algorithm", IEEE 1996.*

(Continued)

*Primary Examiner*—Paul L. Rodriguez
*Assistant Examiner*—Kandasamy Thangavelu
(74) *Attorney, Agent, or Firm*—Dority & Manning, P.A.

(57) ABSTRACT

A method for applying an algorithm to facilitate the design of wideband omnidirectional antennas, and the design of sleeve cage monopole and sleeve helix units includes rapid resolution of a complex relationship among antenna components to yield an optimal system. A genetic algorithm is used with fitness values for design factors expressed in terms to yield optimum combinations. Cage antennas are optimized via a genetic algorithm for operation over a wide band with low VSWR. Genetic algorithms and an integral equation solver are employed to determine the position and lengths of parasitic wires around a cage antenna in order to minimize VSWR over a band. The cage may be replaced by a normal mode quadrifilar helix for height reduction and with re-optimized parasites.

19 Claims, 41 Drawing Sheets

U.S. PATENT DOCUMENTS

| | | | | |
|---|---|---|---|---|
| 6,639,555 | B1 * | 10/2003 | Kane et al. | 343/700 MS |
| 6,765,541 | B1 * | 7/2004 | Josypenko | 343/895 |
| 2003/0076276 | A1 * | 4/2003 | Church et al. | 343/909 |
| 2003/0103011 | A1 * | 6/2003 | Rogers et al. | 343/749 |

OTHER PUBLICATIONS

Nakano, et al. Realization of Dual-Frequency and Wide-Band VSWR Performances using Normal-Mode Helical and Inverted-F Antennas. IEEE Trans. Antennas and Propagation. Jun. 1998. vol. 46. No. 6. Entire document. (Cited in above-referenced PCT International Search Report).

Altman, et al. New Designs of Ultra Wide-Band Communication Antennas using a Genetic Algorithm. IEEE Trans. Antennas and Propagation. Oct. 1997. vol. 45. No. 10. Entire document (Cited in above-referenced PCT International Search Report).

Johnson, et al. Genetic Algorithms in Engineering Electromagnetics. IEEE Antennas and Propagation Magazine. Aug. 1997. vol. 39. No. 4. Entire document. (Cited in above-referenced PCT International Search Report).

David L. Carroll/University of Illinois at Urbana. Chemical Laser Modeling With Genetic Algorithms. AIAA Journal. Feb. 1996, vol. 34, No. 2.

Shawn D. Rogers, et al./Department of Electrical and Computer Engineering/Clemson University. An Efficient Curved-Wire Integral Equation Solution Technique. IEEE Trans. Antennas Propagat.

Shawn David Rogers, *Efficient Numerical Techniques For Curved Wires*, A Thesis Presented to the Graduate School of Clemson University, Aug. 1997.

M. Ali, S.S. Stuchly, and K. Caputa, *Characteristics of bent wire antennas*, Journal of Electromagnetic Waves and Applications, vol. 9, No. 9, 1149-1162, 1995.

H. Nakano, *Helical and Spiral Antennas*, Chapter 6—*Helical Antenna of Endfire Mode**, John Wiley & Sons, Inc., New York, pp. 122-126, 1987.

Nathan J. Champagne, II, *Method Of Moments Formulations For Think Wire Antennas And Scatters Using Piecewise Linear And Curved Wire Segments*, M.S.E.E., A Thesis Presented to The Faculty of the Department of Electrical Engineering, University of Houston, Houston, TX, Aug. 1991.

* cited by examiner

DESIGNS FOR WIDE BAND ANTENNAS WITH PARASITIC ELEMENTS AND A METHOD TO OPTIMIZE THEIR DESIGN USING A GENETIC ALGORITHM AND FAST INTEGRAL EQUATION TECHNIQUE

PRIORITY CLAIM

This application claims the benefit of previously filed U.S. Provisional Application with the same titles and inventors as present, assigned U.S. Ser. No. 60/215,434, filed on Jun. 30, 2000, and which is incorporated herein by reference.

INCORPORATION BY REFERENCE OF MATERIAL SUBMITTED ON COMPACT DISC

A computer program listing appendix that includes a genetic algorithm utilized in accordance with aspects of the presently disclosed technology is contained on a submitted compact disc. Each of two identical copies of such compact disc includes a file named "CXU-339 Genetic Algorithm", dated Apr. 4, 2005 and having a size of 126 KB. The program listing contained in such file is hereby incorporated by reference for all purposes.

FIELD OF THE INVENTION

This technology provides a method (application) of an algorithm to facilitate the design of wideband operations of antennas, and the design of sleeve cage monopole and sleeve helix units. The technology is of interest/commercial potential throughout the audio communications community.

Omnidirectional capabilities and enhanced wideband capabilities are two desirable features for the design of many antenna applications. Designing omnidirectional antennas with wideband capabilities requires rapid resolution of complex relationship among antenna components to yield an optimal system. The invention comprises the use of a genetic algorithm with fitness values for design factors expressed in terms to yield optimum combinations of at least two types of antennas.

Cage antennas are optimized via a genetic algorithm (GA) for operation over a wide band with low voltage standing wave ratio (VSWR). Numerical results are compared to those of other dual band and broadband antennas from the literature. Measured results for one cage antenna are presented.

Genetic algorithms and an integral equation solver are employed to determine the position and lengths of parasitic wires around a cage antenna in order to minimize voltage standing wave ratio (VSWR) over a band. The cage is replaced by a normal mode quadrifilar helix for height reduction and the parasites are re-optimized. Measurements of the input characteristics of these optimized structures are presented along with data obtained from solving the electric field integral equation.

Genetic algorithms (Y. Rahmat-Samii and E. Michielssen, *Electromagnetic Optimizations by Genetic Algorithms*, New York: John Wiley and Sons, Inc., 1999) are used here in conjunction with an integral equation solution technique to determine the placement of the parasitic wires around a driven cage. The cage may be replaced by a quadrifilar helix operating in the normal mode in order to shorten the antenna. Measurements of these optimized structures are included for verification of the bandwidth improvements.

BACKGROUND OF THE INVENTION

Recent advances in modern mobile communication systems, especially those which employ spread-spectrum techniques such as frequency hopping, require antennas which have omnidirectional radiation characteristics, are of low profile, and can be operated over a very wide frequency range. The simple whip and the helical antenna operating in its normal mode appear to be attractive for this application because they naturally have omnidirectional characteristics and are mechanically simple. However, these structures are inherently narrow band and fall short of needs in this regard. Hence, additional investigations must be undertaken to develop methods to meet the wide bandwidth requirement of the communication systems.

BRIEF SUMMARY OF THE INVENTION

This invention comprises a method to design (produce) a product and the product(s) designed/produced as a result of the application of the method. The products are broadband, omnidimensional communications antennas, and the design procedure involves the coordinated, sequential application of two algorithms: a generally described "genetic algorithm that simulates population response to selection and a new algorithm that is a fast wire integral equation solver that generates optimal multiple antenna designs from ranges of data that limit the end product. Individual designs comprise a population of designs upon which a specified selection by the genetic algorithm ultimately identifies the optimum design(s) for specified conditions. Superior designs so identified can be regrouped and a new population of designs generated for further selection/refinement.

The products are the antenna designs and specifications derived as a product of the application of the method briefly described above. The antennas all are characterized generally as broadband and omnidirectional, two features of critical importance in antenna design. In addition, although much of the theory has been developed on monopole antennas, both the method and designs include both monopole and dipole designs. In addition, the designs include sleeve-cage and sleeve-helix designs as hereinbelow further described.

The cage monopole comprises four vertical, straight wires connected in parallel and driven from a common stalk at the ground plane. The parallel straight wires are joined by crosses made of brass (or other conductive) strips, the width of which is equal to the electrical equivalent of the wire radius. Compared to a single wire, this cage structure has a lower peak voltage standing wave ratio (VSWR) over the band. A structure with lower VSWR is amenable to improved bandwidth characteristics with the addition of parasitic elements.

We have found that the cage structure and multifilar helices are more amenable than single wire antennas to improvements in VSWR when parasitic wires are added. The helical configuration can be used to reduce the height of the antenna, but at the sacrifice of bandwidth. While the addition of the parasitic wires improves the overall bandwidth, the VSWR increases outside the design band. Fast integral equation solution techniques and optimization methods have been developed in the course of this work and have led to effective tools for designing broadband antennas.

Certain exemplary attributes of the invention may relate to a method to create optimum design specifications for omni-directional, wideband antennas comprising the steps of:

(a) loading software including a genetic algorithm and an executable algorithm that is a fast wire equation solver into a computer;

(b) loading instructions into said computer specifying basic antenna design to be optimized;

(c) loading antenna design parameters and corresponding ranges of values for said parameters into said computer;

(d) specifying resolution of said parameters by loading number of bits per parameter into said computer;

(e) executing (operating) said genetic algorithm thereby generating a population of individual antenna designs each with a fitness value; and (f) evaluating relative fitness of antenna designs produced and selecting superior designs for continued refinement.

The foregoing method may further comprise the following exemplary subroutines and algorithms for the software involved:

(a) a first algorithm that allows different values for critical design elements to combined in all possible combinations and a fitness value for each design ultimately estimated;

(b) a second algorithm that determines electronic current in an antenna by solving an integral equation numerically;

(c) a computer program link that provides essential communication between said first algorithm and said second algorithm.

Certain exemplary attributes of the invention may further relate to the sleeve monopole antenna designs, the cage sleeve monopole antenna designs, and the sleeve dipole antenna designs produced following the foregoing methods. Those of ordinary skill in the art will appreciate that various modifications and variations may be practiced in particular embodiments of the subject invention in keeping with the broader principles of the invention disclosed herein. The disclosures of all the citations herein referenced are fully incorporated by reference to this disclosure.

BRIEF DESCRIPTION OF THE SEVERAL VIEWS OF THE DRAWINGS

A full and enabling description of the presently disclosed subject matter, including the best mode thereof, directed to one of ordinary skill in the art, is set forth in the specification, which makes reference to the appended figures, in which.

DETAILED DESCRIPTION OF THE PREFERRED EMBODIMENTS

Figure 1A:
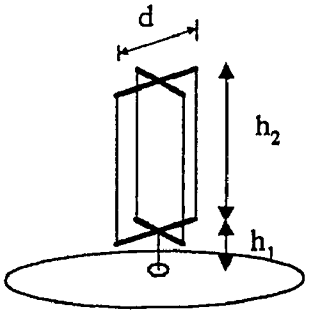
FIG. 1A is a perspective view of an exemplary cage monopole antenna embodiment in accordance with the presently disclosed technology.
Figure 1B:
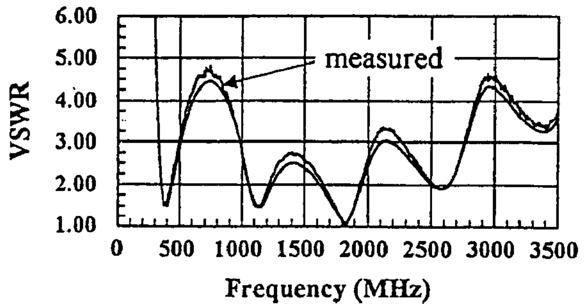
FIG. 1B is a graphical representation of the voltage standing wave ratio (VSWR) versus frequency for the exemplary cage monopole antenna of FIG. 1A.
Figure 1C:
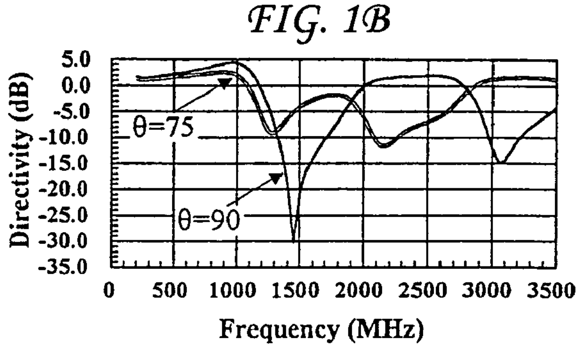
FIG. 1C is a graphical representation of the directivity versus frequency for the exemplary cage monopole antenna of FIG. 1A.

We modeled and measured the properties of a so-called cage monopole. The cage monopole shown in FIG. 1A consists of four vertical straight wires connected in parallel and driven from a common stalk at the ground plane. The ground plane in this model is assumed to be of infinite extent to facilitate analysis. The parallel straight wires are joined by crosses constructed of brass strips. The strip width was selected to be electrically equivalent to the wire radius for the purpose of modeling the structure. Compared to a single, thin, straight wire, the cage structure with multiple wires has a lower peak voltage standing wave ratio (VSWR) over the band. This is important since a structure which has a comparatively small VSWR over a band is more amenable to improvements in bandwidth with the addition of other components such as loads or parasites than is the common single-wire monopole with higher VSWR.

Figure 2A:
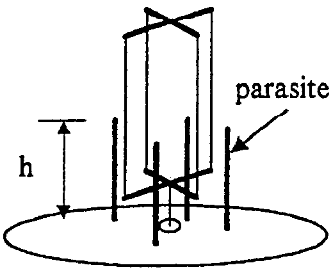
FIG. 2A is a perspective view of an exemplary sleeve-cage monopole antenna embodiment in accordance with the presently disclosed technology.
Figure 2B:
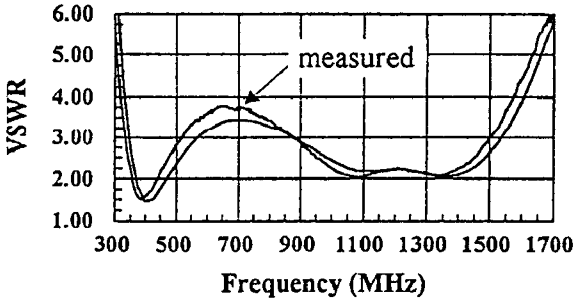
FIG. 2B is a graphical representation of the voltage standing wave ratio (VSWR) versus frequency for the exemplary sleeve-cage monopole antenna of FIG. 2A.
Figure 2C:
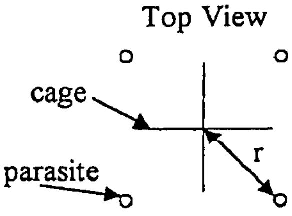
FIG. 2C is a top view of an exemplary sleeve-cage monopole antenna embodiment in accordance with the presently disclosed technology.
Figure 2D:
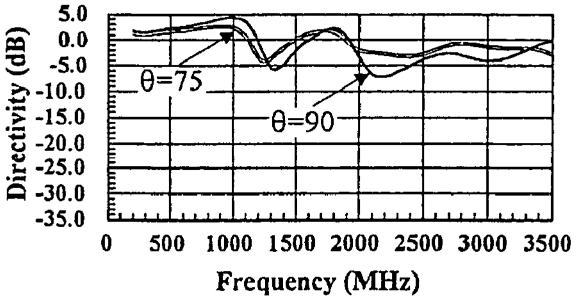
FIG. 2D is a graphical representation of the directivity versus frequency for the exemplary sleeve-cage monopole antenna of FIG. 2C.
Figure 3A:
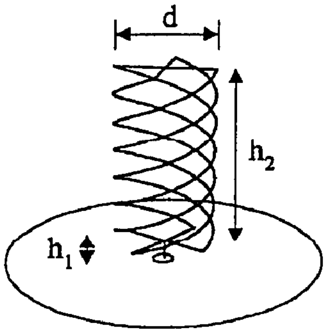
FIG. 3A is a perspective view of an exemplary quadrifilar helix antenna embodiment in accordance with the presently disclosed technology.
Figure 3B:
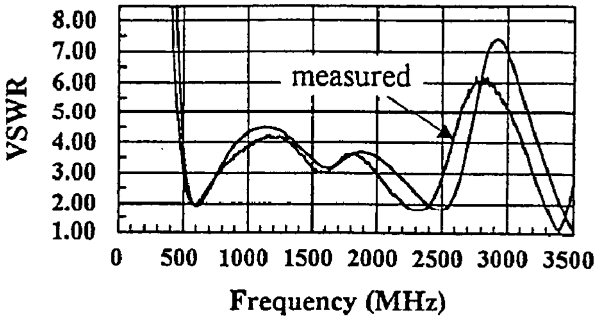
FIG. 3B is a graphical representation of the voltage standing wave ratio (VSWR) versus frequency for the exemplary quadrifilar helix antenna of FIG. 3A.
Figure 3C:
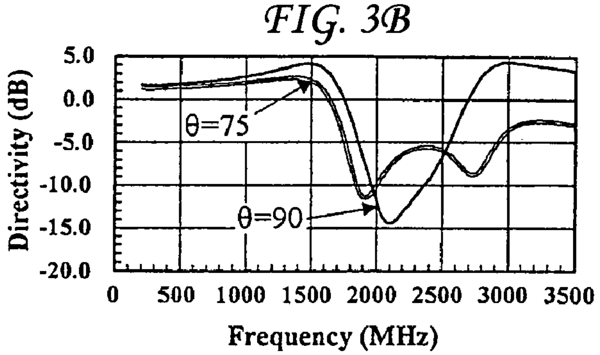
FIG. 3C is a graphical representation of the directivity versus frequency for the exemplary quadrifilar helix antenna of FIG. 3A.
Figure 4A:
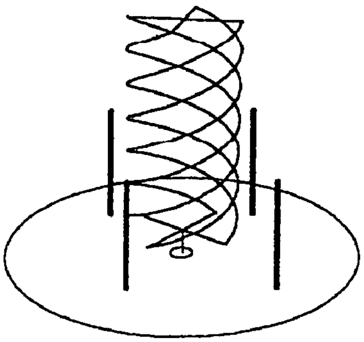
FIG. 4A is a perspective view of an exemplary sleeve helix antenna embodiment in accordance with the presently disclosed technology.
Figure 4B:
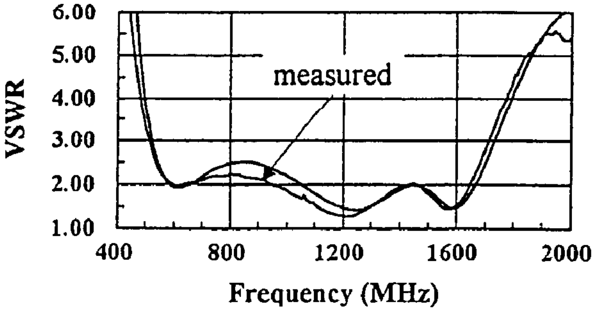
FIG. 4B is a graphical representation of the voltage standing wave ratio (VSWR) versus frequency for the exemplary sleeve helix antenna of FIG. 4A.
Figure 4C:
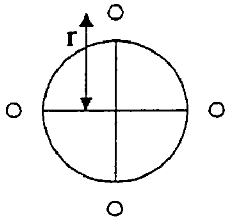
FIG. 4C is a perspective view of an exemplary sleeve helix antenna embodiment in accordance with the presently disclosed technology.
Figure 4D:
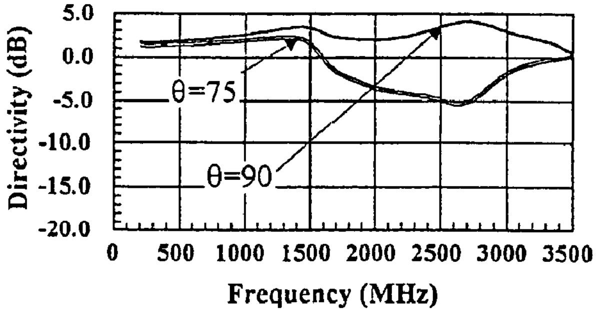
FIG. 4D is a graphical representation of the directivity versus frequency for the exemplary sleeve helix antenna of FIG. 4C.

Next we add four parasitic straight wires of equal height (h) and distance (r) from the center of the cage to create the so-called "sleeve-cage monopole" of FIG. 2A. A genetic algorithm (GA) is used to determine the optimum distance and height of these parasitic straight wires. In this example the fitness value assigned to each antenna in the optimization process is the bandwidth ratio defined by $f_2/f_1$, where $f_2$ and $f_1$ are, respectively, the largest and smallest frequencies between which the VSWR is 3.5 or less. We interpolate the impedance matrix with respect to frequency in order to increase the speed of the optimization process. To design antennas that are smaller, we turn our attention to the normal mode helix, since, for operation about a given frequency, it can be made shorter than the vertical whip by adjustment of the pitch angle. Also, we observe a decrease in the peak VSWR when additional filaments are added to the helix driven from a central straight wire. Generally, a normal mode helix will exhibit electrical properties similar to those of a straight wire having the same wire length, though the peak VSWR for the helix is usually greater. The quadrifilar helix of FIG. 3A whose height is 9.8 cm can be used in the same bands as a cage monopole of height about 14 cm. Thus, the total height of the antenna can be reduced by 30% with the 42° pitch angle. Parasitic straight wires of optimum height and distance are added to create what we call the "sleeve helical monopole" shown in FIG. 4A.

As one can see from the VSWR data, good agreement is achieved between predictions computed by means of our numerical techniques and results measured on a model mounted over a large ground plane. The frequency range over which data are presented is dictated by the frequencies over which our ground plane is electrically large. The slight discrepancies in the computed and measured results are attributed to imprecision in the construction of the antennas. The predicted results of bandwidth and VSWR of each antenna are summarized in Table 1 below.

TABLE 1

| Structure | VSWR | BW Ratio | BW % | Frequency Range (MHz) | Height (cm) | Width (cm) |
|---|---|---|---|---|---|---|
| Cage | <5.0 | 11.7:1 | 312 | 300–3500 | 17.2 | 2.2 |
| monopole | <3.5 | 3:1 | 115 | 950–2850 | | |
| Sleeve-cage | <5.0 | 5.2:1 | 185 | 315–1650 | 17.2 | 5 |
| monopole | <3.5 | 4.4:1 | 163 | 350–1550 | | |
| Quadri-filar | <5.0 | 5.8:1 | 199 | 475–2750 | 9.8 | 2 |
| helix | <3.5 | 1.6:1 | 47 | 500–800 | | |
| Sleeve | <5.0 | 3.9:1 | 147 | 475–1850 | 9.8 | 6 |
| helix | <3.5 | 3.5:1 | 134 | 500–1750 | | |

We point out that when the parasitic elements are added to each structure, the bandwidth ratio increases for the VSWR<3.5 requirement. However, outside of this frequency range the VSWR is worse than that of the antenna without parasites. In other words, VSWR has, indeed, been improved markedly over the design range but at a sacrifice in performance outside the range, where presumably the antenna would not be operated. Also, notice that the deep nulls in the directivity at the horizon for the cage and the quadrifilar helix structures have been eliminated with the addition of the parasites. Thus the directivity is improved in the band where on the basis of VSWR this antenna is deemed operable, although there was no constraint on directivity specified in the objective function.

Cage Antennas Optimized for Bandwidth

Figure 5A:
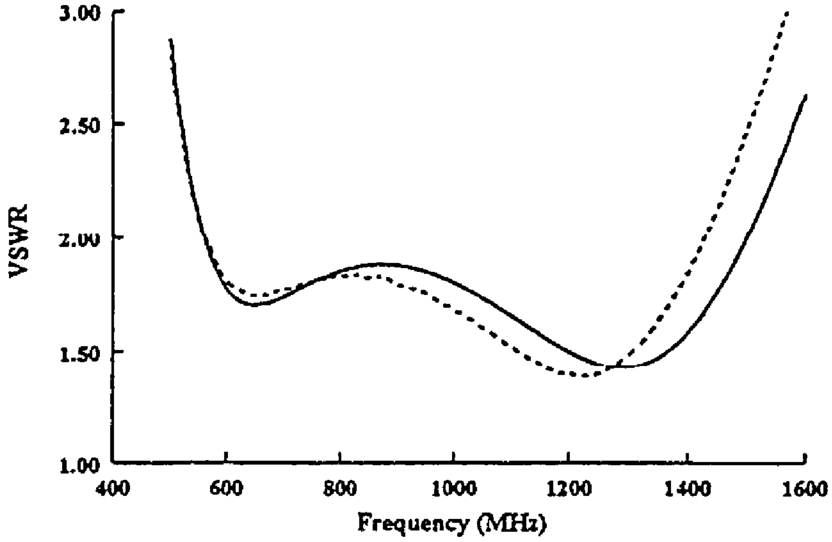
FIG. 5A is a graphical representation of VSWR versus frequency for a cage antenna optimized for VSWR<2.0.
Figure 5B:
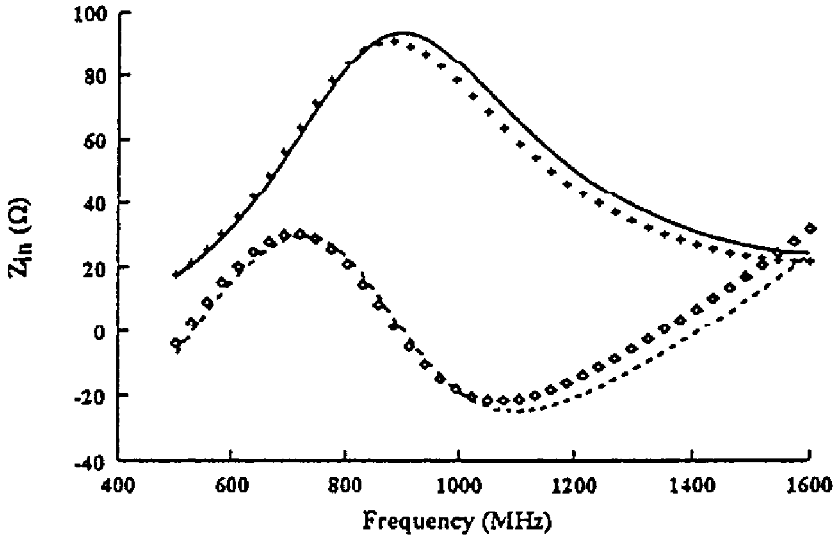
FIG. 5B is a graphical representation of input impedance versus frequency for a cage antenna optimized for VSWR<2.0.
Figure 7A:
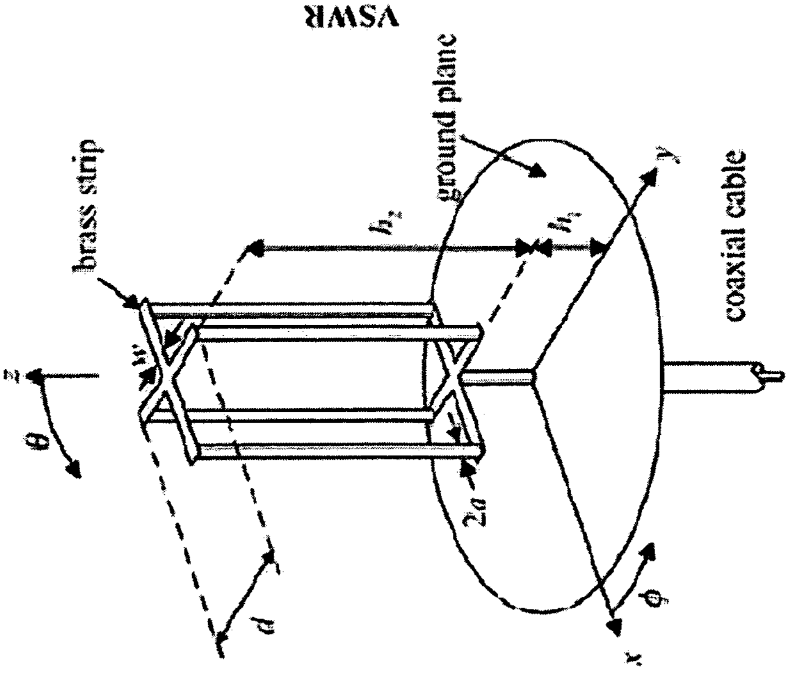
FIG. 7A is a perspective view of an exemplary cage monopole antenna embodiment in accordance with the presently disclosed technology, having dimensions a=0.814 mm, d=2.2 cm, w=3.256 mm, $h_1$=1.2 cm, $h_2$=16 cm and $Z_0$=50 Ω.

The antenna whose characteristics are represented in FIGS. 5A and 5B is optimized for a design goal of VSWR<2.0 over the frequency band 500 to 1600 MHz. The cage antenna is depicted in FIG. 7A where one sees four vertical wires joined to the feed and stabilized by thin brass strips of width w. The strips are treated as wires of radius a=w/4. A GA is applied to optimize the diameter (d) of the cage structure and the length ($h_2$) of the wires in the cage. Each function evaluation consists of numerically solving the electric field integral equation for the cage geometry (having dimensions chosen by the GA) over the band of interest. Candidate antennas are given a fitness score equal to the bandwidth ratio $f_h/f_1$, where $f_l$ is the lowest and $f_h$ is the highest frequency of operation over a band where the VSWR meets the design goal.

The antenna whose characteristics are represented in FIGS. 5A and 5B is optimized for a design goal of VSWR<2.0 over the frequency band 500 to 1600 MHz. The GA picks the parameter d from a range of 1 cm to 5 cm with a resolution of 0.13 cm (5 bits, 32 possibilities). The range specified for parameter $h_2$ is 8 cm to 12 cm with a resolution of 0.27 cm (4 bits, 16 possibilities). The GA converges to an optimum solution after three generations with five antennas per generation. A sensitivity analysis reveals that antenna input characteristics change only modestly with small geometric variation. The directivity of this cage antenna for $\phi=0°$ and $\phi=75°,90°$ is above 4 dBi over the entire band. The properties of this antenna and those of Nakano's helical, which is designed to operate with VSWR<2.0 in two frequency bands, are listed in Table 2 for comparison.

TABLE 2

| Structure | Cage (FIG. 6) | HX-MP | Cage (FIG. 7) | Sleeve Dipole |
|---|---|---|---|---|
| VSWR | <2 | <3.5 | <2.5 | <2.5 |
| Bandwidth Ratio | 2.6 | 1.7 | 5.4 | 1.8 |
| f (MHz) | 575–1500 | 627–1048 | 210–1130 | 225–400 |
| Height (cm) | 10.3 | 19.8 | 26.55 | 51 |
| Width (cm) | 4.7 | 0.47 | 8.2 | 13 |
| Wire radius (mm) | 0.814 | 0.3 | 3.175 | 14.3 |

Figure 6A:
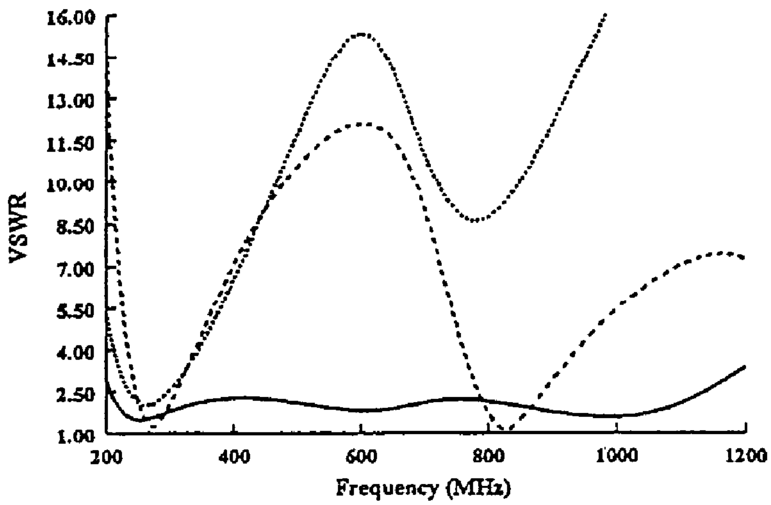
FIG. 6A is a graphical representation of VSWR versus frequency for a cage antenna optimized for VSWR<2.5.
Figure 6B:
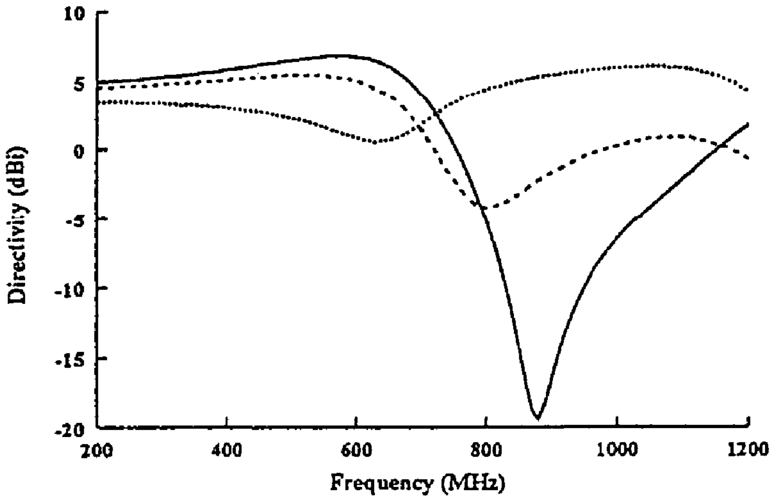
FIG. 6B is a graphical representation of directivity versus frequency for a cage antenna optimized for VSWR<2.5.

The antenna whose characteristics are represented in FIGS. 6A and 6B is optimized for a design goal of VSWR<2.5 in the frequency range 200 to 1200 MHz. This range is chosen for comparison of the cage antenna to the open sleeve dipole which operates over the frequency range 225 to 400 MHz. The GA is allowed to choose parameter d from 1 cm to 10 cm with a resolution of 0.6 cm (4 bits, 16 possibilities). The parameter $h_2$ is selected from 20 cm to 25 cm with a resolution of 0.33 cm (4 bits, 16 possibilities). An optimum result is reached after 11 generations with five antennas per generation. This cage monopole is not useful over the entire frequency range for which its VSWR is less than 2.5 since there is a null in the directivity within this range. It is operable over a 3.6:1 bandwidth for VSWR less than 2.5 and directivity greater than 0 dBi. In Table 2 are listed the properties of the cage antenna together with those of the sleeve dipole.

Cage Monopole and Sleeve-Cage Monopole

Figure 7B:
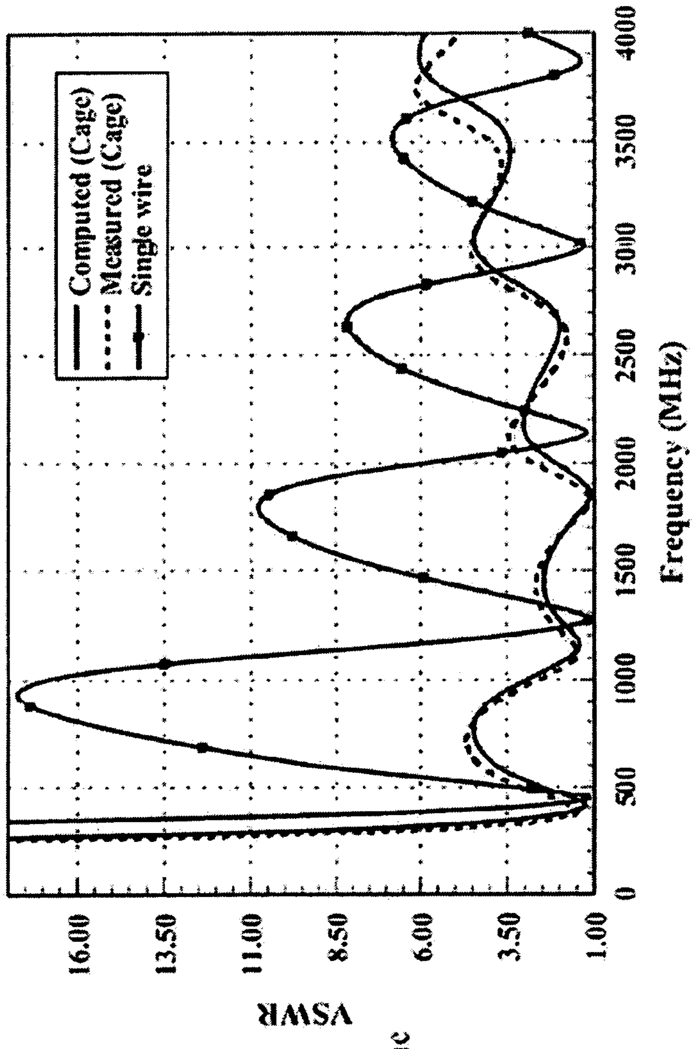
FIG. 7B is a graphical representation of VSWR versus frequency for the exemplary cage monopole antenna of FIG. 7A.
Figure 7C:
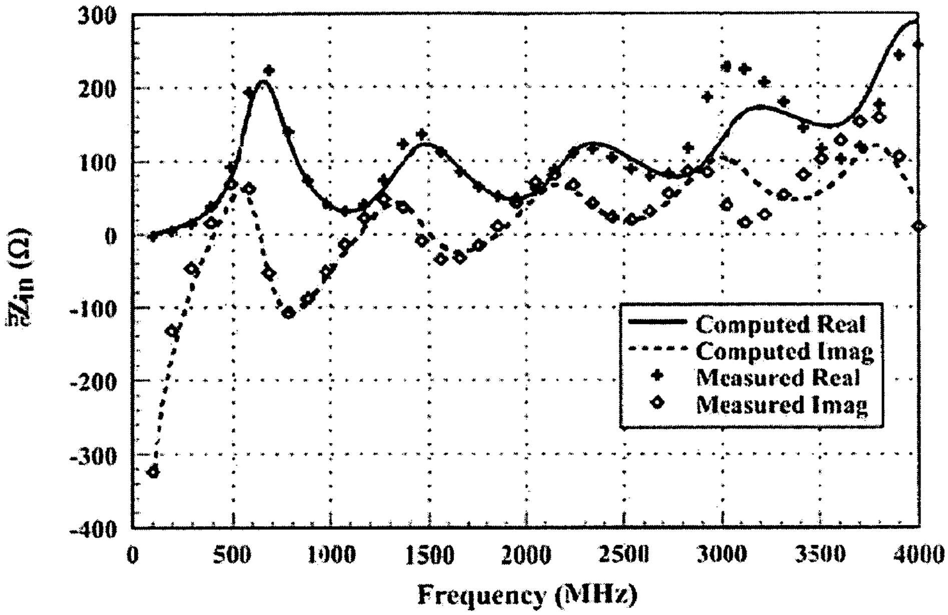
FIG. 7C is a graphical representation of the input impedance versus frequency for the exemplary cage monopole antenna of FIG. 7A.
Figure 7D:
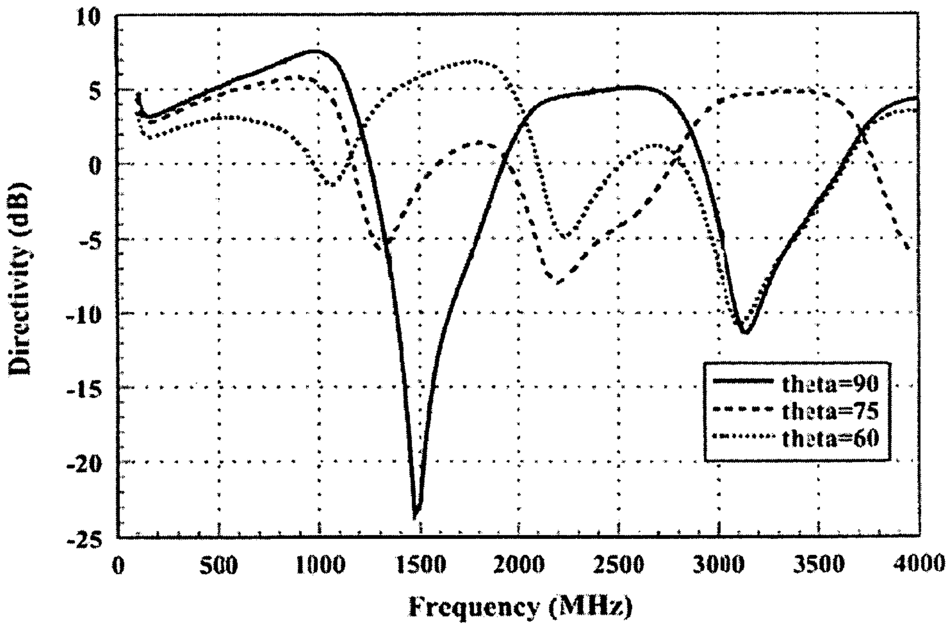
FIG. 7D is a graphical representation of the directivity versus frequency for the exemplary cage monopole antenna of FIG. 7A.

The cage monopole shown in FIG. 7A consists of four vertical straight wires connected in parallel and driven from a common wire which is the extension of the center conductor of a coaxial cable protruding from the ground plane. The ground plane in this model is assumed to be of infinite extent in the analysis of the structure. The parallel straight wires are joined by crosses constructed of brass strips. The strip width w was selected to be electrically equivalent to the wire radius a for the purpose of modeling the structure (w=4 a). Compared to a single, thin, straight wire, the cage structure with multiple wires has a lower peak VSWR over the band as seen in FIG. 7B. This is important since a structure which has a comparatively small VSWR over a band is more amenable to improvements in bandwidth with the addition of other components such as loads or parasites than is the common single-wire monopole with higher VSWR.

Figure 8B:
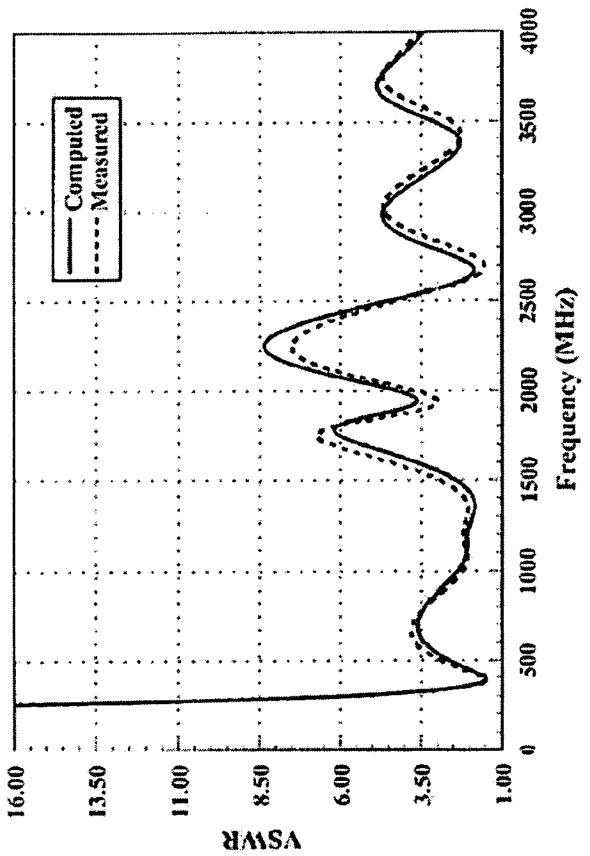
FIG. 8B is a graphical representation of VSWR versus frequency for the exemplary sleeve-cage monopole antenna of FIG. 8A.
Figure 8A:
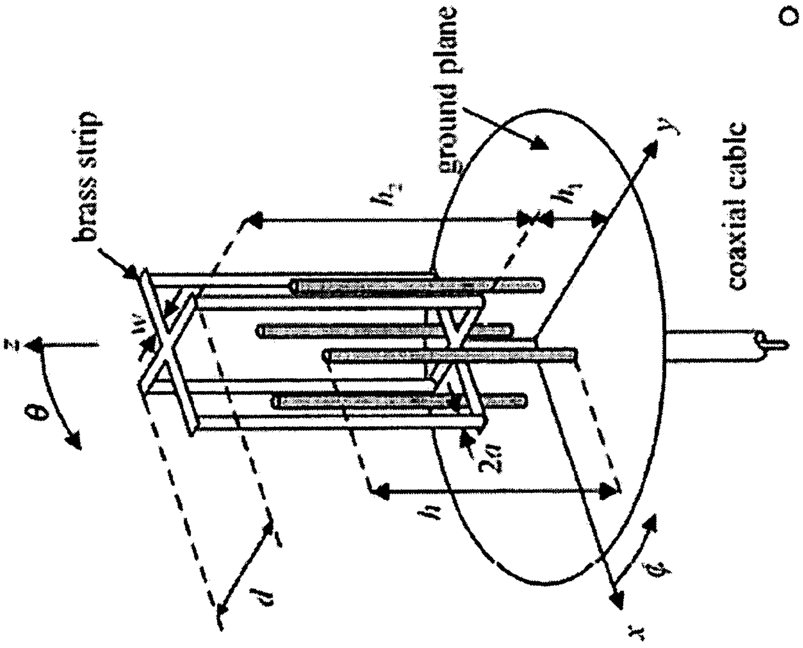
FIG. 8A is a perspective view of an exemplary sleeve-cage monopole antenna embodiment in accordance with the presently disclosed technology, having dimensions a=0.814 mm, d=2.2 cm, w=3.256 mm, $h_1$=1.2 cm, $h_2$=16 cm, r=2.5 cm, h=4 cm, and $Z_0$=50 Ω.
Figure 8E:
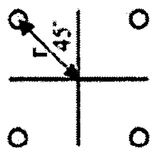
FIG. 8E is a top view of the exemplary sleeve-cage monopole antenna of FIG. 8A.
Figure 8C:
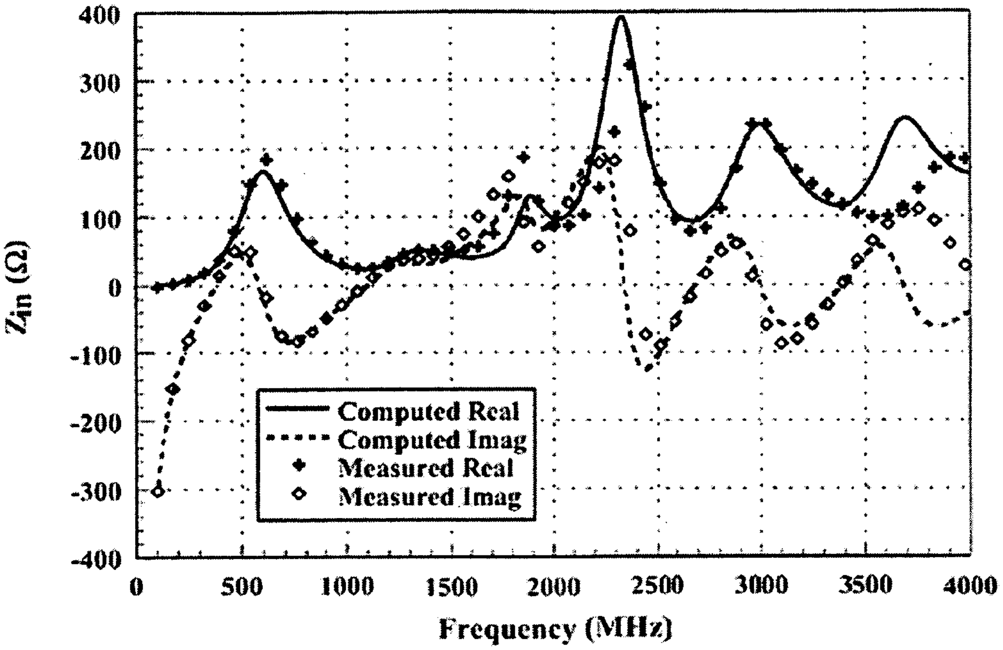
FIG. 8C is a graphical representation of the input impedance versus frequency for the exemplary sleeve-cage monopole antenna of FIG. 8A.
Figure 8D:
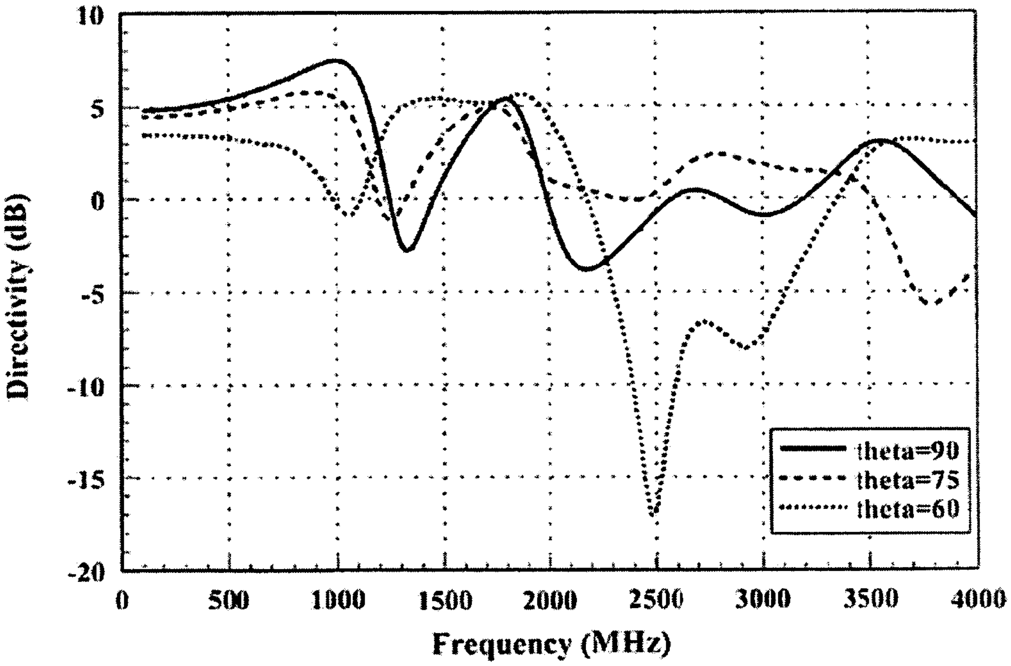
FIG. 8D is a graphical representation of the directivity versus frequency for the exemplary sleeve-cage monopole antenna of FIG. 8A.

Four parasitic straight wires of equal height (h) and radial distance (r) from the center line of the cage are added to create the so-called "sleeve-cage monopole" of FIG. 8A. A GA is used to determine optimum values of h and r for given design goals. An objective function evaluation for one antenna in the GA population involves numerically solving the electric field integral equation for many frequencies within the band of interest. Since this must be done for many candidate antennas, it is advantageous to interpolate the integral equation impedance matrix elements with respect to frequency. Each candidate structure is assigned a fitness value based on its electrical properties. A simple fitness value used here is the antenna bandwidth ratio which measures the performance of the antenna over a frequency band of interest denoted by $[f_A, f_B]$. The bandwidth ratio for a particular antenna is considered a function of its geometry and is computed from $$F(h, r) = \frac{f_2}{f_1}$$

where $$f_1 = \min_{f\in[f_a,f_B]}(f) \text{ such that } VSWR(f) \le \text{limit}$$

$$\text{and } f_2 = \max_{f\in[f_1,f_B]}(f) \text{ such that } VSWR(f) \le \text{limit for all } f \in [f_1, f_2].$$

Another viable fitness value is the percent bandwidth defined here as $$\%\ BW = 100\frac{f_2 - f_1}{\sqrt{f_2 f_1}}.$$

Quadrifilar Helix and Sleeve Helix

Figure 9B:
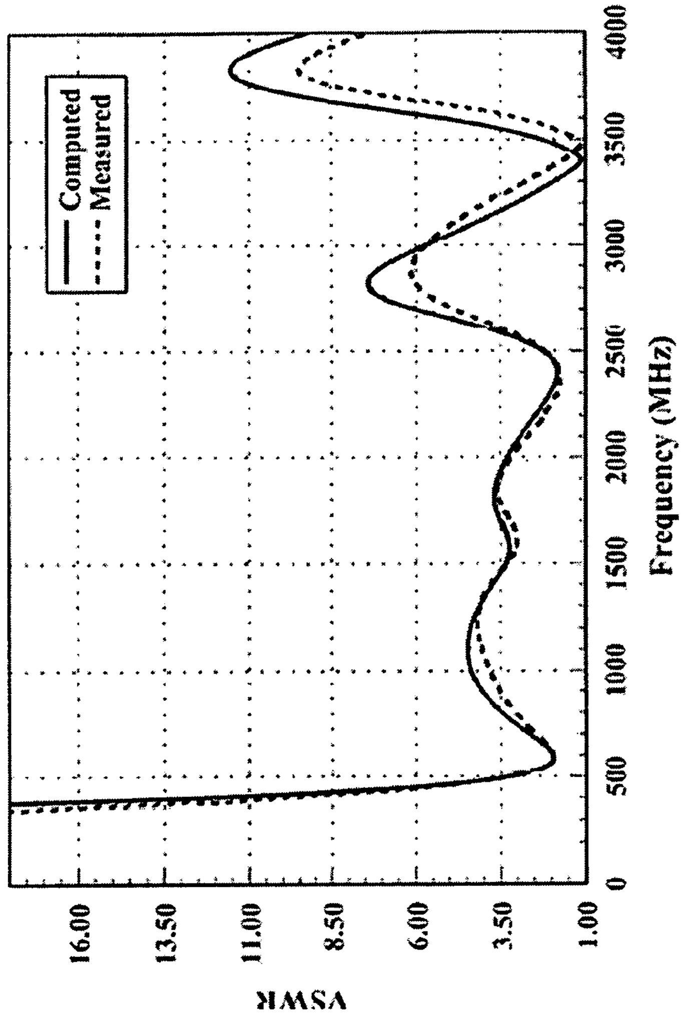
FIG. 9B is a graphical representation of measured and computed VSWR versus frequency for the exemplary quadrifilar helical antenna of FIG. 9A.
Figure 9A:
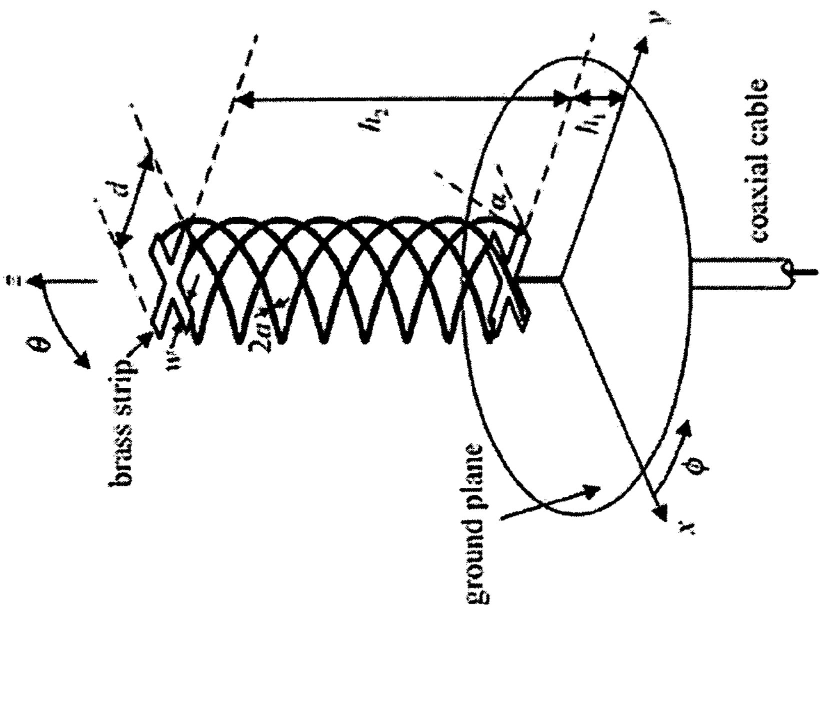
FIG. 9A is a perspective view of an exemplary quadrifilar helical antenna embodiment in accordance with the presently disclosed technology, having dimensions a=0.814 mm, d=2 cm, w=3.256 mm, $h_1$=0.91 cm, $h_2$=8.85 cm, $Z_0$=50 Ω.
Figure 9C:
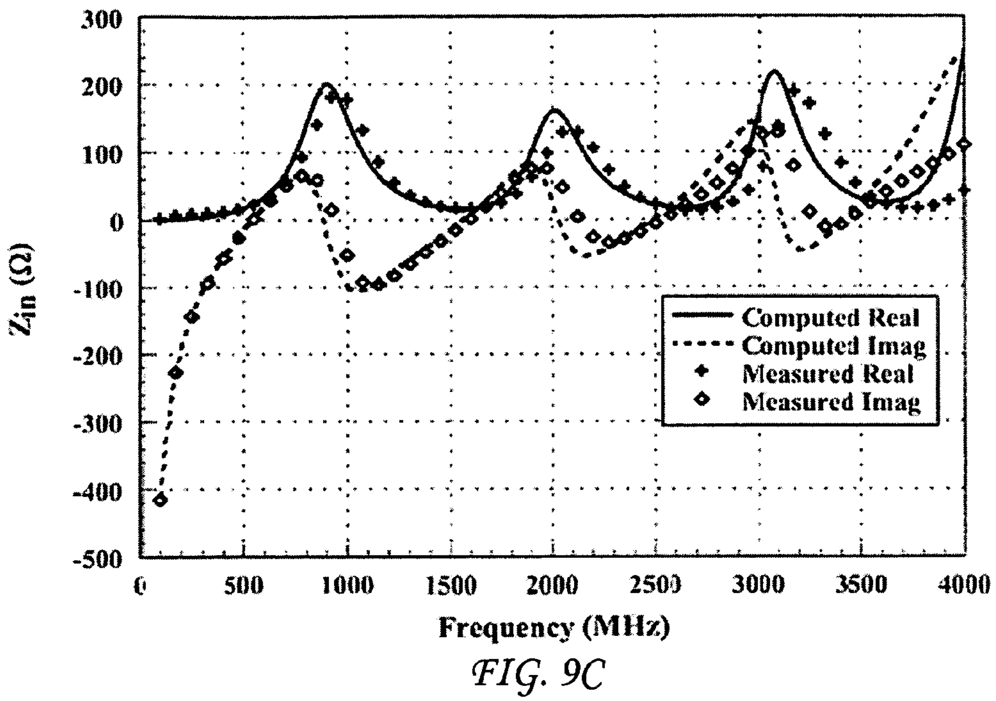
FIG. 9C is a graphical representation of the measured and computed input impedance versus frequency for the exemplary quadrifilar helical antenna of FIG. 9A.
Figure 9D:
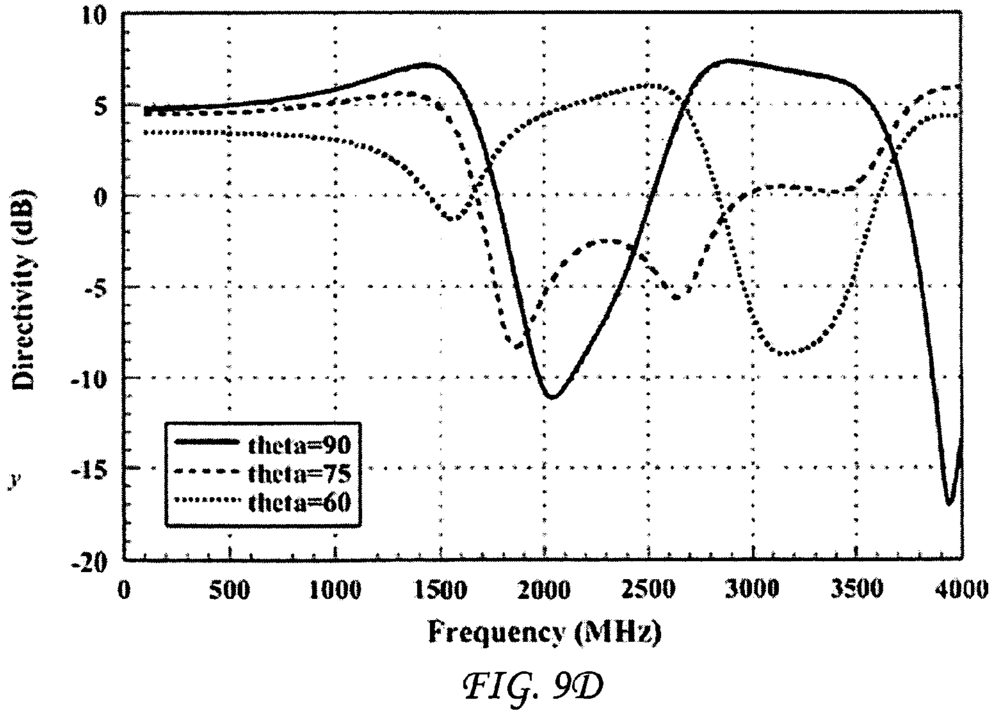
FIG. 9D is a graphical representation of the computed directivity (ϕ=0) versus frequency for the exemplary quadrifilar helical antenna of FIG. 9A.
Figure 10A:
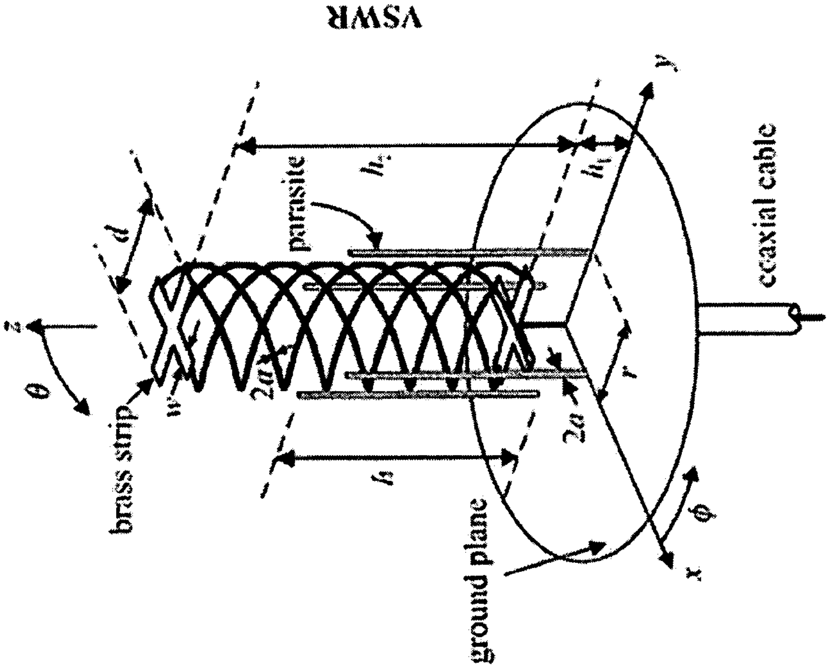
FIG. 10A is a perspective view of an exemplary sleeve helical antenna embodiment in accordance with the presently disclosed technology, having dimensions a=0.814 mm, d=2 cm, w=3.256 mm, $h_1$=0.91 cm, $h_2$=8.85 cm, $Z_0$=50 Ω.
Figure 10B:
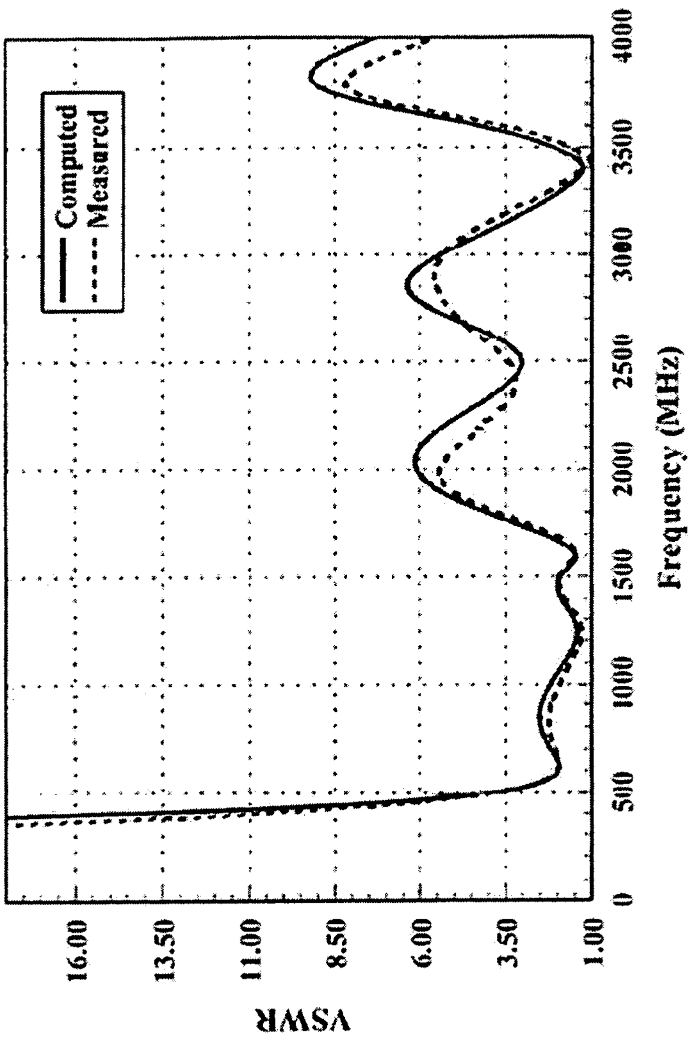
FIG. 10B is a graphical representation of measured and computed VSWR versus frequency for the exemplary sleeve helical antenna of FIG. 10A.
Figure 10C:
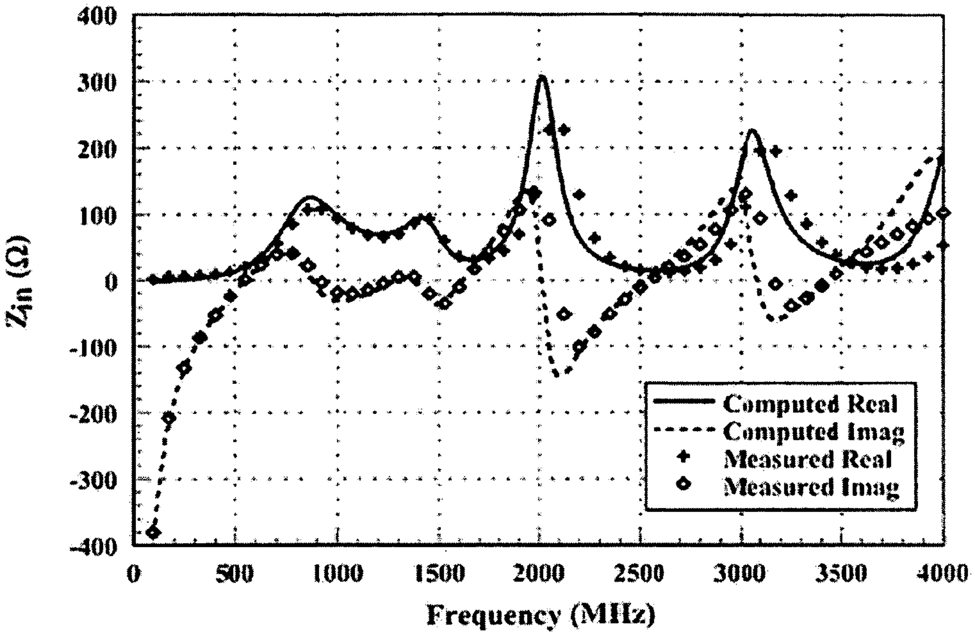
FIG. 10C is a graphical representation of the measured and computed input impedance versus frequency for the exemplary sleeve helical antenna of FIG. 10A.
Figure 10D:
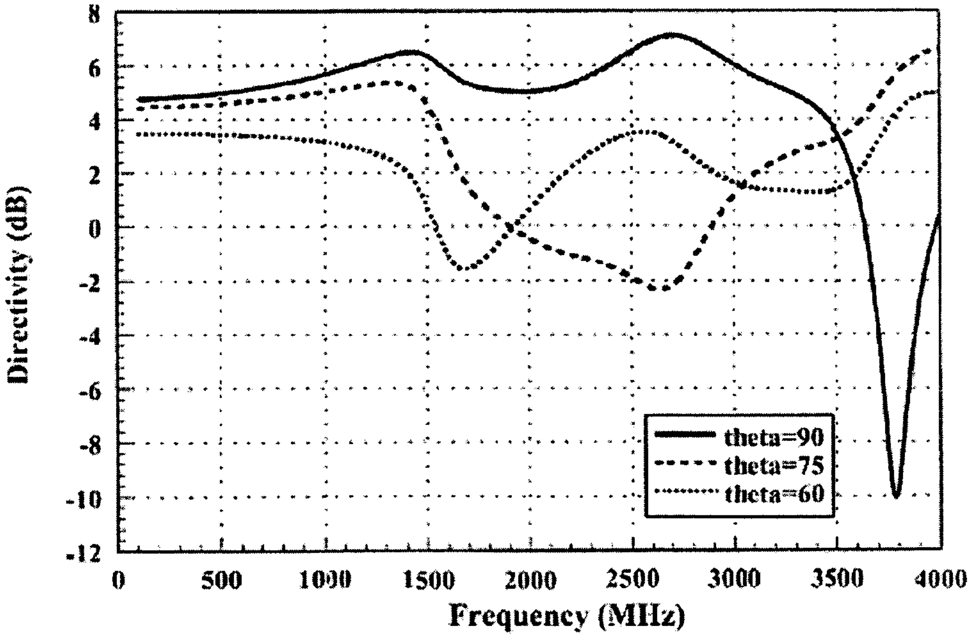
FIG. 10D is a graphical representation of the computed directivity (ϕ=0) versus frequency for the exemplary sleeve helical antenna of FIG. 10A.

To design low profile antennas, we turn our attention to the normal mode helix, since, for operation about a given frequency, it can be made shorter than the vertical whip by adjustment of the helix pitch angle. Generally, a normal mode helix will exhibit electrical properties similar to those of a straight wire having the same wire length, though the peak VSWR for the helix is usually greater. The helix exhibits vertical polarization as long as it operates in the normal mode. There is a decrease in the peak VSWR, relative to that of a single-wire helix, when additional helical filaments are added to one driven from a central straight wire. The quadrifilar helix of FIG. 9A whose height is 9.8 cm can be used in the same bands as a cage monopole of height about 14 cm. Thus, the total height of the antenna can be reduced by 30% with the 42° pitch angle. Parasitic straight wires of optimum height and distance are added to create what we call the "sleeve helical monopole" shown in FIG. 10A. Most integral equation solution techniques for the helix are, in general, more computationally expensive since these require many basis functions to represent the vector direction of the current along the meandering wire. A solution procedure which uncouples the representation of the geometry from the representation of the unknown current is used here to reduce the time in optimization of antennas with curved wires.

As one can see from the VSWR data, good agreement is achieved between predictions computed by means of numerical techniques and results measured on a model mounted over a large ground plane. The frequency range over which our experiments are conducted is dictated by the frequencies over which the ground plane is electrically large. Of course, the dimensions of the antenna may be scaled for use in other bands. The slight discrepancies in the computed and measured results are attributed to the difficulty in building the antenna to precise dimensions. However, a sensitivity analysis reveals that the antenna performance changes minimally with small variations in geometry. The reflection coefficient is measured at the input of the coaxial cable driving the monopoles and of a shorted section of coaxial line having the same length. Applying basic transmission line theory to these data, one can determine the measured input impedance of the antenna with the reference "at the ground plane." All VSWR data is for a 50Ω system. As the feed point properties of the various antennas are evaluated, we must also keep in mind the radiation properties of the antenna, so computed directivity is included herein. The predicted results of bandwidth and VSWR of each antenna are summarized in Table 1.

We point out that, when the parasitic elements are added to each structure, the bandwidth ratio increases for the VSWR<3.5 requirement. However, outside of this frequency range the VSWR is worse than that of the antenna without parasites. In other words, VSWR has, indeed, been improved markedly over the design range but at a sacrifice in performance outside the range, where presumably the antenna would not be operated. Also, notice that the deep nulls in the directivity at the horizon for the cage and the quadrifilar helix structures have been eliminated with the addition of the parasites. Thus the directivity is improved in the band where, on the basis of VSWR, this antenna is deemed operable, although there was no constraint on directivity specified in the objective function.

A summary and comparison of the results for the various antenna structures represented in FIGS. 7A, 8A, 9A and 10A as well as Nakano's Helix Monopole and a SINCGARS dipole antenna that was developed and produced by ITT for the Army is included in the following Table 3.

TABLE 3

| Structure | VSWR | BW Ratio $\frac{f_1}{f_2}$ | BW % $100\frac{(f_1 - f_2)}{\sqrt{f_1 f_2}}$ | Frequency Range (MHZ) | Height (cm) | Width (cm) |
|---|---|---|---|---|---|---|
| Cage monopole | <3.5 | 3:1 | 115 | 950–2850 | 17.2 | 2.2 |
| Sleeve-cage monopole | <3.5 | 4.4:1 | 163 | 350–1550 | 17.2 | 5 |
| Quadrifilar helix | <3.5 | 1.6:1 | 47 | 500–800 | 9.8 | 2 |
| Sleeve helix | <3.5 | 3.5:1 | 134 | 500–1750 | 9.8 | 6 |
| SINCGARS Antenna | <3.5 | 2.9 | 112 | 30–88 | 280 | 2 |
| Nakano's Helix Monopole | <3.5 | 1.7 | 52 | 627–1048 | 19.8 | 0.4 |

Figure 48A:
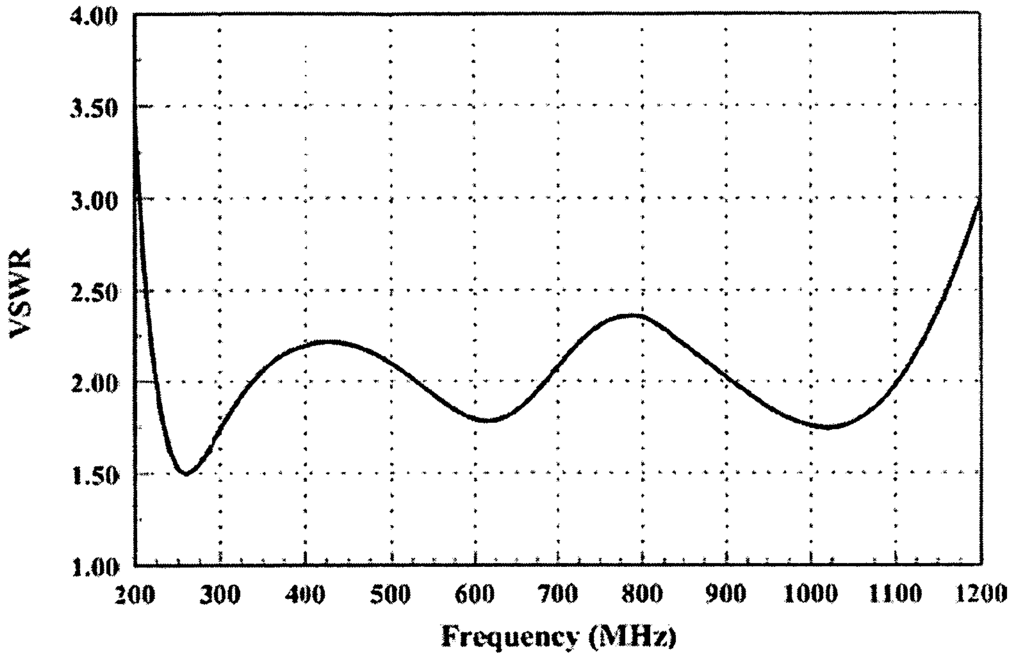
FIG. 48A is a graphical representation of VSWR versus frequency for cage monopole antenna optimization for VSWR<2.5.
Figure 48B:
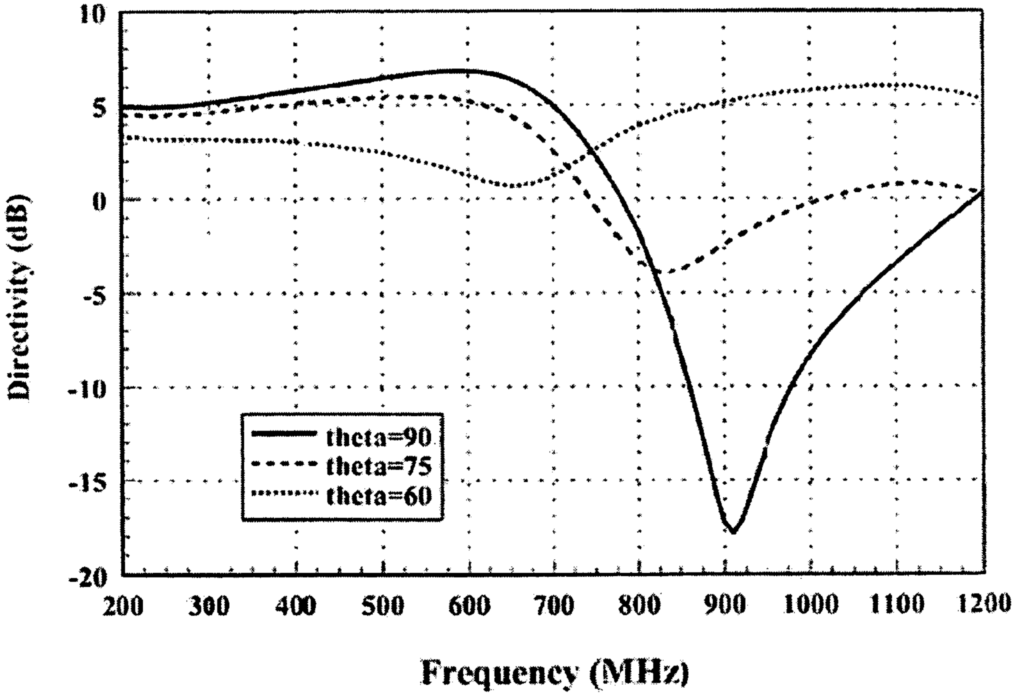
FIG. 48B is a graphical representation of directivity versus frequency for cage monopole antenna optimization for VSWR<2.5.

Additional results are now presented for the antenna of FIG. 7A with optimization for VSWR of less than 2.5. An antenna is tested having the following parameters: a=3.175 mm, d=7.6 cm, w=1.27 cm, $h_1$=2.55 cm and $h_2$=22.95 cm. As seen in the graph of FIG. 48A, a VSWR of less than 2.5 is achieved over a frequency band of 212–1155 MHz, resulting in a bandwidth ratio of 5.5:1. FIG. 48B shows the directivity versus frequency for the same antenna for different angles of theta (θ). A summary and comparison of results for the optimization with VSWR<2.5 described above is listed in Table 4 below.

TABLE 4

| Structure | VSWR | BW Ratio $\frac{f_1}{f_2}$ | BW % $100\frac{(f_1 - f_2)}{\sqrt{f_1 f_2}}$ | Frequency Range (MHZ) | Height (cm) | Width (cm) |
|---|---|---|---|---|---|---|
| King's open sleeve dipole | <2.5 | 1.77 | 58.3 | 225–400 | 51 | 13 |
| NTDR Antenna | <2.5 | 2.0 | 70 | 225–450 | 200 | 6.4 |
| Cage monopole | <2.5 | 3.7 | 139 | 212–775 | 25.5 | 7.6 |

Figure 49A:
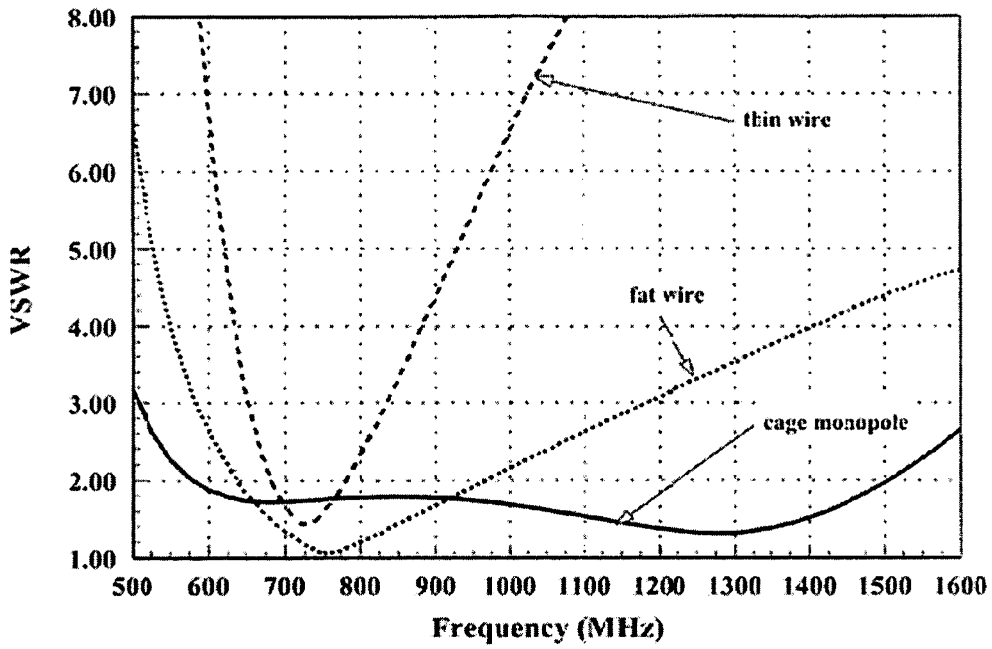
FIG. 49A is a graphical representation of VSWR versus frequency for cage monopole antenna optimization for VSWR<2.0.
Figure 49B:
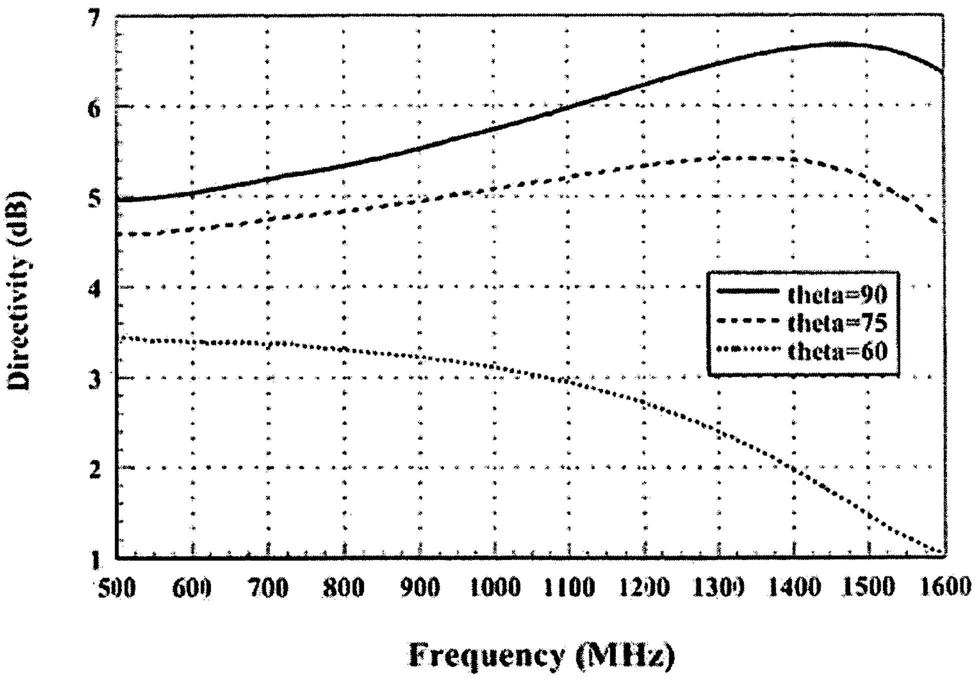
FIG. 49B is a graphical representation of directivity versus frequency for cage monopole antenna optimization for VSWR<2.0.

Additional results are now presented for the antenna of FIG. 7A with optimization for VSWR of less than 2.0. An antenna is tested having the following parameters: a=0.814 mm, d=4.8 cm, w=3.256 cm, $h_1$=1 cm and $h_2$=9 cm. Results are presented in FIG. 49A for the described cage monopole antenna as well as for thin straight wire antenna and a fat straight wire antenna. As seen in the graph of FIG. 49A, a VSWR of less than 2.0 is achieved over a frequency band of 575–1500 MHz, resulting in a bandwidth ratio of 2.6:1. FIG. 49B shows the directivity versus frequency for the same antenna for different angles of theta (θ). A summary and comparison of results for the optimization with VSWR<2.0 described above is listed in Table 5 below.

TABLE 5

| Structure | VSWR | BW Ratio $\frac{f_1}{f_2}$ | BW % $100\frac{(f_1 - f_2)}{\sqrt{f_1 f_2}}$ | Frequency Range (MHZ) | Height (cm) | Width (cm) | α (mm) |
|---|---|---|---|---|---|---|---|
| Nakano's Helix | <2.0 | 1.14 | 13.44 | 662–757 | 19.8 | 0.4 | 0.015, |
| Monopole | <2.0 | 1.05 | 5.78 | 957–1014 | | | 0.003 |
| Cage monopole | <2.0 | 3.7 | 139 | 212–775 | 25.5 | 7.6 | 0.814 |

Conclusions from the above numerical results include recognition that cage structures can be optimized for lower VSWR, parasites of optimum size and placement improve VSWR of driven antenna, helical elements reduce height at sacrifice of bandwidth, and wire radius is an important parameter.

The following is a detailed description (including documentary references, a list for which is provided after the detailed description) of an exemplary efficient curved-wire integral equation solution technique as may be practiced in accordance with the subject invention.

An Efficient Curved-Wire Integral Equation Solution Technique:

Computation of currents on curved wires by integral equation methods is often inefficient when the structure is tortuous but the length of wire is not large relative to wavelength at the frequency of operation. The number of terms needed in an accurate piecewise straight model of a highly curved wire can be large yet, if the total length of wire is small relative to wavelength, the current can be accurately represented by a simple linear function. In embodiments of the present invention, a new solution method for the curved-wire integral equation is introduced. It is amenable to uncoupling of the number of segments required to accurately model the wire structure from the number of basis functions needed to represent the current. This feature lends itself to high efficiency. The principles set forth can be used to improve the efficiency of most solution techniques applied to the curved-wire integral equation. New composite basis and testing functions are defined and constructed as linear combinations of other commonly used basis and testing functions. We show how the composite basis and testing functions can lead to a reduced-rank matrix which can be computed via a transformation of a system matrix created from traditional basis and testing functions. Supporting data demonstrate the accuracy of the technique and its effectiveness in decreasing matrix rank and solution time for curved-wire structures.

Numerical techniques for solving curved-wire integral equations may involve large matrices, often due primarily to the resources needed to model the structure geometry rather than due to the number of basis functions needed to represent the unknown current. This is obviously true when a subdomain model is used to approximate a curvilinear structure in which the total wire length is small compared to the wavelength at the frequency of operation. Usually the number of segments needed in such a model is dictated by the structure curvature rather than by the number of weighted basis functions needed in the solution method to represent the unknown current. There is a demand for a general solution technique in which the number of unknowns needed to accurately represent the current is unrelated to the number of straight segments required to model (approximately) the meandering contour of the wire and the vector direction of the current. In recent years attention in the literature has been given to improving the numerical efficiency of integral equation methods for curved-wire structures. For the most part, presently available techniques incorporate basis functions defined on circular or curved wire segments. The authors define basis and testing functions along piecewise quadratic wire segments and achieve good results with fewer unknowns than would be needed in a piecewise straight model of a wire loop and of an Archimedian spiral antenna. Others introduce solution techniques for structures comprising circular segments that numerically model the current specifically on circular loop antennas. An analysis of general wire loops is presented, where a Galerkin technique is employed over a parametric representation of a superquadric curve. Arcs of constant radii are employed to define the geometry of arbitrarily shaped antennas from which is developed a technique for analyzing helical antennas. Other methods which utilize curved segments for subdomain basis and testing functions are available.

There are several advantages inherent in techniques in which basis and testing functions are defined over curved wire segments. Geometry modeling error can be made small and solution efficiency can be increased since to "fit" some structural geometries fewer curved segments are needed than is feasible with straight segments. Although these techniques are successful, they suffer disadvantages as well. First, the integral equation solution technique must be formulated to account for the new curved-segment basis and testing functions. This means that computer codes must be written to take advantage of the numerical efficiency of these new formulations incorporating the curved elements. A second disadvantage of curvilinear basis function modeling is that they fit one class of curve very well but are not well suited to structures comprising wires of mixed curvature. That is, circles fit loops and helices well but not spirals. Clearly, when a given structure comprises several arcs of different curvatures, the efficiency of methods employing a single curved-segment representation suffers. Elements like the quadratic segment or the arc-of-constant-radius segment increase the complexity of modeling. The third disadvantage of these techniques is that, for many structures, they do not lead to complete uncoupling of the number of the unknown current coefficients from the number of segments needed to model the structure geometry. For example, several quadratic segments or arcs, with one weighted unknown defined on each, would be required to model the geometry of one turn of a multiturn helix, yet the current itself may be represented accurately in many cases by a simple linear function over several turns.

In this description, an efficient method for solving for currents induced on curved-wire structures is presented. The solution method is based on modeling the curved wire by piecewise-straight segments but the underlying principles are general and can be exploited in conjunction with solution procedures which depend upon other geometry representations, including those that use arcs or curves. It is ideal for multi-curvature wire structures. The improved solution technique depends upon new basis and testing functions which are defined over more than two contiguous straight-wire segments. Composite basis functions are created as sums of weighted piecewise linear functions on wire segments, and composite testing functions compatible with the new basis functions are developed. The new technique allows one to reduce the rank of the traditional impedance matrix. We show how the matrix elements for a reduced-rank matrix can be computed from the matrix elements associated with a traditional integral equation solution method. Of paramount importance is the fact that the number of elements employed to model the geometric features of the structure is unrelated to the number of unknowns needed to accurately represent the wire current.

The concept of creating a new basis function as a linear combination of other basis functions is used for a multilevel iterative solution procedure for integral equations. Perhaps the composite basis function defined herein can be thought of as a "coarse level" basis function in multilevel terminology, although the method described in this specification is not related to the so-called multilevel or multigrid theory.

The improved solution technique requires fewer unknowns than the traditional solution to represent the current on an Archimedian spiral antenna. The improved technique also allows one to significantly reduce the number of unknowns required to solve for the current on wire helices. Specifically, the results of a convergence test show that the current on a helix can be modeled accurately with the same number of unknowns needed for a "similar" straight wire even though the helix has a large number of turns.

Figure 11A:
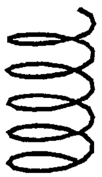
FIG. 11A illustrates a curved wire helix for use in exemplary antenna technology of the present subject matter.
Figure 11B:
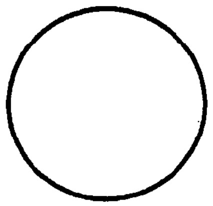
FIG. 11B illustrates a curved wire loop for use in exemplary antenna technology of the present subject matter.
Figure 11C:
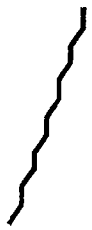
FIG. 11C illustrates a curved wire meander line for use in exemplary antenna technology of the present subject matter.
Figure 12:
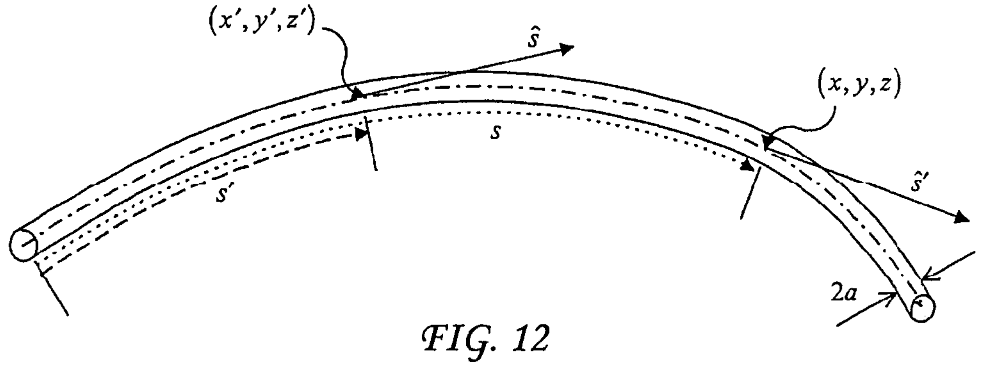
FIG. 12 illustrates an arbitrary curved wire of radius a with source point, observation point, and unit vectors.

Integral Equation for General Curved Wires:

In this section we present the integro-differential equation governing the electric current on a general three-dimensional curved or bent wire. Examples are the wire loop, the helix, and the meander line shown respectively in FIGS. 11A, 11B and 11C. The wire is assumed to be a perfect electrical conductor and to be thin which means that the radius is much smaller than the wavelength and the length of wire. Under these thin-wire conditions the current is taken to be axially directed, circumferentially invariant, and zero at free ends. The equation governing the total axial current $I(s)\hat{s}$ on the thin curved wire is $$-j\frac{\eta}{4\pi k}\left\{k^2\int_C I(s')\hat{s}'\cdot\hat{s}K(s,s')ds' + \frac{d}{ds}\int_C \frac{d}{ds'}I(s')K(s,s')ds'\right\} = -E^i(s)\cdot\hat{s},\ s\in C \tag{1}$$

in which C is the wire axis contour, s denotes the arc displacement along C from a reference to a point on the wire axis, and $\hat{s}$ is the unit vector tangent to C at this point. The positive sense of this vector is in the direction of increasing s. K(s,s') is the kernel or Green's function, $$K(s,s') = \frac{1}{2\pi}\int_{-\pi}^{\pi}\frac{e^{-jkR}}{R}d\phi', \tag{2}$$

in which R is the distance between the source and observation points on the wire surface, and $E^i(s)$ is the incident electric field which illuminates the wire, evaluated in (1) on the wire surface at arc displacement s. Geometric parameters for an arbitrary curved wire are depicted in FIG. 12.

Traditional Solution Technique:

The new solution method proposed in this specification can be viewed as an improvement to present methods. In fact, employing the ideas set forth in Section IV, one can modify an existing subdomain solution method to render it more efficient for solving the curved-wire integral equation. Hence, the new method is explained in this specification as an enhancement of a method that has proved useful for a number of years. The method selected for this purpose is based on modeling the curved wire as an ensemble of straight-wire segments, with the unknown current represented as a linear combination of triangle basis functions and testing done with pulses.

Figure 13:
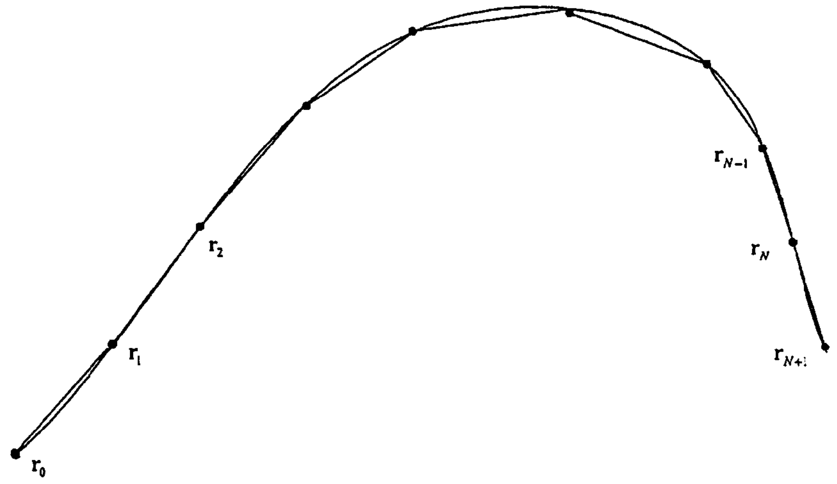
FIG. 13 illustrates an exemplary straight line segment approximation of a curved-wire axis.
Figure 14:
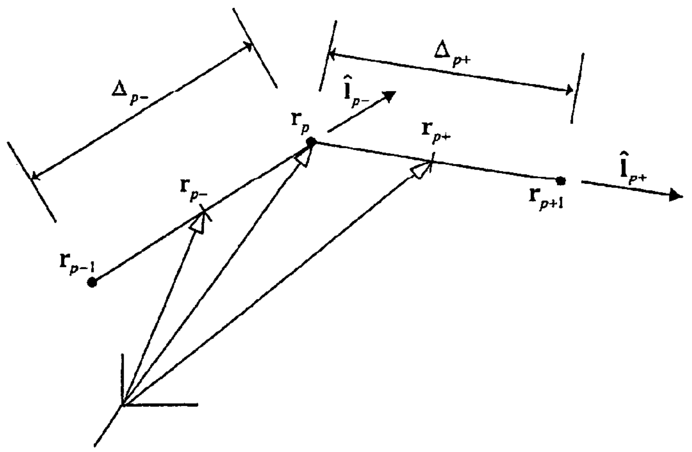
FIG. 14 illustrates exemplary geometric parameters for adjacent straight line segments.

The first step in modeling a curved wire is to select points on the wire axis and define vectors $r_0, r_1, \ldots, r_p$ from a reference origin to the selected points. The curved wire is modeled approximately as an ensemble of contiguous straight-wire segments joining these points (cf. FIG. 13). The arc displacement along the axis of the piecewise linear approximation of C is measured from the reference point labeled $r_0$. The arc displacement between $r_0$ and the $n^{th}$ point located by $r_n$ is $l_n$. A general point on the piecewise-straight approximation of the wire axis is located alternatively by means of the vector r and by the arc displacement l from the reference to the point. Various geometrical parameters describing the wire can be expressed in terms of the vectors locating the points on the wire axis. The unit vectors along the directions of the segments adjacent to the point $r_p$ shown in FIG. 14 are given by $$\hat{l}_{p-} = \frac{r_p - r_{p-1}}{\Delta_{p-}} \tag{3}$$

$$\hat{l}_{p+} = \frac{r_{p+1} - r_p}{\Delta_{p+}} \tag{4}$$

where $$\Delta_{p-}=|r_p-r_{p-1}| \tag{5}$$

$$\Delta_{p+}=|r_{p+1}-r_p| \tag{6}$$

The midpoint of the straight-wire segment joining $r_p$ and $r_{p\pm1}$ is located by $$r_{p\pm} = \frac{1}{2}[r_p + r_{p\pm1}]. \tag{7}$$

In order to emphasize the fact that the model is now a straight wire segmentation of the original curved wire, s in (1) is replaced by l, the arc displacement along the axis of the straight wire model. With this notation and subject to the piecewise straight wire approximation, Eq. (1) becomes $$-j\frac{\eta}{4\pi k}\left\{k^2\int_L I(l')\hat{l}'\cdot\hat{l}K(l,l')dl' + \frac{d}{dl}\int_L\frac{d}{dl'}I(l')K(l,l')dl'\right\} = -E^i(l)\cdot\hat{l}, \quad l\in L \tag{8}$$

where L is the piecewise straight approximation to C.

Figure 15:
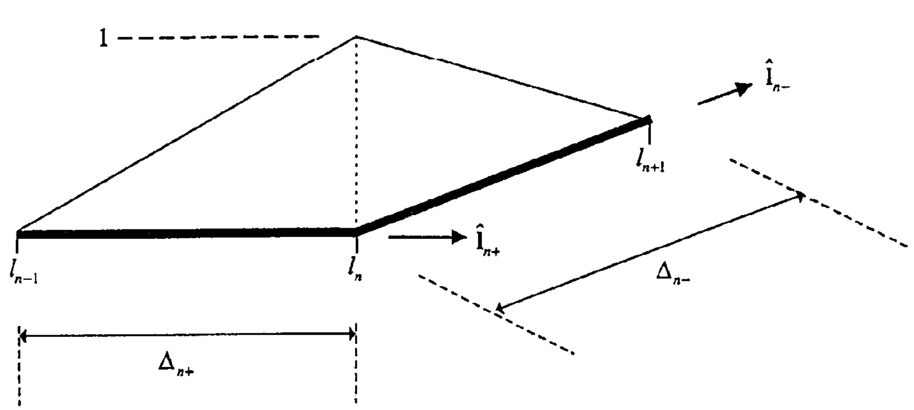
FIG. 15 represents a triangular basis function $\Lambda_n$.

In a numerical solution of the integral equation for a curved wire structure, the (vector) current is expanded in a linear combination of weighted basis functions defined along the straight-wire segments. Even though they can be any of a number of functions, those employed here, for the purpose of illustration in this specification, are chosen to be triangle functions with support over two adjacent segments. Thus the current may be approximated by $$I(l)\hat{l}(l) \approx \sum_{n=1}^{N} I_n\Lambda_n(l)\hat{l}_n(l) \tag{9}$$

in which the triangle function $\Lambda_n$, about the nth point on the segmented wire, as depicted in FIG. 15, is defined by $$\Lambda_n(l) = \begin{cases} \dfrac{l-l_{n-1}}{\Delta_{n-}}, & l\in(l_{n-1}, l_n) \\ \dfrac{l_{n+1}-l}{\Delta_{n+}}, & l\in(l_n, l_{n+1}) \end{cases} \tag{10}$$

where the unit vector $\hat{l}_n$ is defined in terms of the unit vectors associated with the segments adjacent to the nth point:

$$\hat{l}_n = \begin{cases} \hat{l}_{n-}, & l\in(l_{n-1}, l_n) \\ \hat{l}_{n+}, & l\in(l_n, l_{n+1}). \end{cases} \tag{11}$$

Figure 16:
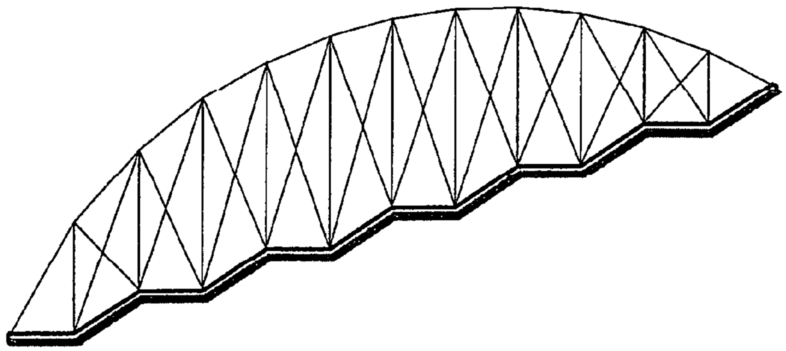
FIG. 16 illustrates an exemplary piecewise linear expansion of the current along a meander line.

N is the number of basis functions and unknown current coefficients $I_n$ in the finite series approximation (9) of the current. N unknowns are employed to represent the current on a wire having two free endpoints and modeled by N+1 straight-wire segments. In this traditional solution technique described here, N must be large enough to accurately model the geometric structure and vector direction of the current, even if a large number of unknowns is not required to approximate the current I(l) to the accuracy desired. The triangle basis functions overlap as suggested in FIG. 16 so an approximation with N terms incorporates, at most, N+1 vector directions of current on the wire. These point-by-point directions of current on a curved wire must be accounted for accurately by the N+1 unit vectors, yet N piecewise linear basis functions may be far more than may be needed to accurately represent the current I(l).

Figure 17:
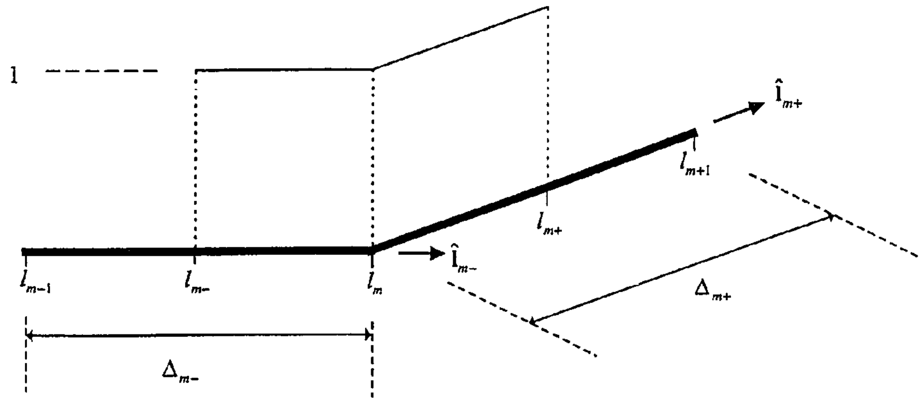
FIG. 17 represents a testing pulse $\Pi_n$.

Testing the integro-differential equation is accomplished by taking the inner product of (8) with the testing function $$\Pi_m(l) = \begin{cases} 1, & l\in(l_{m-}, l_{m+}) \\ 0, & \text{otherwise} \end{cases} \tag{12}$$

depicted in FIG. 17 for m=1, 2, . . . , N. The inner product of this testing pulse with a function of the variable l is defined by $$\langle f, \Pi_m\rangle = \int_{l_{m-}}^{l_{m+}} f(l)dl. \tag{13}$$

Expanding the unknown current I with (9) and taking the inner product of (8) with (12) for m=1, 2, . . . , N yield a system of equations written in matrix form as $$[Z_{mn}][I_n]=[V_m] \tag{14}$$

where $$Z_{mn} = -j\frac{\eta}{4\pi k}\left\{\frac{k^2}{2}\left[\left(\Delta_{m-}\hat{l}_{m-}\cdot\hat{l}_{n-} + \Delta_{m+}\hat{l}_{m+}\cdot\hat{l}_{n-}\right)\int_{l_{n-1}}^{l_n}\Lambda_n(l')K(R_m)dl' + \left(\Delta_{m-}\hat{l}_{m-}\cdot\hat{l}_{n+} + \Delta_{m+}\hat{l}_{m+}\cdot\hat{l}_{n+}\right)\int_{l_n}^{l_{n+1}}\Lambda_n(l')K(R_m)dl'\right] + \frac{1}{\Delta_{n-}}\int_{l_{n-1}}^{l_n}K(R_{m+})dl' - \frac{1}{\Delta_{n+}}\int_{l_n}^{l_{n+1}}K(R_{m+})dl' - \frac{1}{\Delta_{n-}}\int_{l_{n-1}}^{l_n}K(R_{m-})dl' + \frac{1}{\Delta_{n+}}\int_{l_n}^{l_{n+1}}K(R_{m-})dl'\right\} \tag{15}$$

is an element of the N×N impedance matrix with $$R_m = \begin{cases} \sqrt{4a^2\sin^2\dfrac{\phi'}{2} + (l_m - l')^2}\,, & l_m \text{ and } l' \text{ on same segment} \\ \sqrt{|r_m - r'|^2 + a^2}\,, & \text{otherwise} \end{cases} \tag{16}$$

and $$R_{m\pm} = \begin{cases} \sqrt{4a^2\sin^2\dfrac{\phi'}{2} + (l_{m\pm} - l')^2}\,, & l_{m\pm} \text{ and } l' \text{ on same segment} \\ \sqrt{|r_{m\pm} - r'|^2 + a^2}\,, & \text{otherwise.} \end{cases} \tag{17}$$

Figure 18:
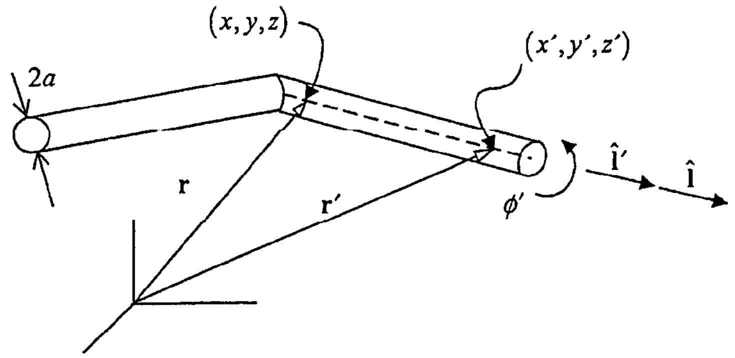
FIG. 18 illustrates exemplary source and observation points on adjacent straight-wire segments.
Figure 19:
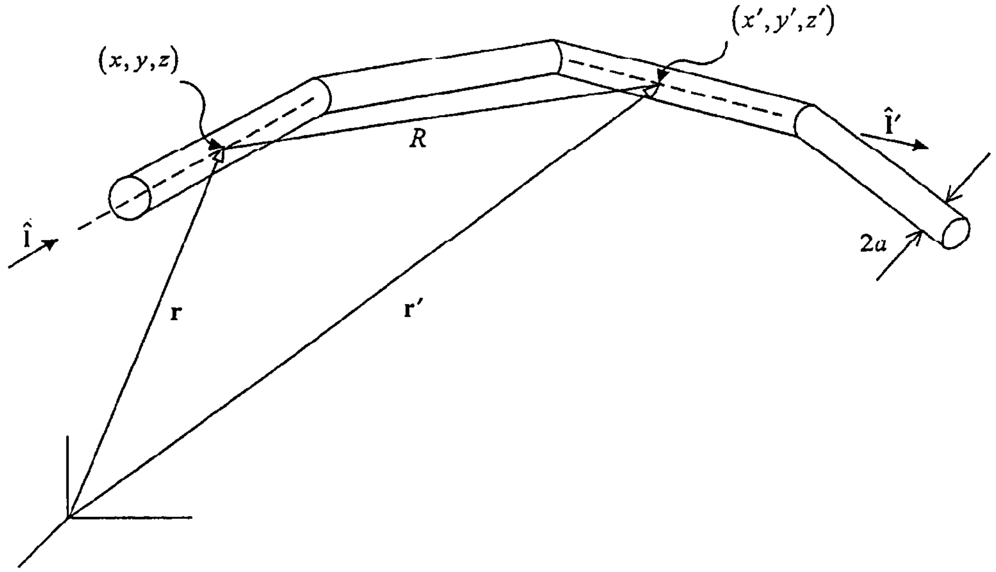
FIG. 19 illustrates exemplary source and observation points on different linear wire segments.

When the source (r' or l') and observation (r or $l=(l_{m\pm}, l_m)$) points reside on the same straight wire segment of radius a, as in FIG. 18 the exact kernel given by $$K(l,l') = \frac{1}{2\pi}\int_{-\pi}^{\pi}\frac{e^{-jkR}}{R}d\phi' \tag{18}$$

is used. Otherwise for source and observation points on different straight-wire segments (cf. FIG. 19), the exact kernel is approximated by the so-called reduced kernel, $$K(l, l') = \frac{e^{-jkR}}{R}. \tag{19}$$

The approximation below, which is excellent when the segment lengths are small compared with the wavelength, is employed in arriving at the first two terms of (15):

$$\left\langle \hat{l}(l) \cdot f(l), \Pi_m(l) \right\rangle \approx f(l_m) \cdot \left[ \frac{1}{2} \Delta_{m-} \hat{l}_{m-} + \frac{1}{2} \Delta_{m+} \hat{l}_{m+} \right]. \tag{20}$$

The same approximation can be used to compute the elements of the excitation column vector, $$V_m = \left\langle -E^i(l) \cdot \hat{l}, \Pi_m \right\rangle \approx -E^i(l_m) \cdot \left[ \frac{1}{2} \Delta_{m-} \hat{l}_{m-} + \frac{1}{2} \Delta_{m+} \hat{l}_{m+} \right], \tag{21}$$

where $E^i(l_m)$ is the known incident electric field at point $l_m$ on the wire. Of course, if desired the left hand side of (21) can be evaluated numerically in those situations in which the incident field varies appreciably over a subdomain. We also point out that testing with pulses allows one to integrate directly the second term on the left side of (8). The derivative of the piecewise linear current in (8) leads to a pulse doublet (for charge) over two adjacent straight wire segments. These operations on the second term in the left side of (8) lead to the last four integrals in (15).

Improved Solution Technique

In this section a new technique for solving the curved-wire integral equation is presented. It is very efficient for tortuous wires on which the actual variation of the current is modest, a situation which often occurs when the length of wire in a given curve is small relative to wavelength, regardless of the degree of curvature. Composite basis and testing functions are introduced as an extension of the functions of the traditional solution method. The composite basis function serves to uncouple the number of straight segments needed to model the curved-wire geometry and the vector direction of the current from the number of unknowns needed to accurately represent the current on the wire. This new basis function is a linear combination of appropriately weighted generic basis functions, e.g., basis functions (9) in the traditional method, and is defined over a number of contiguous straight segments. This new basis function is referred to as a composite basis function since it is constructed from others. Even though the solution method can incorporate any number of different generic basis and testing functions, the piecewise linear or triangle basis function and the pulse testing function are adopted here to facilitate explanation. Also, this pair leads to a very efficient and practicable solution scheme.

Figure 20:
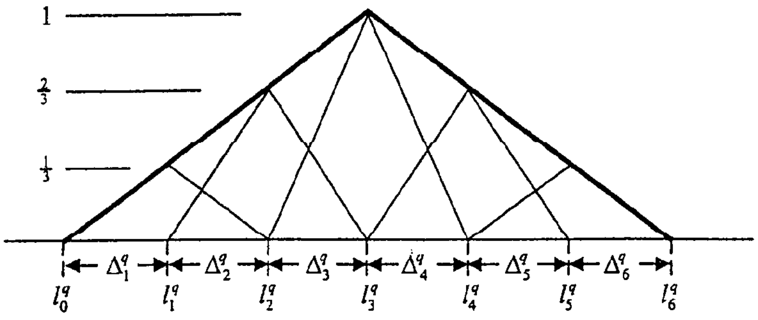
FIG. 20 represents a composite triangle basis function $\tilde{\Lambda}_q$ with five constituent triangles.
Figure 21:
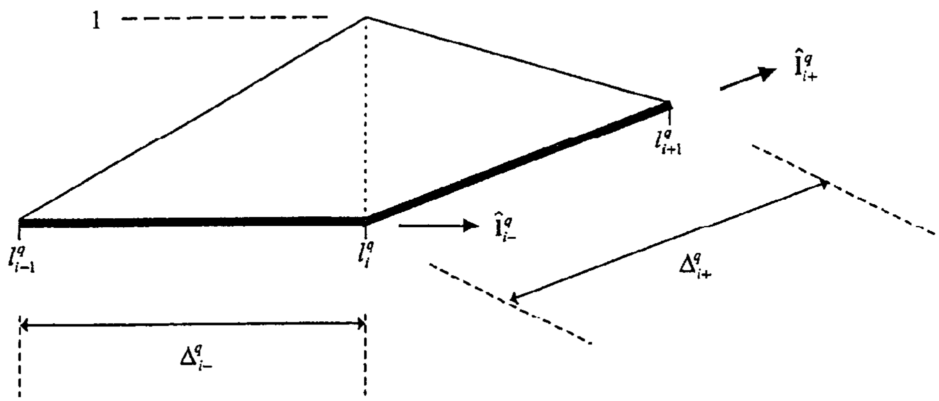
FIG. 21 represents an exemplary constituent triangle $\Lambda_i^q$.

The notion of a composite triangle made up of constituent triangles is suggested in FIG. 20. For simplicity in illustration, the composite triangle is shown over a straight line though in practice it would be over a polygonal line comprising straight-line segments, which approximate the curved wire axis. The $q^{th}$ composite vector triangle fiction can be constructed as $$\tilde{\Lambda}_q(l)\hat{l}_q = \sum_{i=1}^{N^q} h_i^q \Lambda_i^q(l) \hat{l}_i^q \tag{22}$$

in which $\Lambda_i^q$ is the $i^{th}$ constituent triangle defined by $$\Lambda_i^q(l)\hat{l}_i^q = \begin{cases} \dfrac{l - l_i^q}{\Delta_{i-}^q} \hat{l}_{i-}^q, & l \in (l_{i-1}^q, l_i^q) \\ \dfrac{l_i^q - l}{\Delta_{i+}^q} \hat{l}_{i+}^q, & l \in (l_i^q, l_{i+1}^q) \end{cases} \tag{23}$$

and illustrated in FIG. 21. When q is used as a superscript it identifies a parameter related to the $q^{th}$ composite triangle function. The constitutive elements of the $q^{th}$ composite basis function are denoted by the subscript i. The parameter $h_i^q$ is the weight or magnitude of the $i^{th}$ constituent triangle within $\tilde{\Lambda}_q$. These weights are functions of the segment lengths within each composite basis function and are adjusted so that the ordinate to the composite triangle is a linear function of displacement along the polygonal line which forms the base of the composite triangle. For example, for five constituent triangles in the $q^{th}$ composite triangle of FIG. 20, the weights $h_1^q$ and $h_2^q$ are $$h_1^q = \frac{\Delta_1^q}{\Delta_1^q + \Delta_2^q + \Delta_3^q} \tag{24}$$

$$h_2^q = \frac{\Delta_1^q + \Delta_2^q}{\Delta_1^q + \Delta_2^q + \Delta_3^q}. \tag{25}$$

The other weights are computed in a similar fashion. The parameter $N^q$ is the number of triangle functions $\Lambda_i^q$ employed to represent $\tilde{\Lambda}_q$. The example composite basis function of FIG. 20 is illustrated as the sum of five identical constituent triangles, but, of course, the constituents need not be the same if convenience or efficiency dictates otherwise. Also, this composite basis function is illustrated without the vector directions associated with each subdomain. In general the individual straight-wire segments over which a composite basis function is defined may each have a different vector direction. Finally, the current expanded with a reduced number of unknowns $\tilde{N}$ is $$I(l)\hat{l}(l) = \sum_{q=1}^{\tilde{N}} \tilde{I}_q \tilde{\Lambda}_q(l) \hat{l}_q(l) \tag{26}$$

where $\tilde{\Lambda}_q(l)\hat{l}_q(l)$ is the $q^{th}$ vector composite basis function defined earlier in (22) and $\tilde{I}_q$ is its unknown current coefficient. It is worth noting that constituent triangles are employed above to construct composite triangles but, if desired, they could be used to construct other basis functions, e.g., an approximate, composite piecewise sinusoidal function.

Figure 22:
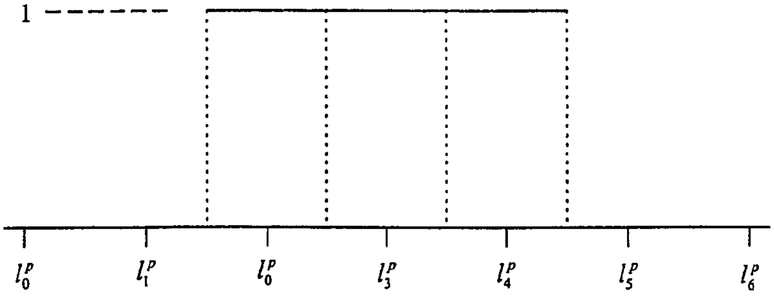
FIG. 22 represents an exemplary composite testing pulse $\tilde{\Pi}_p$.
Figure 23:
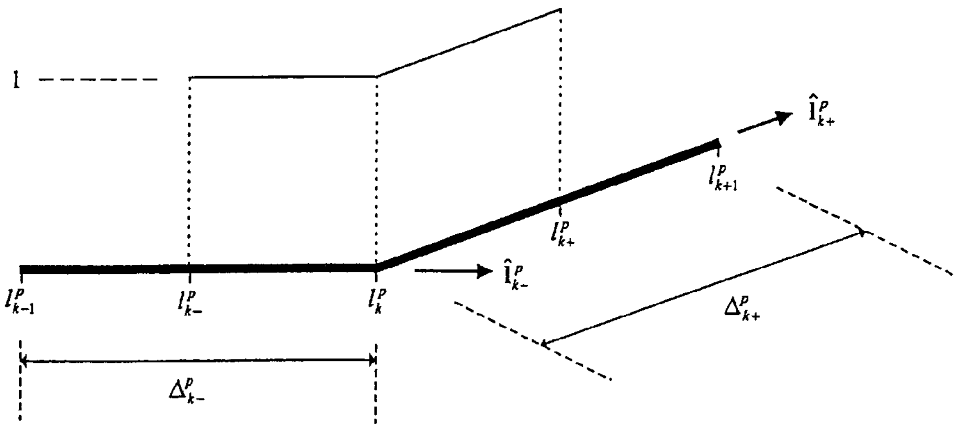
FIG. 23 represents an exemplary constituent testing pulse $\Pi_k^p$.

If the number of unknowns in a solution procedure is reduced, then, of course, the number of equations must be reduced too which means that the testing procedure must be modified to achieve fewer equations. This is easily accomplished by defining composite testing pulses, compatible with the composite basis functions, as a linear combination of appropriately weighted constituent pulses. An example composite test pulse is depicted in FIG. 22. Such a $p^{th}$ composite testing pulse is defined by $$\tilde{\Pi}_p(l) = \sum_{k=1}^{NP} u_k^p \Pi_k^p(l) \tag{27}$$

where the constituent pulses associated with this $p^{th}$ pulse are $$\Pi_k(l) = \begin{cases} 1, & l \in (l_{k-}^p, l_{k+}^p) \\ 0, & \text{otherwise} \end{cases} \tag{28}$$

and shown in FIG. 23. If with every constituent triangle there were associated a corresponding constituent pulse, then the testing functions $\tilde{\Pi}_p$ would overlap, which is not desired and can be avoided by selecting the weight $u_k^p$ to be 0 or 1 depending upon whether or not the $k^{th}$ constituent pulse in $\tilde{\Pi}_p$ is to be retained. To this end, the inner product of (13) is modified in the composite testing procedure to become $$\langle f, \tilde{\Pi}_p \rangle = \sum_{k=1}^{NP} u_k^p \int_{l_{k-}^p}^{l_{k+}^p} f(l) dl. \tag{29}$$

Now that we have described the new basis and testing functions, we substitute the current expansion of (26) into (8) and form the inner product (29) of the resulting expression with $\tilde{\Pi}_p$ for p=1, 2, . . . , Ñ. This yields the following matrix equation having a reduced number (Ñ) of unknowns and equations:

$$[\tilde{Z}_{pq}][\tilde{I}_q]=[\tilde{V}_p] \tag{30}$$

where $$\tilde{Z}_{pq} = \tag{31}$$

$$\sum_{k=1}^{NP} u_k^p \sum_{i=1}^{Nq} h_i^q \Bigg\{ -j\frac{\eta}{4\pi k}\Bigg[\frac{k^2}{2}\Bigg\{\left(\Delta_{k-}^p \hat{l}_{k-}^p \cdot \hat{l}_{i-}^q + \Delta_{k+}^p \hat{l}_{k+}^p \cdot \hat{l}_{i-}^q\right)\int_{l_{i-1}^q}^{l_i^q} \Lambda_i^q(l')K$$

$$(R_k^p)dl' + \left(\Delta_{k-}^p \hat{l}_{k-}^p \cdot \hat{l}_{i+}^q + \Delta_{k+}^p \hat{l}_{k+}^p \cdot \hat{l}_{i+}^q\right)$$

$$\int_{l_i^q}^{l_{i+1}^q} \Lambda_i^q(l')K(R_k^p)dl'\Bigg\} +$$

$$\frac{1}{\Delta_{i-}^q}\int_{l_{i-1}^q}^{l_i^q} K(R_{k+}^p)dl' - \frac{1}{\Delta_{i+}^q}\int_{l_i^q}^{l_{i+1}^q} K(R_{k+}^p)dl' -$$

-continued $$\frac{1}{\Delta_{i-}^q}\int_{l_{i-1}^q}^{l_i^q} K(R_{k-}^p)dl' + \frac{1}{\Delta_{i+}^q}\int_{l_i^q}^{l_{i+1}^q} K(R_{k-}^p)dl'\Bigg]\Bigg\}$$

represents an element of the reduced-rank (Ñ×Ñ) impedance matrix. At this point the reader is cautioned to distinguish between the index k which only appears in (31) as a subscript and the wave number $k=\omega\sqrt{\mu\epsilon}$. The distances $R_{k\pm}^p$ and $R_k^p$ are given in (16) or (17) with m replaced by index k, and the forcing function is given by $$\tilde{V}_{pq} = -\sum_{k=1}^{N_p} u_k^p \int_{l_{k-}^p}^{l_{k+}^p} E^i(l_k^p)\cdot\hat{l}(l)dl.$$

Figure 24:
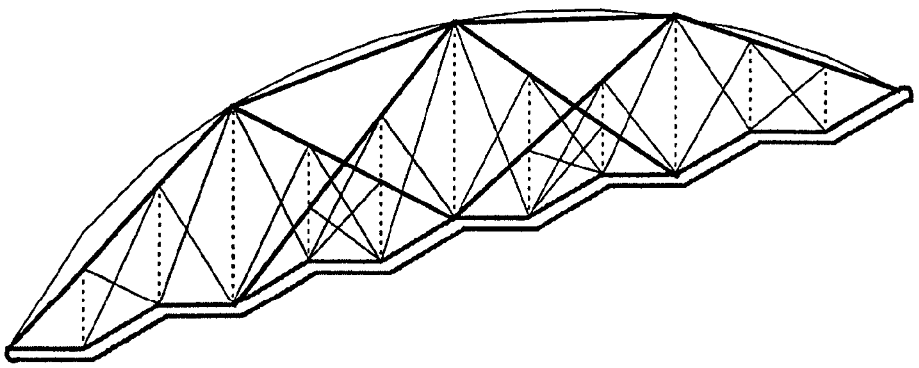
FIG. 24 illustrates current expansion with composite basis functions.

One could compute the terms within the reduced-rank impedance matrix directly from (31). However, this would require more computation time than needed to fill the original impedance matrix of (14) since some constituent triangles within adjacent composite basis functions have the same support (FIG. 24). The constituent triangles within the overlapping portions of two adjacent composite basis functions differ only in the weight $h_i^q$. Therefore (31) incorporates redundancies which should be avoided. Also, a study of (15) and (31) reveals that the term within the braces of (31) is identical to $Z_{mn}$ of (15) if subscript i is replaced by n, subscript k by m, and the superscripts p and q are suppressed. Hence, the elements $\tilde{Z}_{pq}$ of the reduced-rank matrix can be computed from the elements $Z_{mn}$ of the original matrix by means of the transformation $$\tilde{Z}_{pq} = \sum_{k=1}^{NP} u_k^p \sum_{i=1}^{Nq} h_i^q Z_{ki}^{pq} \tag{32}$$

where $Z_{ki}^{pq}$ is a term in the original impedance matrix $Z_{mn}$ of (15). The key to selecting appropriate $Z_{mn}$ term is the combination of indices p, q, k, and i. The index p (q) indicates a group of rows (columns) in $[Z_{mn}]$ which are ultimately combined by the transformation in (32) to form the new matrix. The appropriate matrix element $Z_{ki}^{pq}$ in $[Z_{mn}]$ is determined by intersecting the $k^{th}$ row within the set of rows identified by index p with the $i^{th}$ column of the group of columns specified by index q. Of course the groupings of rows and columns are determined when one defines the composite basis and testing functions.

A transformation for computing the reduced-rank matrix $[\tilde{Z}_{pq}]$ from the traditional matrix $[Z_{mn}]$ which is more efficient than is the construction of the matrix from (31) can be developed. The key to this transformation is (32). First, two auxiliary matrices $[L_{pm}]$ and $[R_{nq}]$ are constructed and, then, the desired transformation is expressed as $$[\tilde{Z}_{pq}]=[L_{pm}][Z_{mn}][R_{nq}] \tag{33}$$

where $$[L_{pm}] = \begin{bmatrix} u_1^1 u_2^1 \ldots u_{N^1}^1 & & & \cdots & & & 0 \\ & u_1^2 u_2^2 \ldots u_{N^2}^2 & & & & & \\ & & u_1^3 u_2^3 \ldots u_{N^3}^3 & & & & \vdots \\ \vdots & & & \ddots & & & \\ & & & & u_1^p u_2^p \ldots u_{N^p}^p & & \\ & & & & & \ddots & \\ 0 & & & \cdots & & & u_1^{\tilde{N}} u_2^{\tilde{N}} \ldots u_{N^{\tilde{N}}}^{\tilde{N}} \end{bmatrix} \quad (34)$$

and $$[R_{nq}] = \begin{bmatrix} h_1^1 & & & & & & \cdots & 0 \\ h_2^1 & & & & & & & \vdots \\ \vdots & h_1^2 & & & & & & \\ h_{N^1}^1 & h_2^2 & & & & & & \\ & \vdots & h_1^3 & & & & & \\ & h_{N^2}^2 & h_2^3 & & & & & \\ & & \vdots & & & & & \\ & & h_{N^3}^3 & & & & & \\ & & & \ddots & & & & \\ & & & & h_1^q & & & \\ & & & & h_2^q & & & \\ & & & & \vdots & & & \\ & & & & h_{N^q}^q & & & \\ & & & & & \ddots & & \\ & & & & & & & h_1^{\tilde{N}} \\ & & & & & & & h_2^{\tilde{N}} \\ \vdots & & & & & & & \vdots \\ 0 & \cdots & & & & & & h_{N^{\tilde{N}}}^{\tilde{N}} \end{bmatrix} \quad (35)$$

It is easy to show that the above matrix transformation is equivalent to (32).

An alternative development of the transformation, which renders the meaning and construction of the matrices $[L_{pm}]$ and $[R_{nq}]$ more transparent is presented. We begin with the traditional N×N system matrix equation, $$[Z_{mn}][I_n]=[V_m] \quad (36)$$

which is to be transformed to the Ñ×Ñ reduced-rank matrix equation $$[\tilde{Z}_{pq}][\tilde{I}_q]=[\tilde{V}_p] \quad (37)$$

The number of unknown current coefficients in the original system of equations (36) is reduced by expressing the Ñ coefficients $\tilde{I}_q$ as linear combinations of the N coefficients $I_n$(Ñ<N). The $\tilde{I}_q$ are constructed from the $I_n$ by means of a scheme which accounts for the representation of the composite basis functions in terms of the original triangles on the structure. The resulting relationships among the original and the composite coefficients are expressed as $$[I_n]=[R_{nq}][\tilde{I}_q] \quad (38)$$

where $[R_{nq}]$ embodies weights of the constituent triangles needed to synthesize composite basis function triangles. The matrix $[R_{nq}]$ directly combines unknown current coefficients consistent with the composite basis functions to result in a reduced number of unknowns. The construction is simple. If the triangle n from the original basis functions is to be used in the $q^{th}$ composite basis function, the appropriate weight of this triangle is placed in row n and column q of $[R_{nq}]$. Otherwise zero is placed in this position. Again we point out that a given triangle may appear in more than one composite basis function. After substituting (38) into (36) we arrive at a modified system of linear equations $$[Z_{mn}][R_{nq}][\tilde{I}_q]=[V_m] \quad (39)$$

which has a reduced number (Ñ) of unknowns but the original number (N) of equations. To reduce the number of equations to Ñ, tested linear equations are selectively added, which is accomplished by pre-multiplying (39) by $[L_{pm}]$ to arrive at $$[L_{pm}][Z_{mn}][R_{nq}][\tilde{I}_q][L_{pm}][V_m]. \quad (40)$$

The identifications, $$[\tilde{Z}_{pq}]=[L_{pm}][Z_{mn}][R_{nq}] \quad (41)$$

and $$[\tilde{V}_p]=[L_{pm}][V_m], \quad (42)$$

in (40) lead to the desired expression (37). The matrix $[L_{pm}]$ effectively creates composite testing functions from the original testing pulses. If the $p^{th}$ composite testing pulse contains the $m^{th}$ testing pulse from the original formulation, a one is placed in row p and column m of $[L_{pm}]$. Otherwise, a zero is placed in this position.

There are other important considerations in the implementation of this technique. Again, we label the number of basis functions in the traditional formulation N and the number of composite basis functions Ñ. In the previous section the number of constituent triangles for the $q^{th}$ composite basis function is designated $N^q$. Here for ease of implementation it is convenient to chose $N^q$ to be the same value for every q, which we designate τ ($N^q=\tau$ for all q). Also, in the present discussion, we restrict τ to be one of the members of the arithmetic progression 5, 9, 13, 17, . . . ,. With τ one of these integers, half-width constituent pulses are not required within the composite testing functions. N must be sufficiently large to ensure accurate modeling of the wire geometry and vector direction of the current as well as to preserve the numerical accuracy of the approximations. In addition, Ñ must be large enough to accurately represent the variation of the current. A convergence test must be conducted to arrive at acceptable values of N and Ñ. Also, N, Ñ and τ must be defined carefully so that a value of τ in the arithmetic progression will allow an N×N matrix to be reduced to an Ñ×Ñ matrix. The following formula is useful for determining relationships between N and Ñ, for a given value of τ, in the case of a general three-dimensional curved wire (without junctions):

$$\tilde{N} = 2\frac{N+1}{\tau+1} - 1. \tag{43}$$

For a wire structure with a junction, e.g., a circular loop, where overlapping basis functions typically are used in the traditional formulation to satisfy Kirchhoff's current law, (43) becomes $$\tilde{N} = \frac{2N}{\tau+1}. \tag{44}$$

Once N, Ñ and τ are determined, it is easy to write a routine which determines the original basis and testing functions to be included in the composite functions. This information is then stored in the matrices $[L_{pm}]$ and $[R_{nq}]$.

In the above, composite triangle expansion functions are synthesized from generic triangle functions but one could as well, if desired, approximate other composite expansion functions, e.g., "sine triangles" by adjustment of the coefficients $h_i^q$. Similarly, other approximate testing functions could be created by adjustment of the factors $u_k^p$. Thus, a reduced-rank solution method with composite expansion and testing functions different from triangles and pulses could be readily created from the techniques discussed in this section. Only $h_i^q$ and $u_k^p$, peculiar to the functions selected in the method to be implemented, must be changed in (32) in order to arrive at the appropriate reduced-rank matrix elements $\tilde{Z}_{pq}$. If $[L_{pm}]$ of (34) were replaced by $[R^{nq}]^T$ in (33) where $[R_{nq}]$ is defined in (35) and T denotes transpose, then the resulting reduced-rank matrix $[\tilde{Z}_{pq}]$ would be that for a method which employs composite triangle expansion and (approximate) composite triangle testing functions.

Figure 25A:
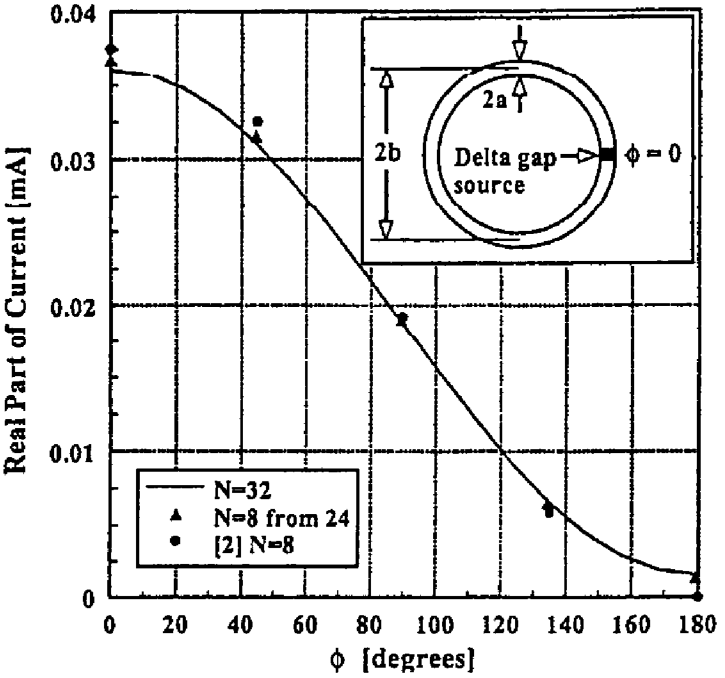
FIG. 25A is a graphical representation of the real part of current versus degrees on wire loop antennas.
Figure 25B:
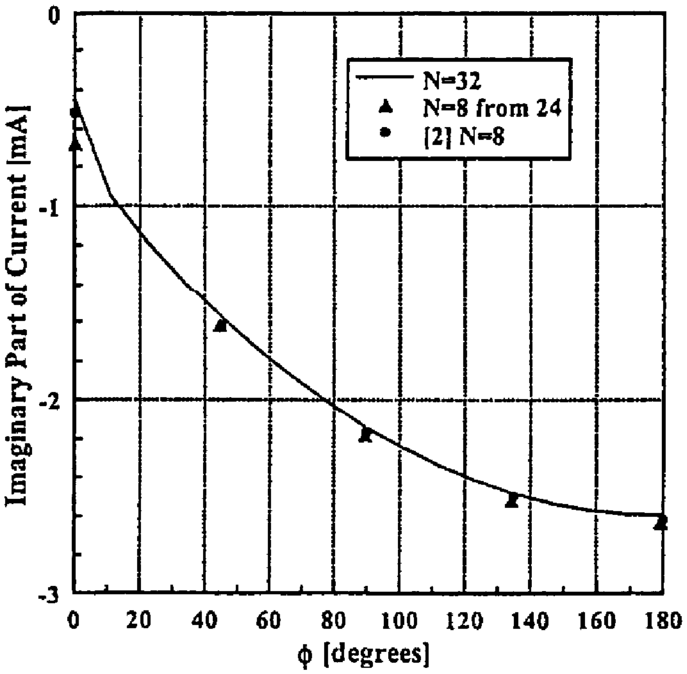
FIG. 25B is a graphical representation of the imaginary part of current versus degrees on wire loop antennas.
Figure 26A:
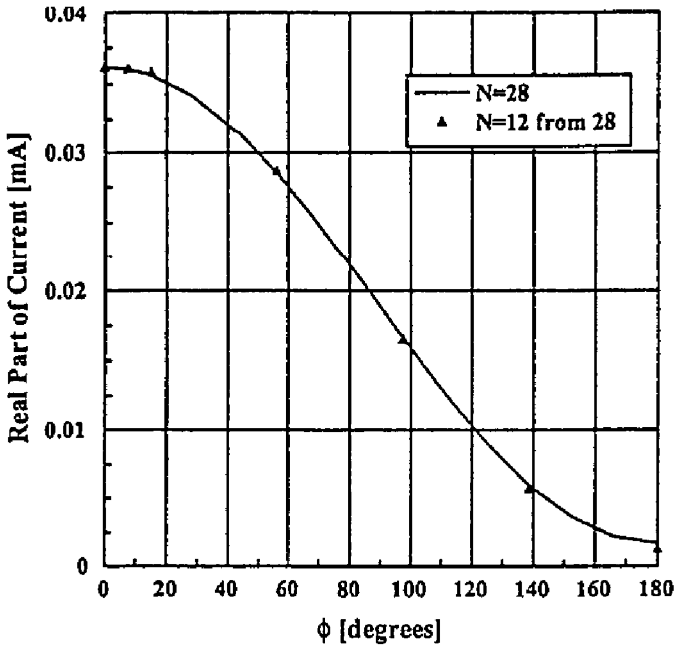
FIG. 26A is a graphical representation of the real part of current on the wire loop antenna of FIGS. 25A and 25B without composite basis function at the source.
Figure 26B:
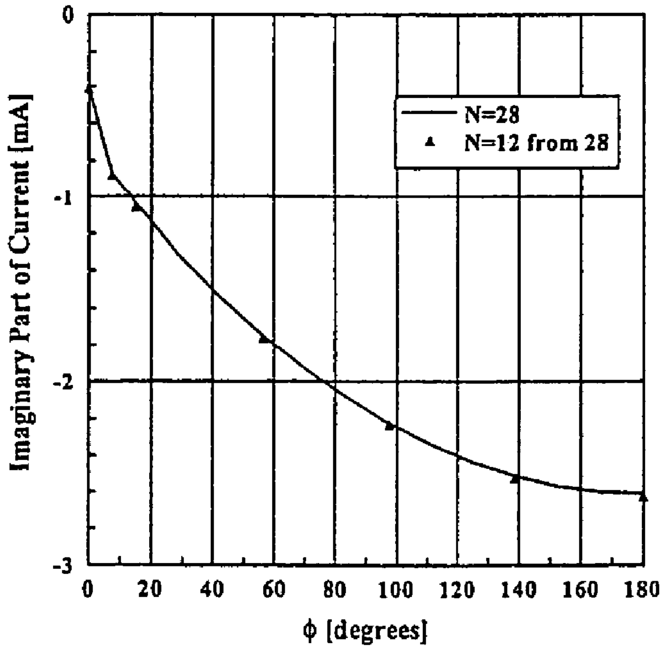
FIG. 26B is a graphical representation of the imaginary part of current on the wire loop antenna of FIGS. 25A and 25B without composite basis function at the source.

Results obtained by solving the integral equation of (15) with the improved solution method developed above are presented in this section as are values of current determined by the traditional method. In some cases data obtained from the literature are displayed for comparison. Results are presented for the wire loop, an Archimedian spiral antenna, and several different helical antennas and scatterers. Current values on a small wire loop antenna are depicted in FIG. 25. The loop is modeled by 32 linear segments (and 32 unknowns) in the traditional solution technique. Also shown are values obtained from the new solution method with eight composite basis functions (eight unknowns) each having five constituent triangles constructed on twenty four linear segments. These current values compare well with those from the traditional solution and with data where the loop is modeled with eight unknowns on quadratic segments. There is slight disagreement at the driving point which is to be expected (with eight unknowns) near a delta gap source where the current varies markedly. To investigate this discrepancy we use three triangle basis functions in the vicinity of the delta-gap source and do not form composite triangles in this region. The results are shown in FIG. 26. Here the loop problem has been solved with 28 unknowns for the traditional method and twelve unknowns for the composite basis function solution. It is seen that the agreement is excellent even in the vicinity of the delta-gap source.

Figure 27:
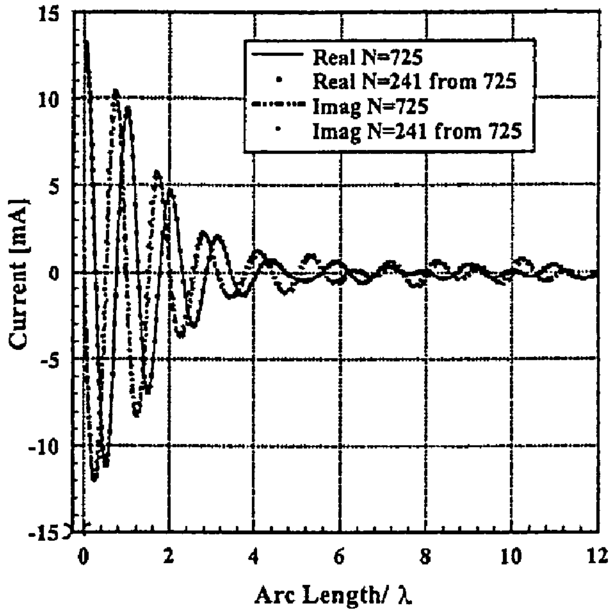
FIG. 27 is a graphical representation of mode 2 current on one arm of four arm Archimedian spiral antenna having spiral constant 0.02λ, arm length 12λ and wire radius 0.006λ.
Figure 28:
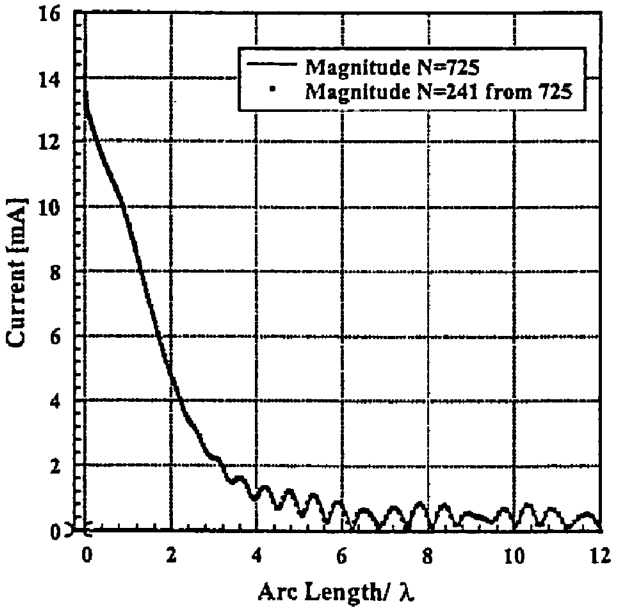
FIG. 28 is a graphical representation of the magnitude of mode 2 current on one arm of four arm Archimedian spiral antenna having spiral constant 0.02λ, arm length 12λ and wire radius 0.006λ.
Figure 29:
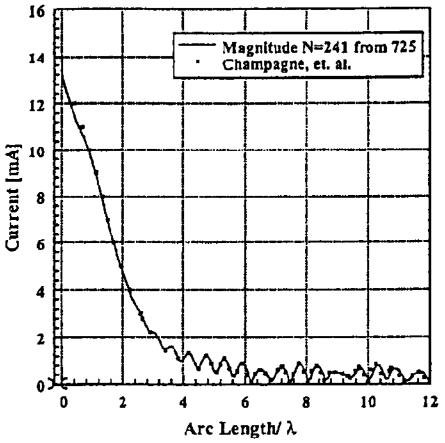
FIG. 29 is a graphical representation of the magnitude of mode 2 current on one arm of four arm Archimedian spiral antenna having spiral constant 0.02λ, arm length 12λ and wire radius 0.006λ with data for comparison.

The improved solution method is applied to a four arm Archimedian spiral antenna. This antenna is chosen to illustrate the usefulness of the quadratic subdomains for wires having significant curvature. The antenna is excited by a delta gap source on each arm located near the junction of the four arms. The results presented in this section are for mode 2 excitation. The antenna is also modeled by the traditional technique with 725 unknowns on each arm (725*4+3=2903). In certain literature the authors implement a discrete body of revolution technique so that the number of unknowns needed for one arm is sufficient for solving the problem. Since our goal is to employ such data to demonstrate the accuracy of our method and not to create the best analytical tool for the Archimedian spiral antenna, we solve this problem by including the same number of linear segments on each arm and placing overlapping triangles at the wire junction to enforce Kirchhoff's current law. It is found that each arm requires 504 linear segments to obtain an accurate solution. They also obtain accurate values of the current with 242 quadratic segments. We reproduce these results with our improved solution method as illustrated in FIGS. 27–29, respectively. The number of unknowns for each arm is 725 for the traditional technique and 241 for the improved method. In each composite basis function there are five constituent triangles. In FIG. 27 the difference in the solution of the current for the two methods is seen to be negligible. Good agreement is also achieved for the current magnitude (cf. FIG. 28). A favorable comparison with data is observed in FIG. 29. Since the symmetry in the geometry is not used to further reduce the number of unknowns required for the structure, the actual number of unknowns in the impedance matrices are 2903 and 967, respectively. The computation times for the various routines of the FORTRAN 90 code are presented in Table 6 below. All times are for runs on a 375 MHz DEC Alpha processor. The time study shows that the reduction technique is successful in significantly reducing matrix solve time for this four-arm Archimedian spiral antenna.

A standard linear equation solution method is employed to solve both sets of linear equations since the objective of this comparison is to delineate the enhanced efficiency of the reduced-rank method.

TABLE 6

COMPUTATION TIMES FOR ARCHIMEDIAN SPIRAL

| Event | Time in Seconds |
|---|---|
| Fill matrix N = 2903 | 1020 |
| Solve matrix equation N = 2903 | 1329 |
| Reduce matrix from 2903 to 967 | 5.54 |
| Solve reduced matrix equation N = 967 | 45.81 |
| Traditional method total time | 2349 |
| Improved method total time | 1071 |

Figure 30A:
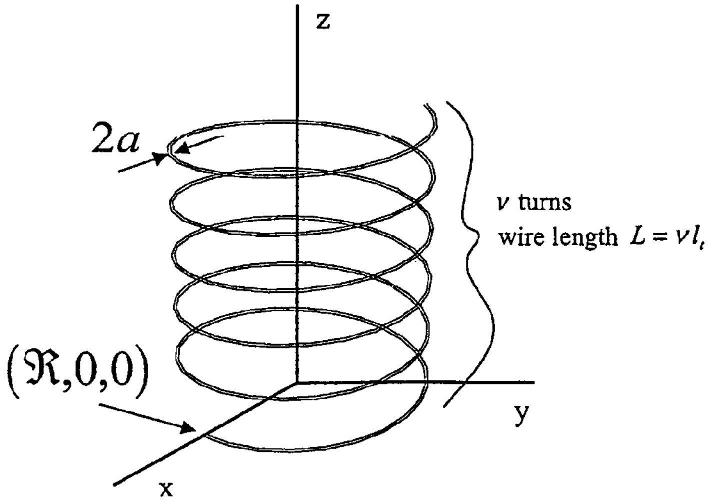
FIG. 30A is a perspective view of an exemplary helical geometry.
Figure 30B:
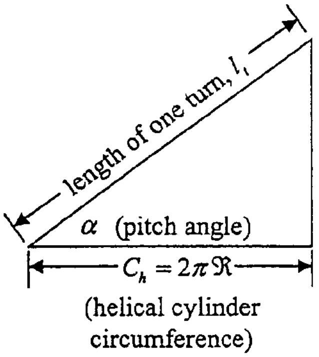
FIG. 30B represents additional exemplary definitions of helical parameters.
Figure 31:
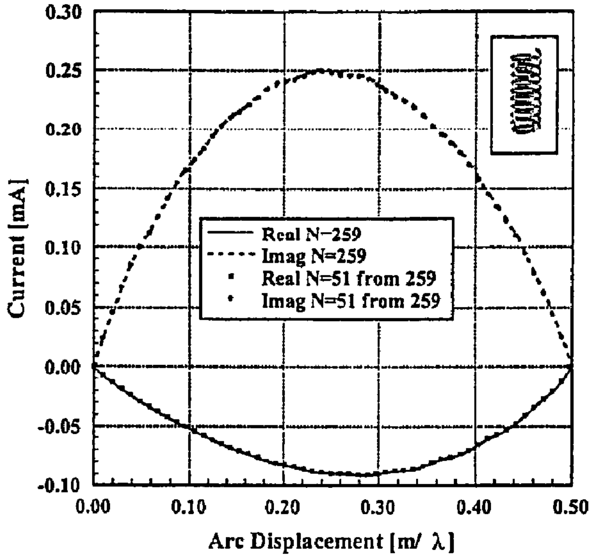
FIG. 31 is a graphical representation of current versus arc displacement on a helix illuminated by a plane wave, $E=(\hat{x}\cos\theta+\hat{z}\sin\theta)e^{-jk(x\ \sin\ \theta-z\ \cos\ \theta)}$, (θ=45°, L=0.5λ, ν=10, α=20°, a=0.0005λ))

Consider next a ten-turn helix having a total wire length of 0.5% and illuminated by a plane wave. The geometry of the helical scatterer is depicted in FIG. 30. The current shown in FIG. 31 is "converged" when the number of unknowns in the traditional solution technique reaches 259. Thus one concludes that 260 linear segments are required to accurately represent the geometry of this structure and vector nature of the current. We determine convergence by examining the real and imaginary parts of the current along the structure. When changes in the current are sufficiently small as the number of segments is increased, convergence is assumed. The results of a convergence test show that an accurate solution of the current can be achieved with 51 composite basis functions. The number of constituent triangles in each basis function in this case is nine. We note that the solution with 27 composite basis functions differs only slightly from the converged solution.

Figure 32:
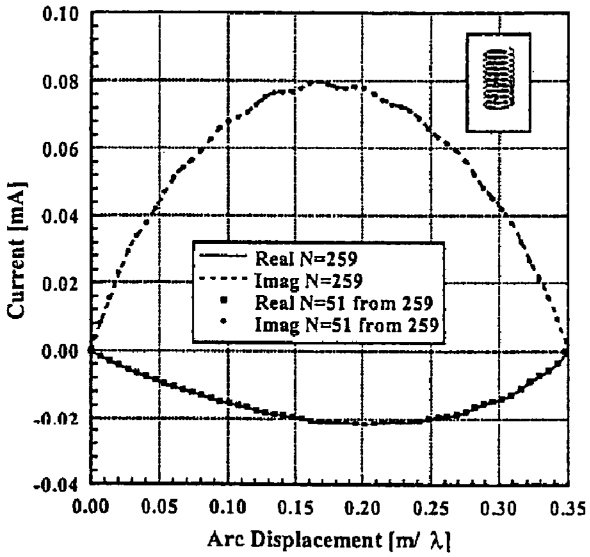
FIG. 32 is a graphical representation of current versus arc displacement on a helix illuminated by a plane wave, $E=(\hat{x}\cos\theta+\hat{z}\sin\theta)e^{-jk(x\ \sin\ \theta-z\ \cos\ \theta)}$, (θ=45°, L=0.35λ, ν=10, α=20°, a=0.0005λ)

The current is shown in FIG. 32 for another helical scatterer of geometry similar to that described above and subject to the same excitation and geometry similar to that described above. The circumference of each turn of this ten-turn helix is 0.035λ making the total wire length 0.35λ. These results are given as an example to illustrate that the composite basis function scheme works well with curved-wire structures having a wire length which is not an integer multiple of half wavelength.

Figure 33:
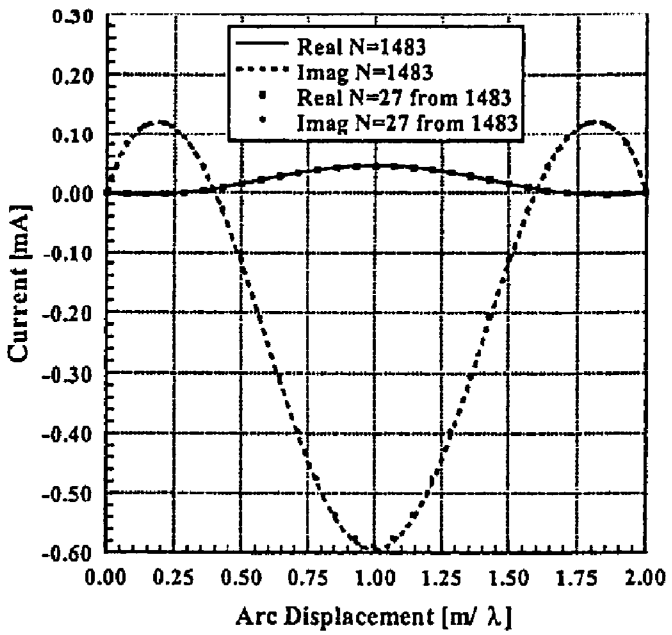
FIG. 33 is a graphical representation of current versus arc displacement on a helix illuminated by a plane wave, $E=\hat{z}e^{-jkx}$, (L=2λ, ν=50, α=20°, a=0.0005λ)

The data of FIG. 33 are for a 50-turn helix having a total wire length of 2λ, and illuminated by a plane wave traveling in the positive x direction. One sees that 27 unknowns are adequate to accurately represent the current along the helix. However, 1483 unknowns are required in the traditional solution method since many linear segments are required to define the 50-turn structure and the vector properties of the current. In this example there are 105 constituent triangles in each composite basis function. Table 7 below shows the computational savings enjoyed by the method of this invention.

TABLE 7

COMPUTATION TIMES FOR FIFTY-TURN HELIX

| Event | Time in Seconds |
|---|---|
| Fill matrix N = 1483 | 300 |
| Solve matrix equation N = 1483 | 267 |
| Reduce matrix rank from 1483 to 27 | 1.84 |
| Solve reduced matrix equation N = 27 | Negligible |
| Traditional method total time | 567 |
| Improved method total time | 302 |

Figure 34:
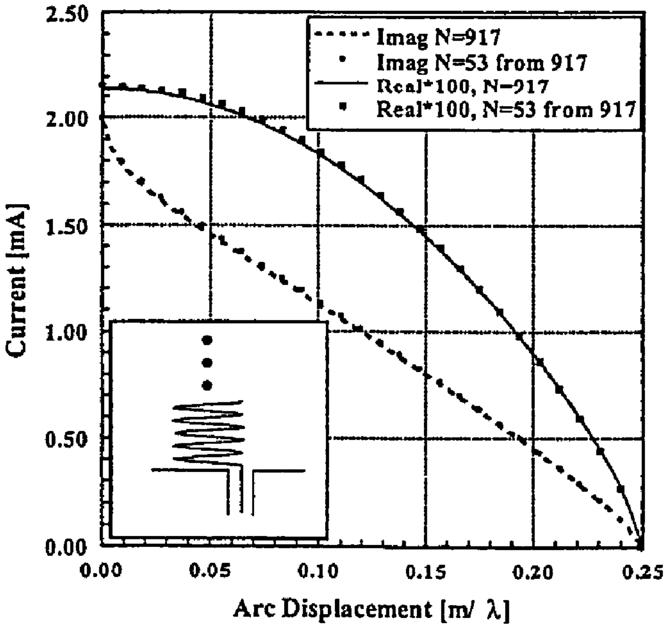
FIG. 34 is a graphical representation of current versus arc displacement on a helix driven by delta-gap source (L=0.25λ, ν=25, α=20°, a=0.0005λ)
Figure 35:
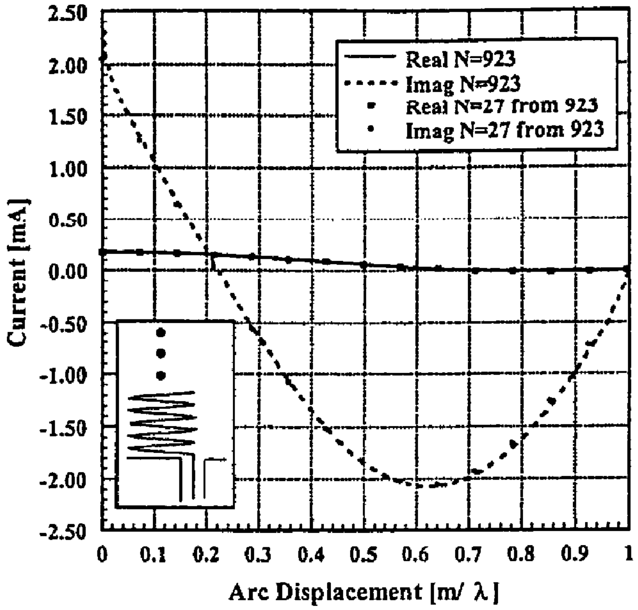
FIG. 35 is a graphical representation of current versus arc displacement on a helix driven by delta-gap source (L=λ, ν=25, α=200, a=0.0005λ)
Figure 36:
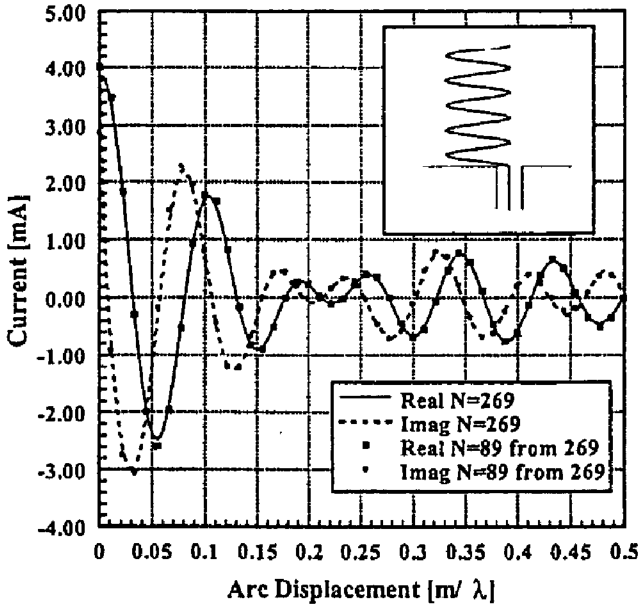
FIG. 36 is a graphical representation of current versus arc displacement on a helix driven by delta-gap source (L=0.5λ, $C_h$=0.1λ, α=12.5°, a=0.005λ)

Next we illustrate the prowess of the solution technique for helical antennas. Specifically the data presented in FIG. 34 and FIG. 35 are for helical antennas driven above a ground plane by a delta gap source. The geometry of the helix is given in FIG. 30 and the ground plane is located at z=0. The data of the improved method compare well with those of the traditional solution technique, but, again, there is a slight difference in the currents at the ground plane due to the nature of the delta gap source. In each of these figures the number of unknowns given is the number for the structure plus its image, but data are plotted only for the part of the structure above the ground plane. Since there are many turns, the number of segments needed to represent the geometry of the antenna and its image is large. The number of unknowns is reduced from N=917 in the traditional method to N=53 in the improved technique. Of course, one could employ image theory to modify the integral equation which could be solved by the new method with an even more dramatic savings in computer resources.

The last example is a five-turn helical antenna over an infinite ground plane, driven by a delta gap source. This structure is included here to exhibit the accuracy of a technique employing basis and testing functions defined over arcs of constant radii. It is modeled by straight wire segments. In certain literature the authors discretize the antenna into fifteen arcs and then compare solutions of 135 unknowns with forty-five unknowns. They find that forty-five unknowns is enough to obtain an accurate solution for the current when the geometry is defined by arcs. We reproduce these results except that the antenna geometry is defined by many straight wire segments. In the method of this invention we include the unknowns on the image (269 unknowns on the antenna plus its image corresponds to 135 unknowns on the antenna above the ground plane). Likewise, 89 unknowns on the antenna and image are equivalent to 45 unknowns on the antenna. We find that helical antennas require a minimum of 25 unknowns per turn in the traditional solution technique in order to represent the geometry. In order to reduce the number of unknowns over the antenna and its image from 269 to 89, each composite basis function is constructed with 5 constituent triangles. A qualitative comparison of our data suggests agreement in the two methods.

The solution method presented in this specification is very simple and practicable for reducing the rank of the impedance matrix for curved-wire structures. It should be mentioned that rank reduction is realized only when the number of segments needed to model the geometry and vector direction of the current exceeds the number of unknown current coefficients necessary to characterize the variation of the current. We define composite basis and testing functions as the sum of constituents over linear segments on a wire and arrive at a new impedance matrix of reduced rank. It is shown how this reduced-rank matrix can be determined from the original impedance matrix by a matrix transformation. Thus one advantage of this technique is that it can be applied to almost any existing curved-wire codes which define basis and testing functions over straight-wire segments or curved-wire segments.

Dramatic savings in matrix solve time are realized for the cases of the four-arm Archimedian spiral antenna and the helical antenna. The benefits for reducing unknowns on, for example, a helical antenna become much more significant as the number of turns increases. It should be pointed out that this method does not reduce matrix fill time since the elements of the original impedance matrix are computed as a step in the determination the elements of the reduced-rank matrix. Problems involving large curved-wire structures can be solved readily by this method, e.g., a straight wire antenna loaded with multiple, tightly wound helical coils and an array of Archimedian spiral antennas. The principles described here can be used in addition to other methods such as those based upon iteration.

An exemplary genetic algorithm that can be used in accordance with the subject invention to obtain optimal antenna parameters for given design criteria is included in the computer program listing appendix provided on compact disc and is incorporated by reference herein.

The following portion of the specification, especially with reference to FIGS. 37–47C, respectively, particularly concerns bandwidth enhanced normal mode helical antennas. It begins by setting forth the objectives, considerations, and questions addressed in the beginning stages of development of the present invention. The effects of different physical antenna parameters on antenna performance are addressed by showing the effect in the VSWR by these variations.

The remainder of the discussion with respect to FIGS. 37–47C, respectively, shows several different antenna designs and in graphical form illustrates the respective performance of each. A straight wire antenna, a simple helix, and a triple helix are all examined. Each antenna is modified by the addition of various parasitic elements. The characteristics of each of these antennas are then illustrated. The VSWR, directivity, and input impedance are shown so that the different antennas having different combinations of parasitic elements can be analyzed effectively. Results obtained from the different antenna combinations are then summarized and conclusions drawn from these results are set forth. Such results illustrate the initial indications that bandwidth improvements could be made by the addition of these parasitic elements. Objectives for the subject antenna include it being low-profile, omnidirectional and broadband. Design considerations include: (a) the helix can be made shorter by adjusting the pitch, (b) normal mode helix has narrow bandwidth, and (c) parasitic elements increase the bandwidth of straight wires. Questions addressed in the subject analysis include determination of whether the bandwidth of the normal mode helix can be improved with parasitic elements and if so, what are suitable structures for the parasites.

Figure 37:
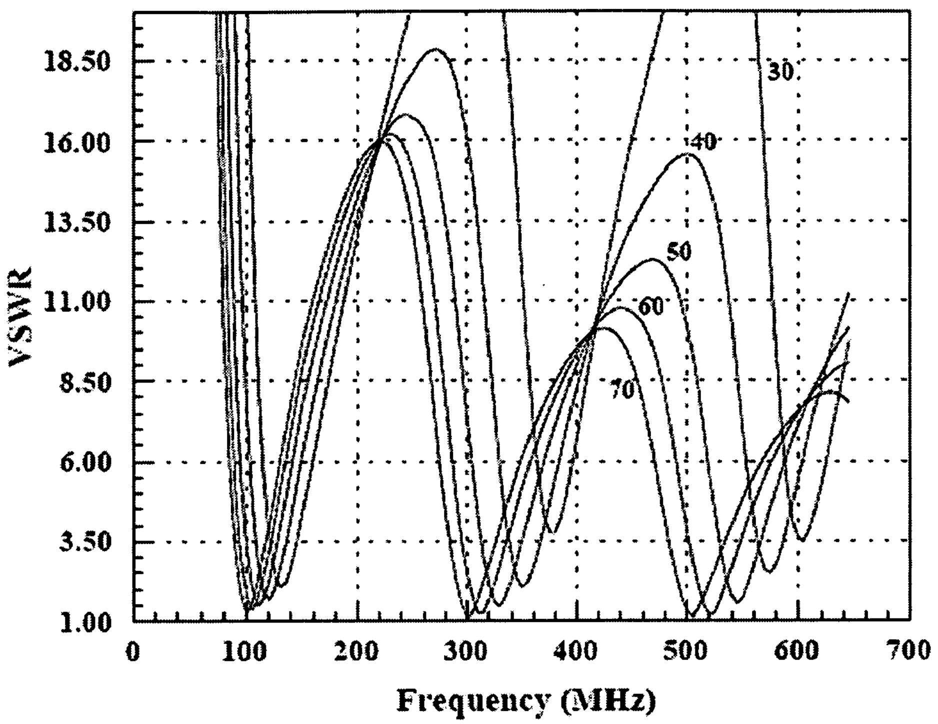
FIG. 37 is a graphical representation of VSWR versus frequency for different pitch angles for an antenna helix.

FIG. 37 presents numerical results of the effect of pitch angle on helix VSWR for a helical antenna having a total wire length of 75 cm and a wire radius of 0.5 cm. The different curves plotted in the graph of FIG. 37 are for antennas having a helix pitch (θ) of 30, 40, 50, 60 and 70 degrees. For an antenna having a pitch of 30 degrees, a height reduction of 45.0% and a total height of 41.3 cm is achievable. For an antenna having a pitch of 40 degrees, a height reduction of 32.0% and a total height of 50.9 cm is achievable. For an antenna having a pitch of 50 degrees, a height reduction of 21.0% and a total height of 59.2 cm is achievable. For an antenna having a pitch of 60 degrees, a height reduction of 12.0% and a total height of 66.0 cm is achievable. For an antenna having a pitch of 70 degrees, a height reduction of 5.4% and a total height of 70.9 cm is achievable.

Figure 38:
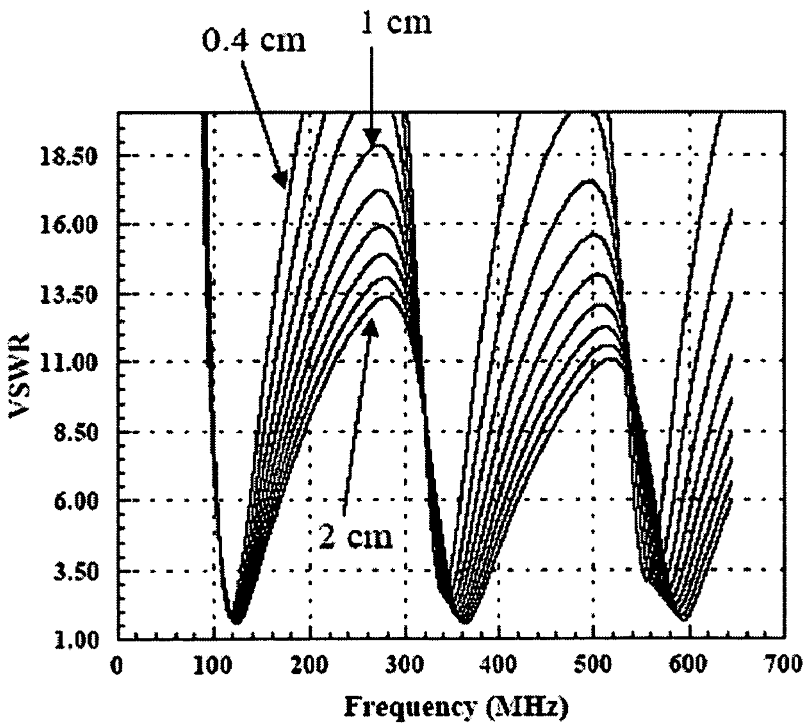
FIG. 38 is a graphical representation of VSWR versus frequency for different wire radius values for an antenna helix.

FIG. 38 presents numerical results of the effect of wire radius on helix VSWR for a helical antenna having varied diameters, including 0.4 cm, 1 cm and 2 cm, as depicted in the graph. The helix geometry of such antennas are characterized by a height of the straight wire base being 7.5 cm, the circumference of one turn in the helix being 15 cm, total number of turns being 4.5 with a pitch angle of 40 degrees, and a total wire length of 75 cm.

Figure 39:
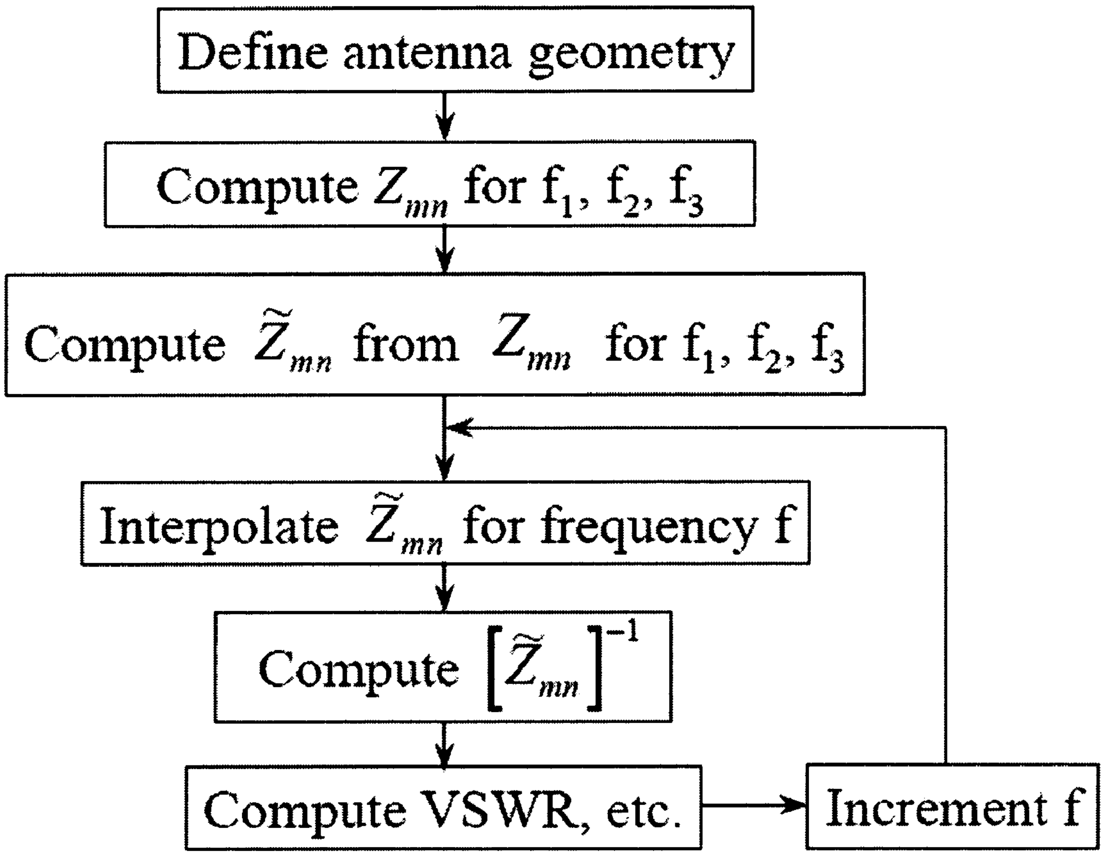
FIG. 39 provides a block diagram of exemplary steps in a process for efficient evaluation of antennas.

FIG. 39 provides a block diagram representing exemplary steps in a procedure for efficient optimization of a helix with parasitic elements. The evaluation steps are done for each antenna in the sample population. In the steps of FIG. 39, $\tilde{Z}_{mn}$ is the reduced-rank impedance matrix used for curved wires.

Figure 40B:
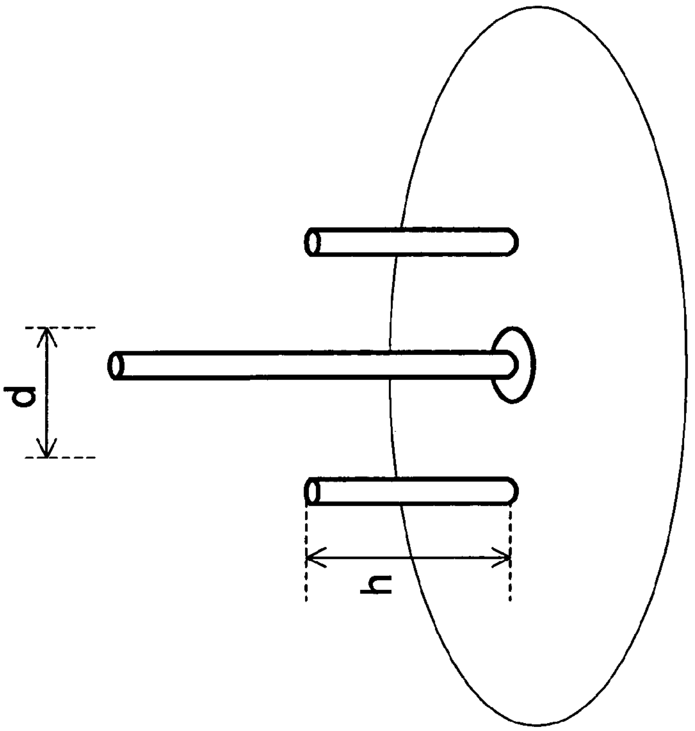
FIG. 40B is a perspective view of an exemplary straight wire antenna with two parasites.
Figure 40A:
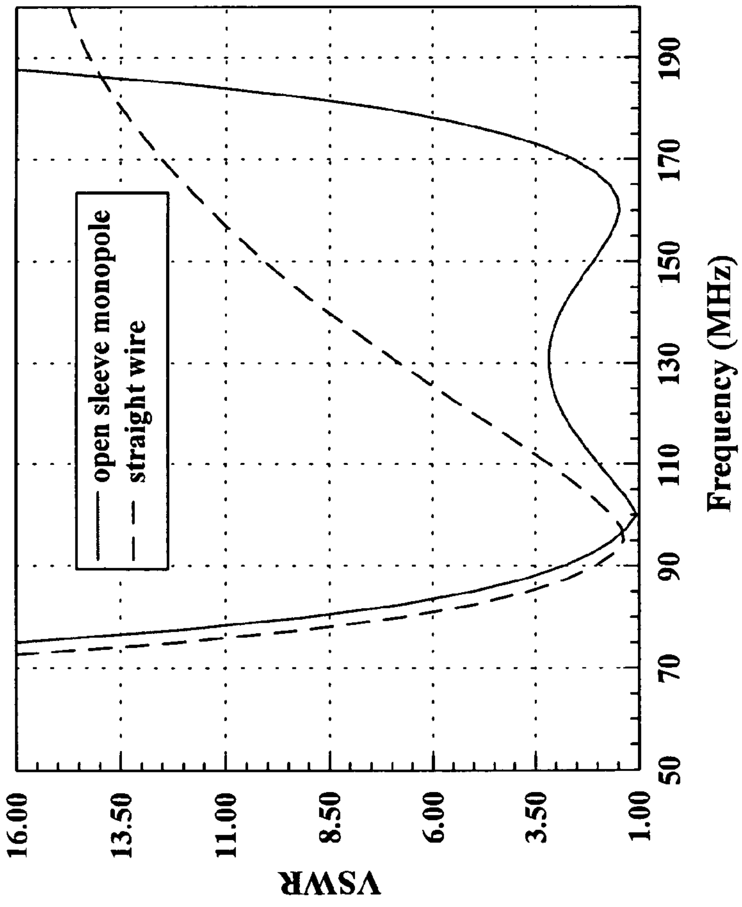
FIG. 40A is a graphical representation of VSWR versus frequency for the exemplary antenna of FIG. 40B.

FIG. 40A provides numerical results comparing the VSWR versus frequency for an open sleeve monopole antenna, such as depicted in FIG. 40B, and a regular straight wire antenna. For a single wire antenna, a VSWR less than 3.5 is achieved on a frequency range from 85 MHz to 112 MHz for a bandwidth ratio of 1.32:1. For an open sleeve monopole antenna, a VSWR less than 3.5 is achieved on a frequency range from 90 MHz to 172 MHz for a bandwidth ratio of 1.9:1.

Figure 41B:
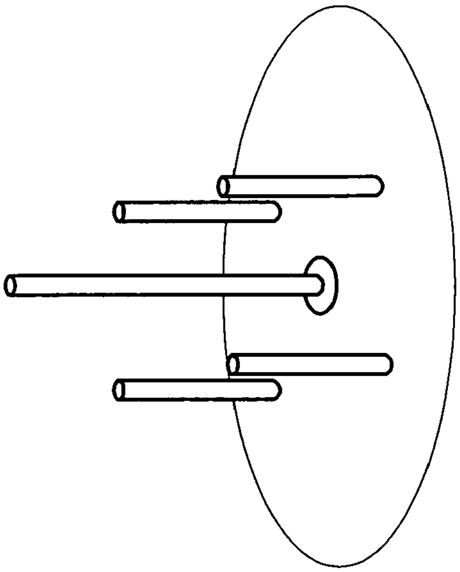
FIG. 41B is a perspective view of an exemplary straight wire antenna with four parasites.
Figure 41A:
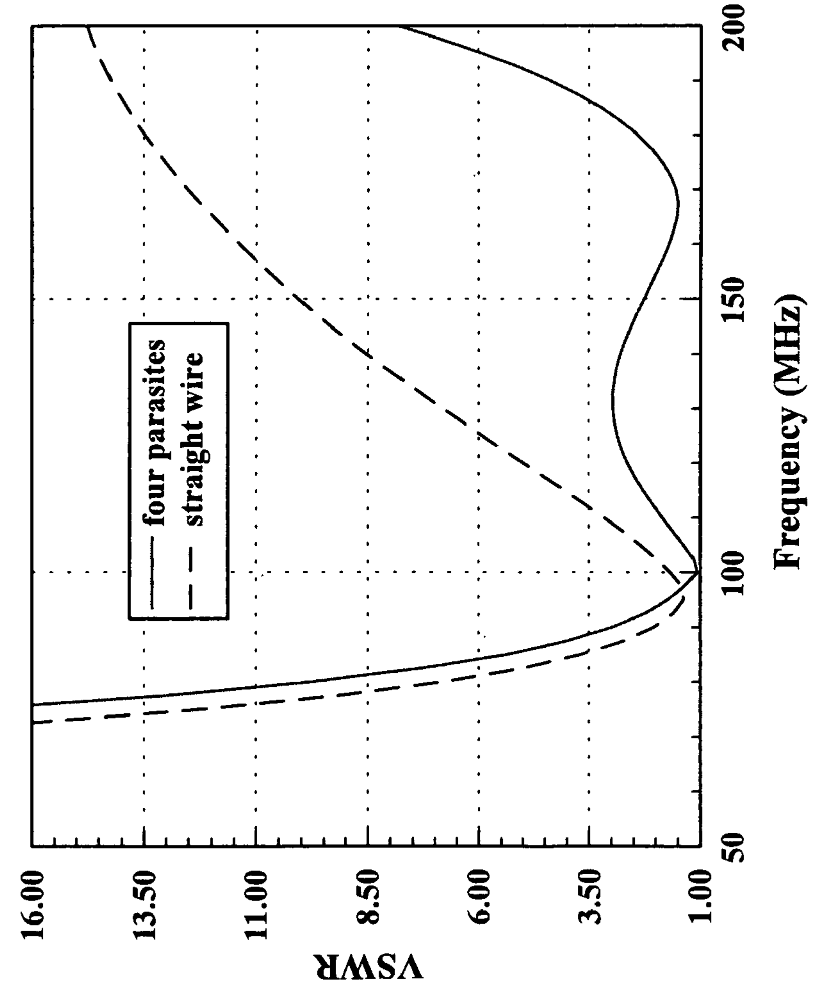
FIG. 41A is a graphical representation of VSWR versus frequency for the exemplary antenna of FIG. 41B.

FIG. 41A provides numerical results comparing the VSWR versus frequency for a straight wire antenna having four parasites, such as depicted in FIG. 41B, and a regular straight wire antenna. For a single wire antenna, a VSWR less than 3.5 is achieved on a frequency range from 85 MHz to 112 MHz for a bandwidth ratio of 1.32:1. For a straight wire antenna having four parasites, a VSWR less than 3.5 is achieved on a frequency range from 90 MHz to 185 MHz for a bandwidth ratio of 2.05:1.

FIGS. 42A through 45B present numerical results for various helix antenna embodiments. The basic geometry of the helical antenna is the same as previously described for the antennas modeled in FIG. 38 and having a wire diameter of 1 cm.

Figure 42B:
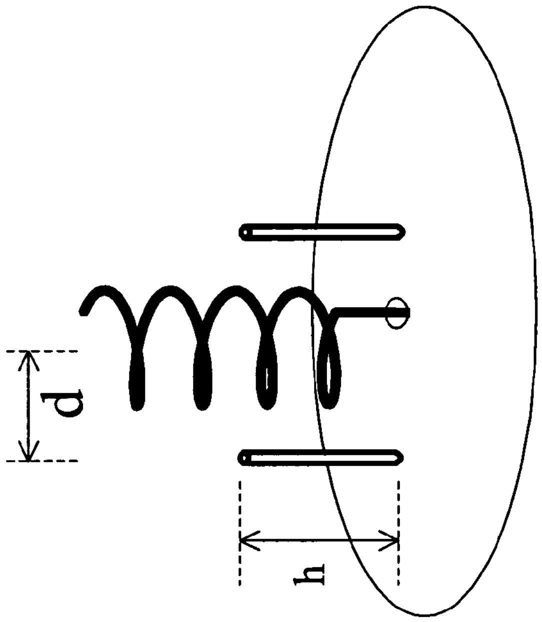
FIG. 42B is a perspective view of an exemplary helix antenna with two straight wire parasites.
Figure 42A:
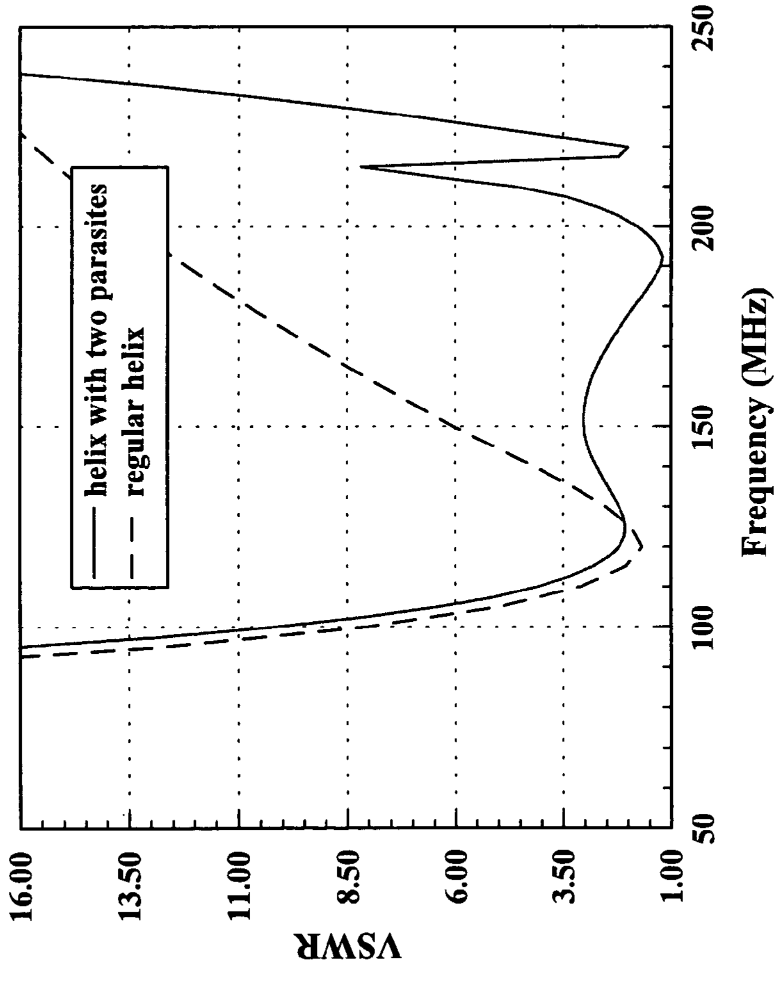
FIG. 42A is a graphical representation of VSWR versus frequency for the exemplary antenna of FIG. 42B.

FIG. 42A provides numerical results comparing the VSWR versus frequency for a helix antenna with two straight wire parasites, such as depicted in FIG. 42B, and a regular helix antenna. For the helix antenna having two parasites, a VSWR less than 3.5 is achieved on a frequency range from 112 MHz to 208 MHz for a bandwidth ratio of 1.86:1.

Figure 43B:
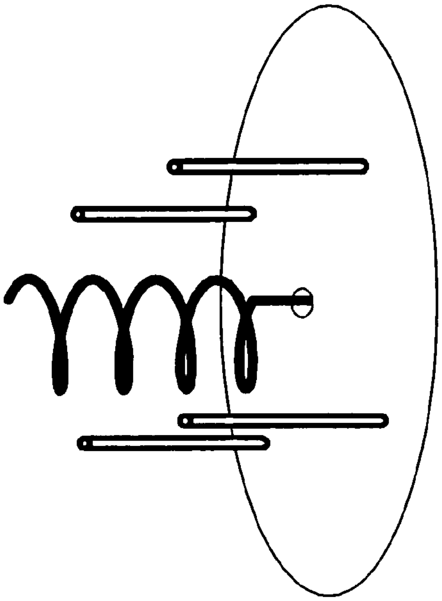
FIG. 43B is a perspective view of an exemplary helix antenna with four straight wire parasites.
Figure 43A:
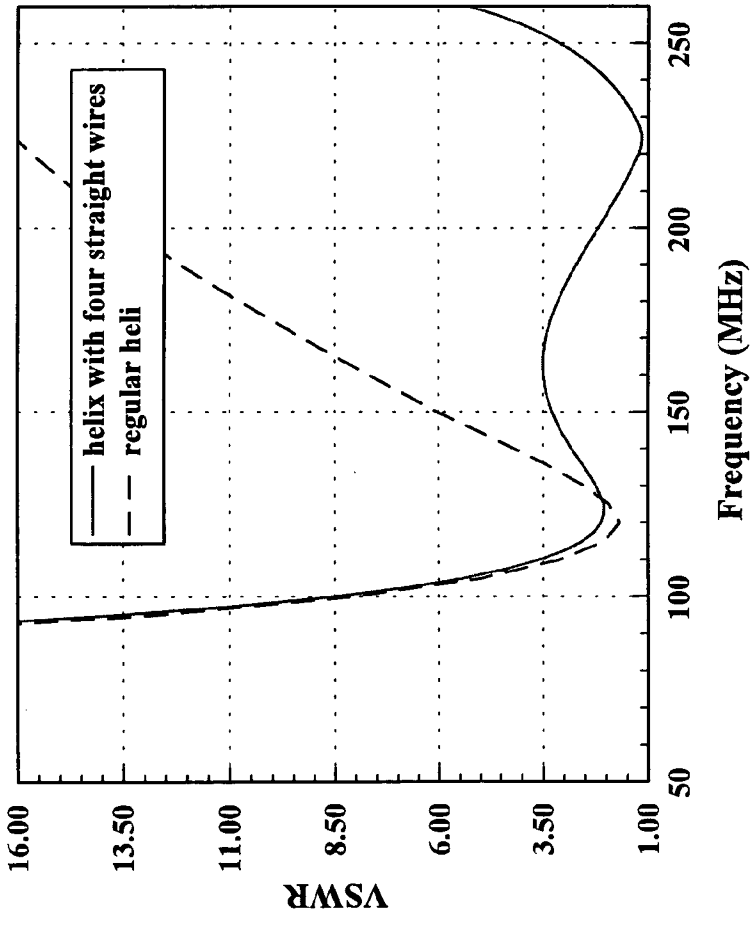
FIG. 43A is a graphical representation of VSWR versus frequency for the exemplary antenna of FIG. 43B.
Figure 43D:
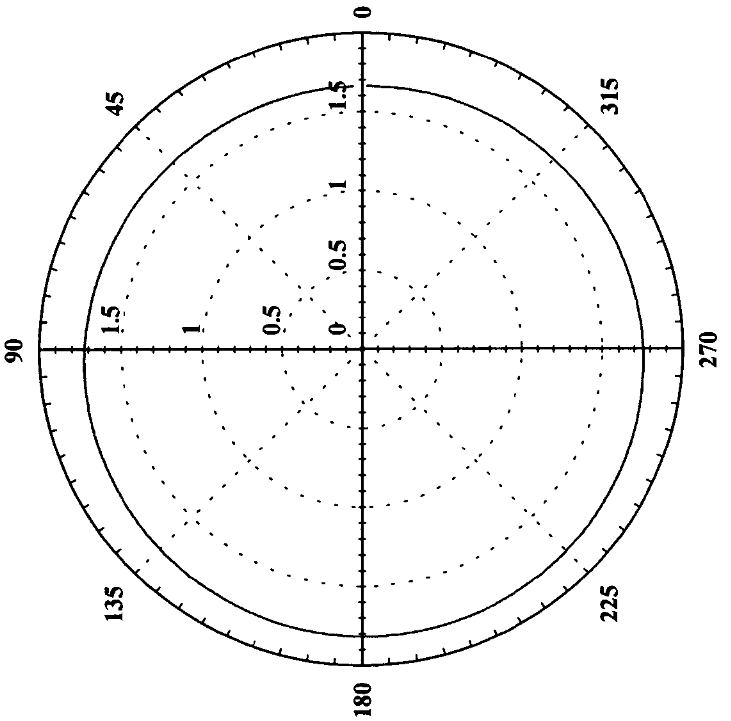
FIG. 43D is a graphical representation of directivity in the H-plane versus ϕ for the exemplary antenna of FIG. 43B.
Figure 43C:
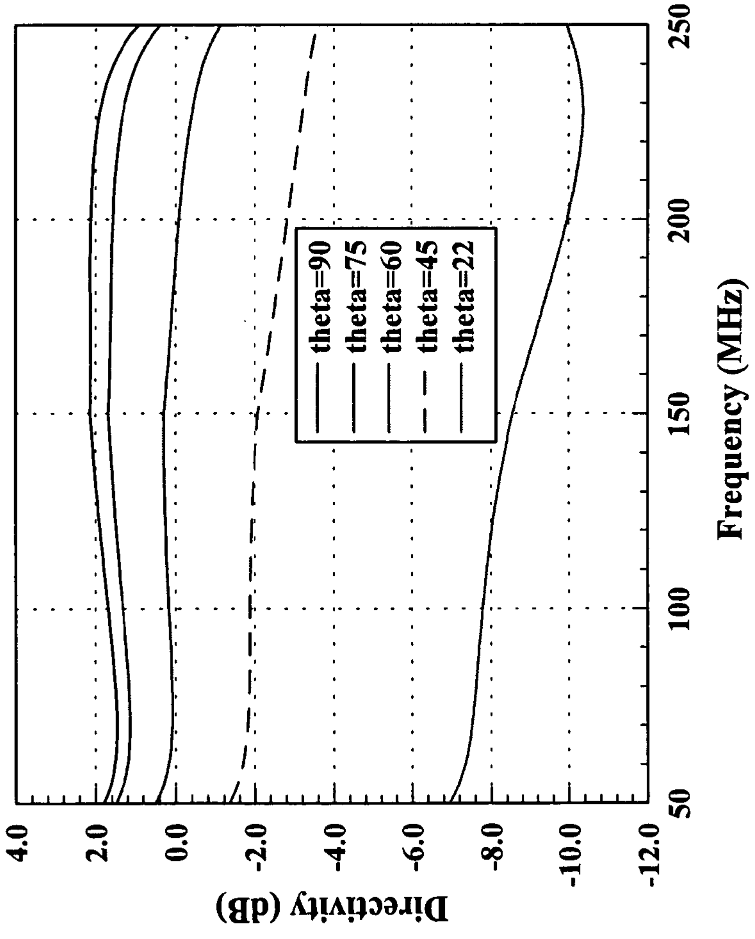
FIG. 43C is a graphical representation of directivity versus frequency for the exemplary antenna of FIG. 43B.

FIG. 43A provides numerical results comparing the VSWR versus frequency for a helix antenna with four straight wire parasites, such as depicted in FIG. 43B, and a regular helix antenna. For the helix antenna having four parasites, a VSWR less than 3.5 is achieved on a frequency range from 112 MHz to 250 MHz for a bandwidth ratio of 2.23:1. FIG. 43C provides a graph of the directivity versus frequency for antennas with varied pitch angles (θ) for $\phi=0$. FIG. 43D provide a graph of the directivity in the H-plane versus $\phi$ when f=190 MHz and θ=90 degrees.

Figure 44A:
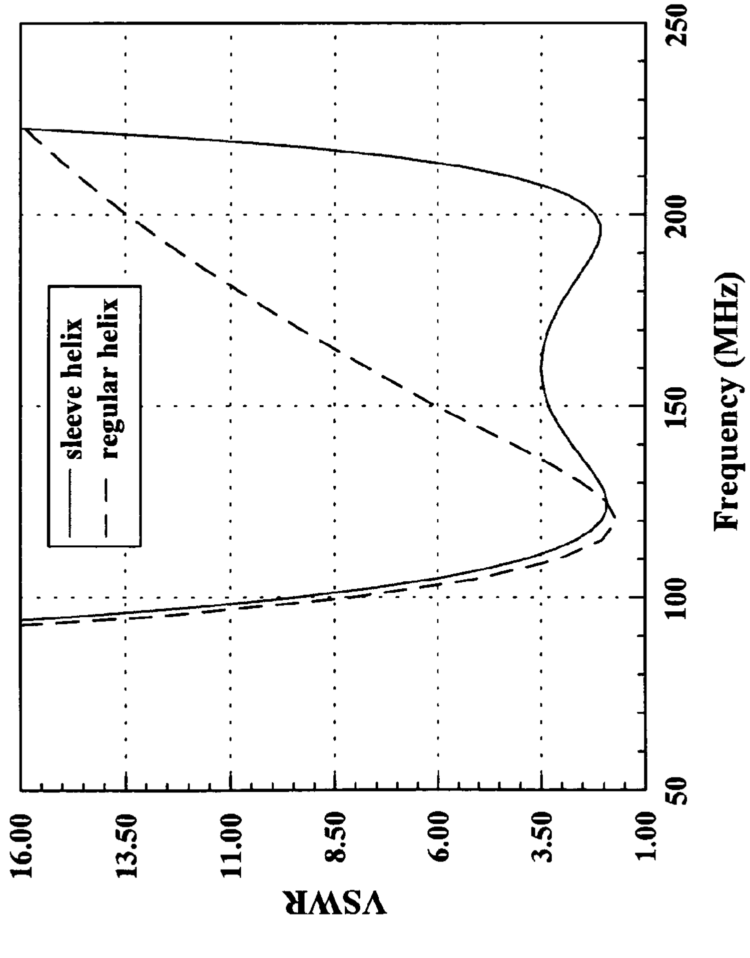
FIG. 44A is a graphical representation of VSWR versus frequency for the exemplary antenna of FIG. 44B.
Figure 44B:
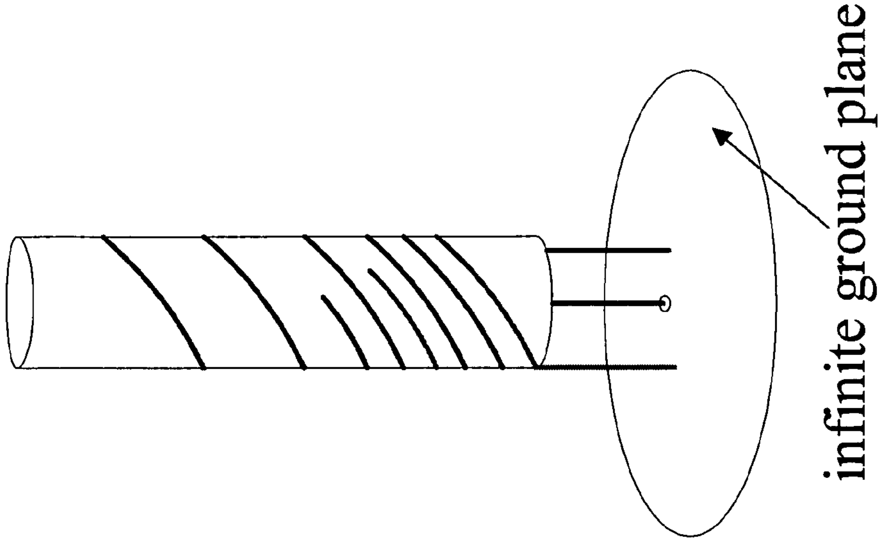
FIG. 44B is a perspective view of an exemplary helix antenna with two helical parasites.
Figure 44C:
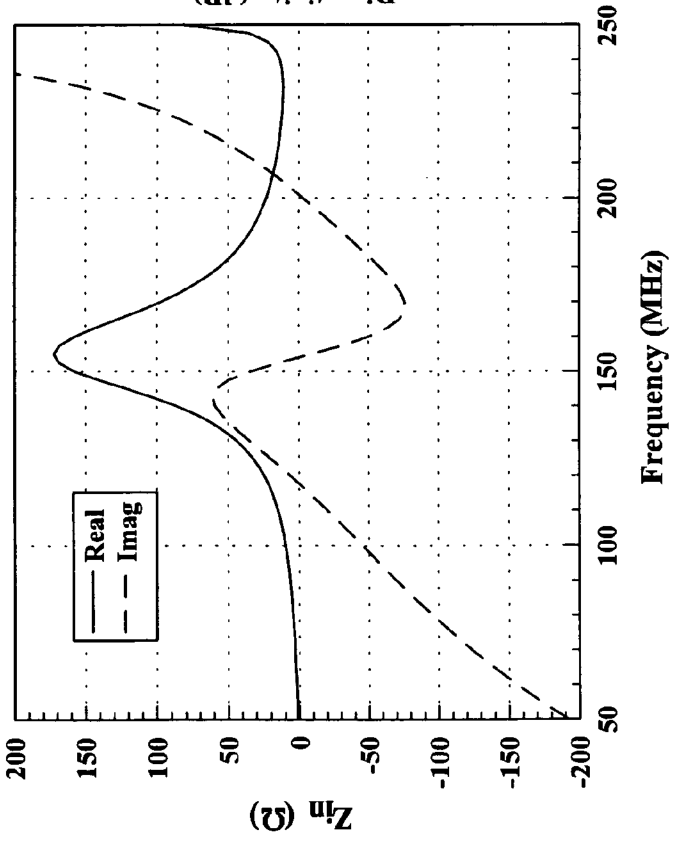
FIG. 44C is a graphical representation of input impedance versus frequency for the exemplary antenna of FIG. 44B.
Figure 44D:
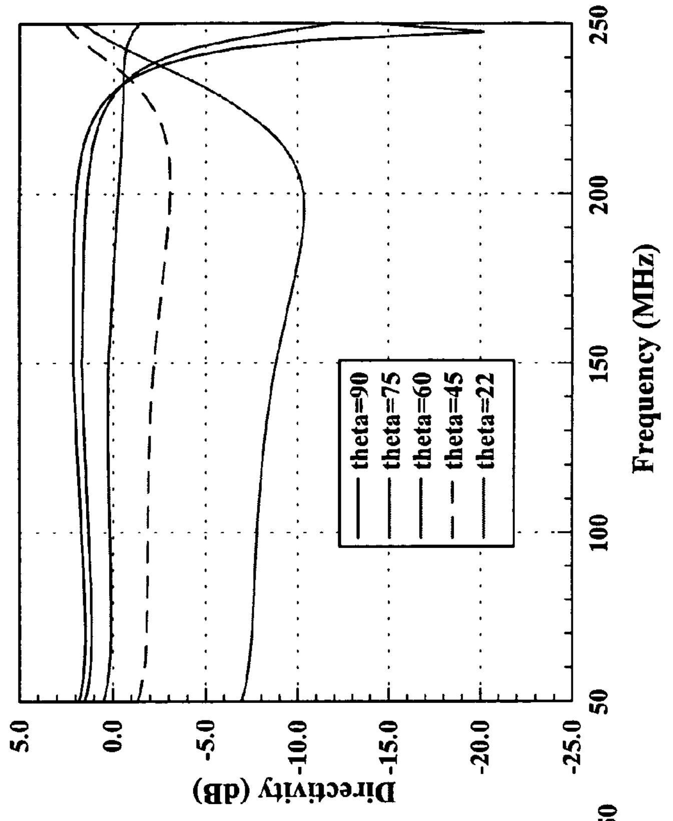
FIG. 44D is a graphical representation of directivity versus frequency for the exemplary antenna of FIG. 44B.

FIG. 44A provides numerical results comparing the VSWR versus frequency for a helix antenna with two helical parasites, such as depicted in FIG. 44B, and a regular helix antenna. For the helix antenna having two helical parasites, a VSWR less than 3.5 is achieved on a frequency range from 112 MHz to 208 MHz for a bandwidth ratio of 1.86:1. Real and imaginary components for the input impedance of the antenna represented in FIG. 44B is displayed in FIG. 44C, and FIG. 44D charts the directivity versus frequency for antennas having different pitch angles (θ).

Figure 45A:
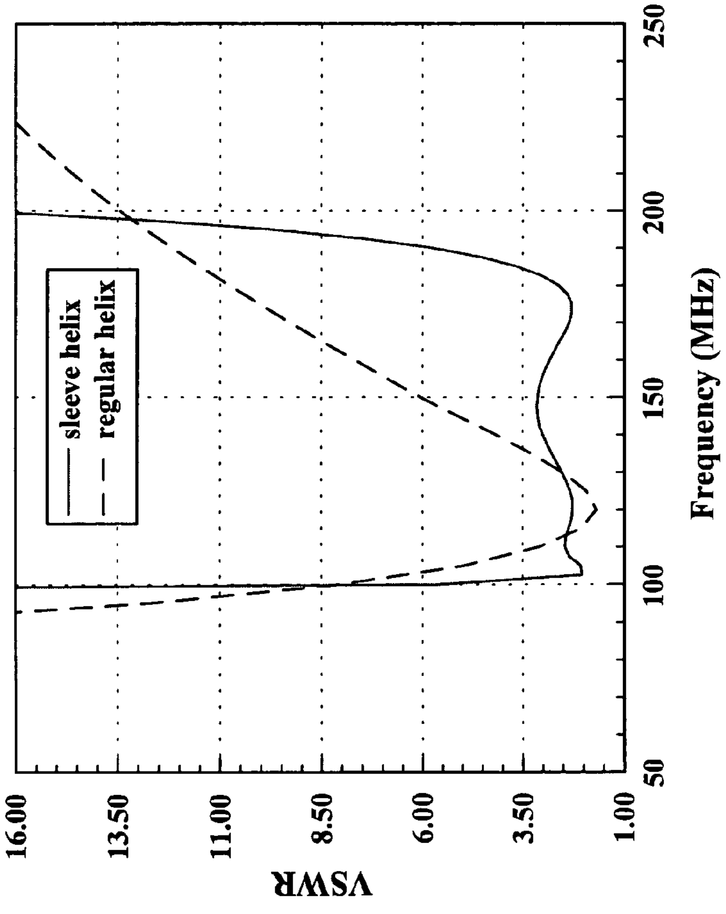
FIG. 45A is a graphical representation of VSWR versus frequency for the exemplary antenna of FIG. 45B.
Figure 45B:
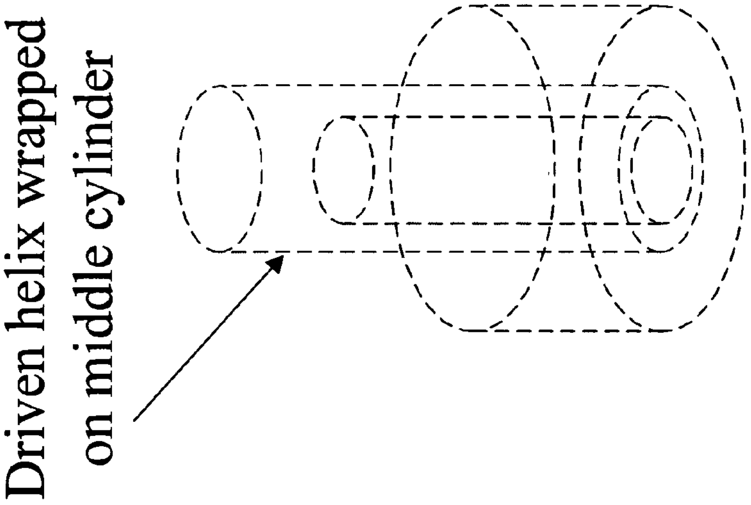
FIG. 45B is a perspective view of an exemplary helix antenna with inner and outer helical parasites.

FIG. 45A provides numerical results comparing the VSWR versus frequency for a helix antenna having respective inner and outer helical parasites, such as depicted in FIG. 45B, and a regular helix antenna. For the sleeve helix antenna having inner and outer parasites, a VSWR less than 3.5 is achieved on a frequency range from 101 MHz to 182.5 MHz for a bandwidth ratio of 1.81:1.

Figure 46B:
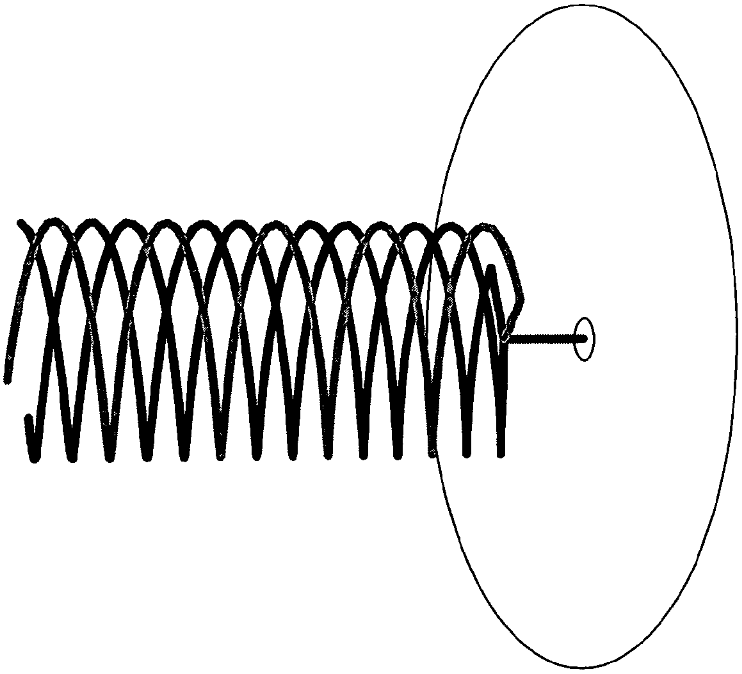
FIG. 46B is a perspective view of an exemplary triple helix antenna.
Figure 46A:
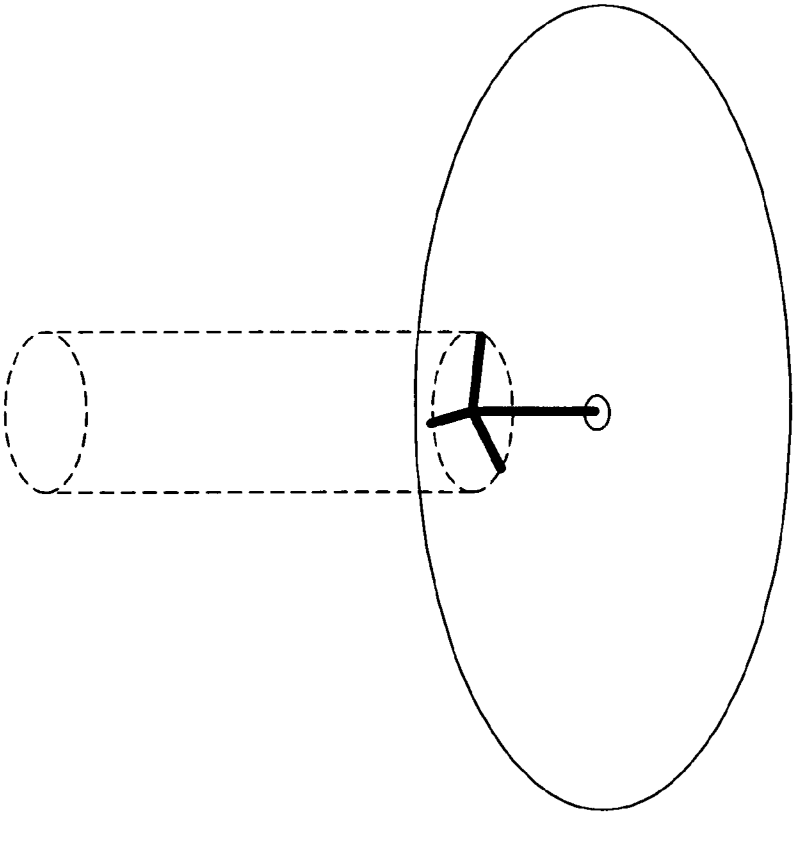
FIG. 46A is a perspective view of an exemplary antenna base portion and representative cylinder around which the coils of a triple helix antenna are wound.

FIGS. 46C through 47D, respectively, present numerical results for various triple helix antenna embodiments, such as represented in FIGS. 46A and 46B. The basic geometry of the triple helix antenna is the same as previously described for the antennas modeled in FIG. 38 and having a wire diameter of 1 cm, except the triple helix has 13.5 turns (4.5 for each helix).

Figure 46C:
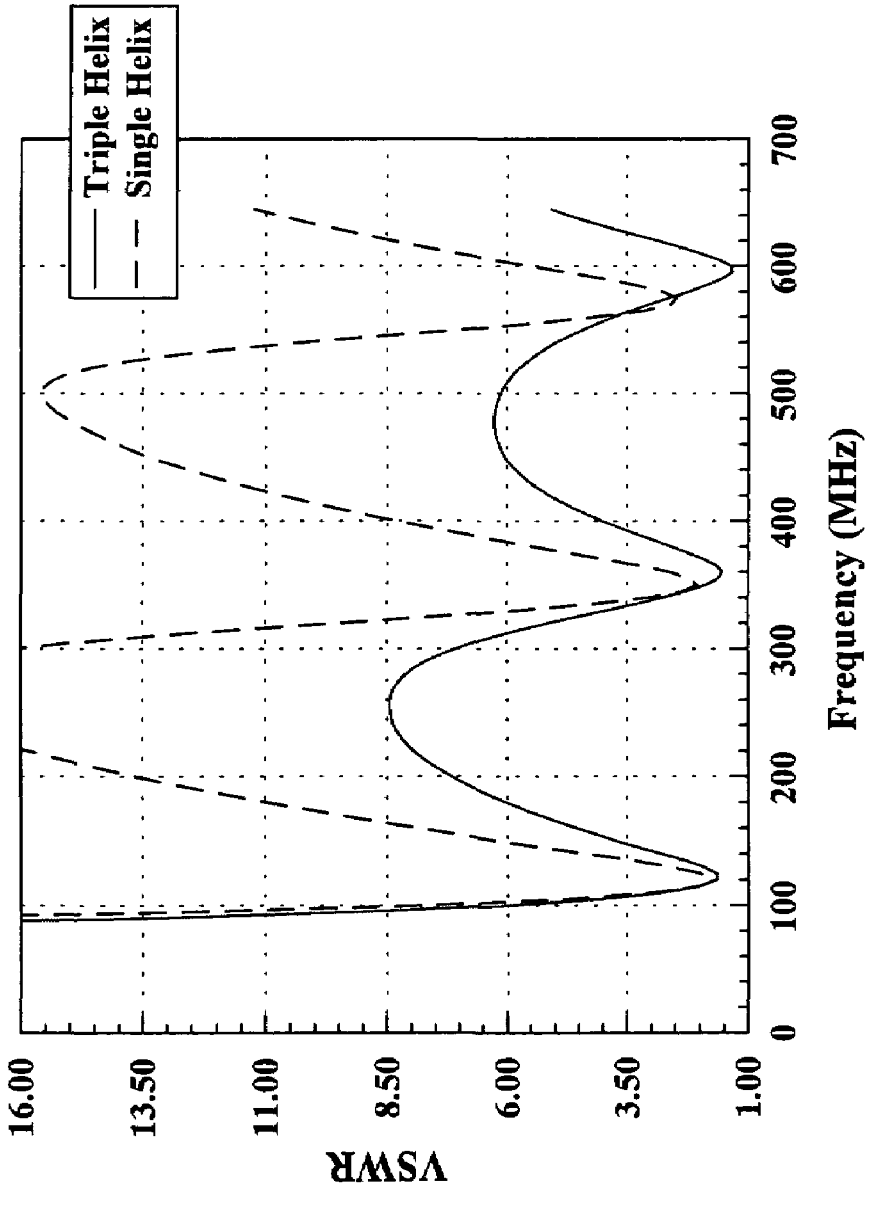
FIG. 46C is a graphical representation of VSWR versus frequency for a triple helix antenna (such as one depicted in FIGS. 46A and 46B) compared with a single helix antenna.
Figure 47B:
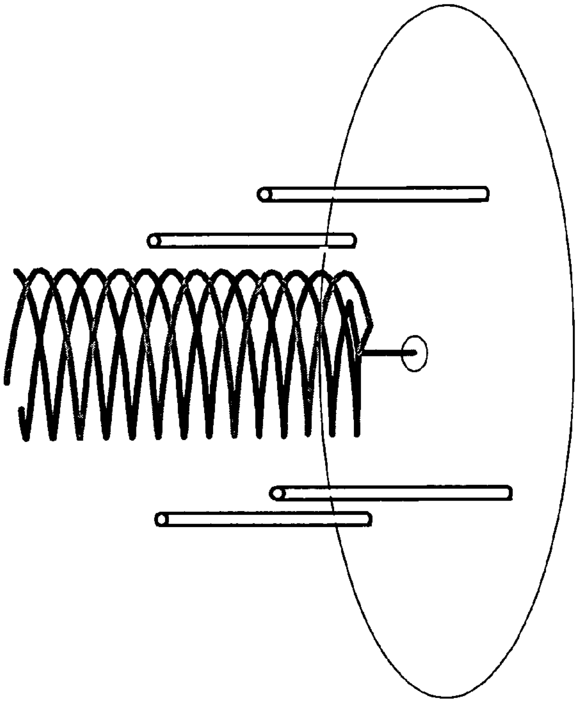
FIG. 47B is a perspective view of an exemplary triple helix antenna with four straight wire parasites.
Figure 47A:
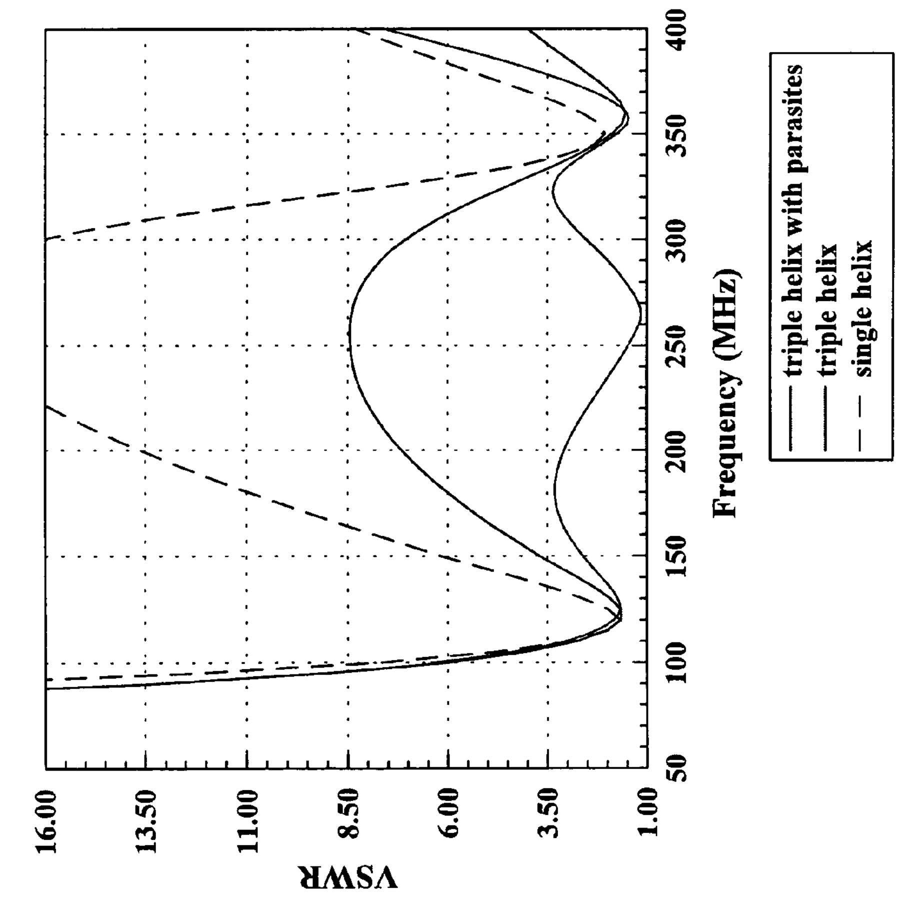
FIG. 47A is a graphical representation of VSWR versus frequency for the exemplary antenna of FIG. 47B compared with a single helix and a triple helix antenna.
Figure 47D:
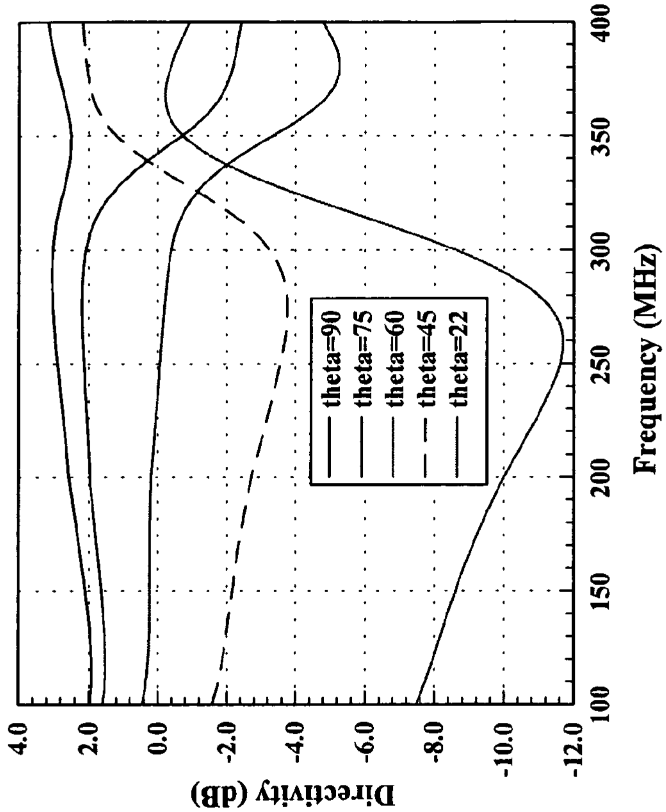
FIG. 47D is a graphical representation of directivity versus frequency for a triple helix antenna with parasites, such as the one illustrated in FIG. 47B.
Figure 47C:
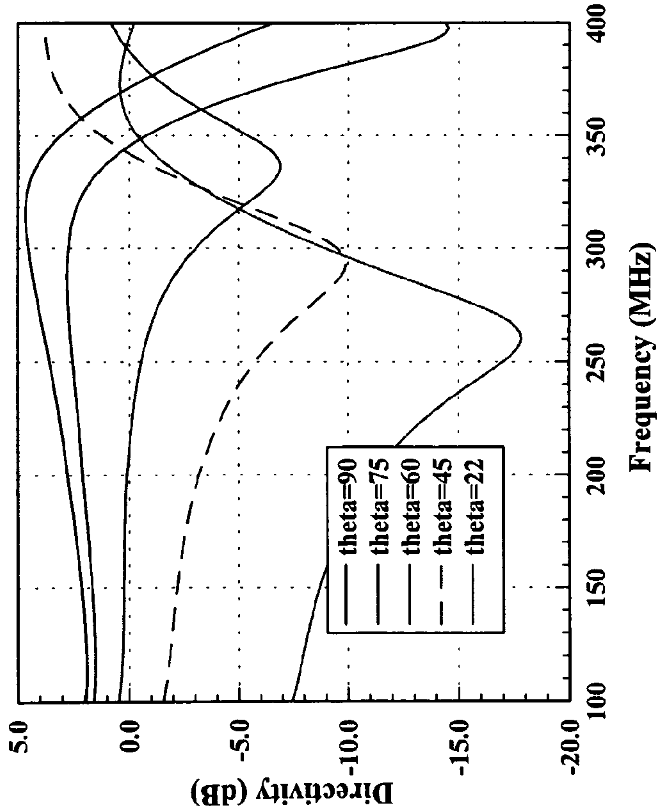
FIG. 47C is a graphical representation of directivity versus frequency for a triple helix antenna.

FIG. 46C provides numerical results comparing the VSWR versus frequency for a triple helix antenna and a single helix antenna. FIG. 47A provides numerical results for a triple helix antenna having four straight wire parasites, such as depicted in FIG. 47B, a triple helix antenna and a single helix antenna. For the triple helix antenna having four parasites, a VSWR less than 3.5 is achieved on a frequency range from 110 MHz to 380 MHz for a bandwidth ratio of 3.45:1. FIG. 47C provides a graphical representation of antenna directivity versus frequency for the triple helix antenna with different values for the helix pitch angles (θ). FIG. 47D provides a graphical representation of antenna directivity versus frequency for the triple helix antenna with parasites (such as in FIG. 47B) with different values for the helix pitch angles (θ).

A summary of the results determined from the numerical data provided in FIGS. 40A through 47D, respectively, is now presented in Table 8 below. These results show that parasitic straight wires and helices are useful for improving the bandwidth of helical antennas. Also, the triple helix has reduced VSWR over the frequency band which makes the structure more amenable to improvement by parasites.

TABLE 8

| Driven Element | Number of Parasites | Types of Parasites | Bandwidth Ratio |
|---|---|---|---|
| Straight Wire | 2 | Straight wire | 1.90:1 |
| Straight Wire | 4 | Straight wire | 2.05:1 |
| Helix | 2 | Straight wire | 1.86:1 |
| Helix | 4 | Straight wire | 2.23:1 |
| Helix | 2 | Helix (same cylinder) | 1.86:1 |
| Helix | 2 | Helix (different cylinders) | 1.81:1 |
| Triple Helix | 4 | Straight wire | 3.45:1 |

What is claimed is:

1. A method of designing omni-directional, broadband antennas, comprising the following steps:

providing at least one design parameter for a driven antenna structure as input to an algorithmic process, comprising a genetic algorithm;

executing said algorithmic process to determine size and position of parasitic elements for combination with said driven antenna structure to create improved antenna configurations, characterized by a central antenna portion surrounded by a plurality of parasitic elements forming a sleeve configuration; and identifying selected of said improved antenna configurations as optimum configurations based on a determined fitness value for each improved antenna configuration.

2. A method of designing omni-directional, broadband antennas as in claim 1, wherein said at least one design parameter includes dimensions of wires or of other elements for use in constructing said driven antenna structure.

3. A method of designing omni-directional, broadband antennas as in claim 1, wherein said step of executing said algorithmic process is successively repeated to create different respective populations of improved antenna configurations, and wherein selected of said improved antenna configurations from a given population comprise combinations of at least two of the improved antenna configurations from previously created populations.

4. A method of designing omni-directional broadband antennas as in claim 1, wherein said algorithm process includes calculating voltage standing wave ratios for selected of said antenna configurations over a selected range of frequencies for antenna operation and assigning fitness values to said antenna configurations for which the voltage standing wave ratios are less than some predetermined value.

5. A method of designing omni-directional broadband antennas as in claim 1, further comprising a step of providing an ideal frequency range of operation as input to said algorithmic process.

6. A sleeve monopole antenna as produced by the method of claim 1.

7. A sleeve cage antenna as produced by the method of claim 1.

8. A sleeve-helix antenna as produced by the method of claim 1.

9. A method for designing a sleeve antenna structure characterized by omni-directional capabilities over a generally wide frequency range, comprising:

defining initial antenna parameters and providing a corresponding range of potential values for selected of said initial antenna parameters;

executing a first iteration of an algorithmic process, comprising a genetic algorithm to generate a population of individual antenna designs, characterized by a central antenna portion surrounded by a plurality of parasitic elements such that selected individual antenna designs of said population of individual antenna designs are assigned fitness values that relate to a bandwidth ratio of the highest frequency to lowest frequency within a selected frequency range of operation for which voltage standing wave ratios are less than some predetermined value;

evaluating said population of individual antenna designs and selecting certain of said individual antenna designs as having optimum fitness values; and executing at least a second iteration of said algorithmic process to generate an additional population of individual antenna designs with corresponding fitness values assigned to selected individual antenna designs of said additional population.

10. A method for designing a sleeve antenna structure as in claim 9, wherein said algorithmic process determines the size and location of parasitic elements for positioning around a driven antenna element, thereby generating improved antenna designs with greater bandwidth efficiency.

11. A method for designing a sleeve antenna configuration as in claim 9, wherein said algorithmic process includes calculating the electric current in selected of said individual antenna designs.

12. A sleeve antenna as produced by the design method of claim 9.

13. A sleeve antenna as in claim 12, wherein said sleeve antenna comprises one of a sleeve-cage antenna and a sleeve helix antenna.

14. A process for designing and producing antennas, comprising the steps of:

providing a genetic algorithm as a design algorithm;

providing general antenna parameters and a corresponding range of potential values for selected of said general antenna parameters for input to said design algorithm;

specifying the resolution of selected of said general antenna parameters;

performing a first iteration of said design algorithm to generate a population of individual antenna designs, wherein selected of said individual antenna designs are characterized as having a sleeve configuration with a central antenna portion surrounded by a plurality of parasitic element, and wherein each individual antenna of said population of individual antenna designs is assigned a fitness value;

evaluating said fitness values of selected of said individual antenna designs to determine which of said antenna designs are characterized by optimum fitness values;

performing at least a second iteration of said design algorithm to generate an additional population of individual antenna designs, wherein selected of said individual antenna designs are identified as having most optimum fitness values; and providing an antenna having parameters corresponding to those of a selected individual antenna design identified as having a most optimum fitness value.

15. A process for designing and producing antennas as in claim 14, wherein said general antenna parameters include at least one of frequency range of operation, range of antenna height, and dimensions of wires or of other elements for potential construction of said antenna configurations.

16. A process designing and producing antennas as in claim 14, wherein said resolution of selected general antenna parameters is specified as a number of bits per parameter.

17. A process for designing and producing antennas as in claim 14, wherein said fitness value relates to a bandwidth ratio of highest frequency to lowest frequency within a selected frequency range of operation for which voltage standing wave ratio is less than some predetermined value.

18. A process for designing and producing antennas as in claim 14, wherein said design algorithm comprises antenna design software for use in conjunction with a computer system.

19. A process for designing and producing antennas as in claim 14, wherein said central antenna portion comprises one of a cage structure and a helical structure.

* * * * *